(12) United States Patent
Takizawa et al.

(10) Patent No.: US 7,324,149 B2
(45) Date of Patent: Jan. 29, 2008

(54) CAMERA AND IMAGE PICK-UP DEVICE UNIT HAVING AN OPTICAL MEMBER THAT IS VIBRATED TO REMOVE DUST

(75) Inventors: Hiroyuki Takizawa, Chofu (JP); Sumio Kawai, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 688 days.

(21) Appl. No.: 10/303,691

(22) Filed: Nov. 22, 2002

(65) Prior Publication Data

US 2003/0214588 A1 Nov. 20, 2003

(30) Foreign Application Priority Data

| May 20, 2002 | (JP) | ............................. 2002-145248 |
| May 20, 2002 | (JP) | ............................. 2002-145251 |
| May 20, 2002 | (JP) | ............................. 2002-145252 |
| May 20, 2002 | (JP) | ............................. 2002-145258 |
| May 27, 2002 | (JP) | ............................. 2002-152945 |
| May 27, 2002 | (JP) | ............................. 2002-153019 |
| Jul. 30, 2002 | (JP) | ............................. 2002-221900 |

(51) Int. Cl.
 *H04N 5/225* (2006.01)
(52) U.S. Cl. ...................................... 348/340; 348/374
(58) Field of Classification Search ................ 348/374; 257/433; 310/323.06
See application file for complete search history.

(56) References Cited

U.S. PATENT DOCUMENTS

| 4,387,973 A | * | 6/1983 | Martin .......................... 359/507 |
| 4,441,796 A | | 4/1984 | Shaw |
| 4,841,387 A | | 6/1989 | Rindfuss |
| 4,896,217 A | | 1/1990 | Miyazawa et al. |
| 4,920,420 A | | 4/1990 | Sano et al. |
| 4,929,072 A | * | 5/1990 | Fujie et al. .................. 359/507 |

(Continued)

FOREIGN PATENT DOCUMENTS

JP    57-078032 A    5/1982

(Continued)

OTHER PUBLICATIONS

Takizawa et al., U.S. Appl. No. 10/300,688, filed Nov. 20, 2002.*

*Primary Examiner*—Ngoc-Yen Vu
*Assistant Examiner*—Richard M. Bemben
(74) *Attorney, Agent, or Firm*—Frishauf, Holtz, Goodman & Chick, P.C.

(57) ABSTRACT

A camera is provided which includes a dust-proofing member that has a substantially circular or polygonal plate-shape, and that includes a transparent portion at an area having at least a predetermined length in a radial direction from the center thereof, the transparent portion being opposed to the front of the optical device at a predetermined interval. A member for vibration is annularly arranged at a peripheral portion of the dust-proofing member, and applies vibrations to the dust-proofing member. And a sealing structure is arranged to constitute a space portion that is substantially sealed at a portion formed by opposing the image pick-up device and the dust-proofing member by sealing the space portion at peripheral portions of the image pick-up device and the dust-proofing member.

60 Claims, 46 Drawing Sheets

U.S. PATENT DOCUMENTS

| | | | |
|---|---|---|---|
| 4,998,800 A | 3/1991 | Nishida et al. | |
| 5,170,288 A | 12/1992 | Imaizumi et al. | |
| 5,227,888 A | 7/1993 | Haga | |
| 5,760,528 A * | 6/1998 | Tomikawa | 310/323.02 |
| 5,910,700 A | 6/1999 | Crotzer | |
| 5,995,279 A | 11/1999 | Ogino et al. | |
| 6,031,998 A | 2/2000 | Shono | |
| 6,078,438 A * | 6/2000 | Shibata et al. | 359/819 |
| 6,157,781 A | 12/2000 | Konno et al. | |
| 6,163,340 A | 12/2000 | Yasuda | |
| 6,564,018 B2 | 5/2003 | Melman et al. | |
| 6,583,819 B2 * | 6/2003 | Ito et al. | 348/335 |
| 6,778,325 B2 | 8/2004 | Osawa | |
| 7,006,138 B2 * | 2/2006 | Kawai | 348/340 |
| 2001/0053288 A1 | 12/2001 | Ito et al. | |
| 2001/0055072 A1 * | 12/2001 | Mogamiya et al. | 348/335 |
| 2002/0171751 A1 | 11/2002 | Ohkawara | |
| 2003/0202114 A1 | 10/2003 | Takizawa et al. | |
| 2003/0218685 A1 | 11/2003 | Kawai | |
| 2004/0012714 A1 * | 1/2004 | Kawai | 348/374 |
| 2004/0090549 A1 | 5/2004 | Takizawa et al. | |

FOREIGN PATENT DOCUMENTS

| | | | |
|---|---|---|---|
| JP | 58-152201 A | | 9/1983 |
| JP | 59-006399 U | | 1/1984 |
| JP | 62-165127 A | | 7/1987 |
| JP | 63-009970 A | | 1/1988 |
| JP | 63-114166 A | | 5/1988 |
| JP | 63-131498 U | | 8/1988 |
| JP | 01-230016 A | | 9/1989 |
| JP | 02-001699 A | | 1/1990 |
| JP | 2-065369 U | | 5/1990 |
| JP | 02-132860 A | | 5/1990 |
| JP | 03-244281 A | | 10/1991 |
| JP | 4-047769 A | | 2/1992 |
| JP | 04-104918 A | | 4/1992 |
| JP | 4-116478 A | | 10/1992 |
| JP | 05-167051 A | | 7/1993 |
| JP | 05-213286 A | | 8/1993 |
| JP | 6-214142 A | | 8/1994 |
| JP | 07-151946 | * | 6/1995 |
| JP | 07-151946 A | | 6/1995 |
| JP | 7-222068 A | | 8/1995 |
| JP | 07-322153 A | | 12/1995 |
| JP | 08-079633 | * | 3/1996 |
| JP | 08-079633 A | | 3/1996 |
| JP | 09-130654 A | | 5/1997 |
| JP | 2809133 A | | 7/1998 |
| JP | 10-268129 A | | 10/1998 |
| JP | 11-8421 A | | 1/1999 |
| JP | 11-284246 A | | 10/1999 |
| JP | 2000-28887 A | | 1/2000 |
| JP | 2000-029132 | * | 1/2000 |
| JP | 2000-029132 A | | 1/2000 |
| JP | 2000-066021 A | | 3/2000 |
| JP | 2000-124519 A | | 4/2000 |
| JP | 2000-330054 A | | 11/2000 |
| JP | 2001-298640 A | | 10/2001 |
| JP | 2001-345392 A | | 12/2001 |
| JP | 2001-358974 A | | 12/2001 |
| JP | 2001-359287 A | | 12/2001 |
| JP | 2002-050751 A | | 2/2002 |
| JP | 2002-107612 A | | 4/2002 |
| JP | 2002-204379 A | | 7/2002 |
| JP | 2002-229110 A | | 8/2002 |
| JP | 2003-333391 A | | 11/2003 |

* cited by examiner

CAMERA AND IMAGE PICK-UP DEVICE UNIT HAVING AN OPTICAL MEMBER THAT IS VIBRATED TO REMOVE DUST

This application claims the benefit of Japanese Applications

No. 2002-145248 filed on May 20, 2002,

No. 2002-145251 filed on May 20, 2002,

No. 2002-145252 filed on May 20, 2002,

No. 2002-145258 filed on May 20, 2002,

No. 2002-152945 filed on May 27, 2002,

No. 2002-153019 filed on May 27, 2002, and No. 2002-221900 filed on Jul. 30, 2002, the entire contents of which are incorporated herein by reference.

BACKGROUND OF THE INVENTION

1. Field of the Invention

The present invention relates to an image pick-up device unit having an image pick-up device for obtaining an image signal corresponding to light irradiated on its photoelectrically converting surface and a camera having the image pick-up device unit. More specifically, the present invention relates to a camera, such as an interchangeable single-lens reflex digital camera, having a dust-proofing construction of the image pick-up device and an image pick-up device unit used for the camera.

2. Description of the Related Art

Recently, digital cameras such as a so-called digital still camera or a digital video camera (hereinafter, referred to as a digital camera or simply referred to as a camera) are generally put into practical use and are widespread. In the digital cameras, a subject image formed based on beams from a subject (hereinafter, referred to as subject beams), which are transmitted through a photographing optical system (also referred to as a photographing lens) is formed onto a photoelectrically converting surface of a solid image pick-up device arranged at a predetermined position, such as a CCD (Charge Coupled Device, hereinafter, simply referred to as an image pick-up device). Further, an electrical image signal or the like representing a desired subject image is generated by using an photoelectrically converting action of the image pick-up devices. A signal based on the image signal and the like are outputted to a predetermined display device such as an LCD (Liquid Crystal Display) and an image or the like is displayed. The image signal or the like generated by the image pick-up device is recorded to a predetermined recording area of a predetermined recording medium as predetermined-format image data. Further, the image data recorded to the recording medium is read and the image data is converted to become an image signal which is optimal for a display using the display device. Thereafter, an image corresponding thereto is displayed based on the processed image signal.

In general, digital cameras have an optical finder device for observing a desired subject prior to photographing, and for setting a photographing range including the subject.

In general, a so-called single-lens reflex finder device is used as the optical finder device. In this single-lens reflex finder device, the advancing direction of the subject beams transmitted through the photographing optical system is bent by using a reflecting member arranged on the optical axis of the photographing optical system such that the subject image for observation is formed at a predetermined position. On the other hand, upon a photographing operation, the reflecting member is evacuated from the optical axis of the photographing optical system, thereby guiding the subject beams onto a light receiving surface of the image pick-up device, that is, onto a photoelectrically converting surface thereof and forming the subject image for photographing on the photographically converting surface.

Furthermore, recently, a so-called interchangeable lens digital camera having the single-lens reflex finder device is generally put into practical use. In the interchangeable lens digital camera, the photographing optical system is detachable from a camera main body, and a plurality of types of photographing optical systems are selectively used in the single-camera main body by arbitrarily detaching and exchanging a desired photographing optical system in accordance with user's desire.

In the above-mentioned interchangeable lens digital camera, dust and the like floating in the air possibly enter the camera main body upon detaching the photographing optical system from the camera main body. Various mechanisms which are mechanically operated such as a shutter and a stop mechanism are arranged in the camera main body and thus, dangerously, the dust may interfere with the various mechanisms during the operation.

Upon detaching the photographing optical system from the camera main body, the light receiving surface (also referred to as the photoelectrically converting surface) of the image pick-up device arranged in the rear of the photographing optical system is exposed in the ambient air of the camera. Therefore, dust and the like adhere to the photoelectrically converting surface of the image pick-up device due to electrostatic charge action and the like.

Related art, for example, Japanese Unexamined Patent Application Publication No. 2000-29132 has proposed a technology for suppressing the adhesion of dust and the like to the light receiving surface of the image pick-up device due to the electrostatic charge action.

Means disclosed in Japanese Unexamined Patent Application Publication No. 2000-29132 suppresses the adhesion of dust and the like onto the light receiving surface of the image pick-up device due to the electrostatic charge action by providing a transparent electrode on the surface of a cover member for covering the light receiving surface of the image pick-up device provided in the camera and by applying to the transparent electrode a DC voltage or an AC voltage of several KHz to 20 kHz.

The means for neutralizing electric charges generated by the image pick-up device according to the above publication suppresses the adhesion of dust and the like onto the light receiving surface of the image pick-up device due to static electricity.

On the other hand, as the image pick-up device in the conventional digital cameras, a packaged image pick-up device (e.g., referred to as a packaged CCD) is widely used. In addition to the above-mentioned image pick-up device, recently, the supply of a so-called bare CCD chip is proposed.

For example, Japanese Unexamined Patent Application Publication No. 9-130654 discloses means for shaking off dust and the like which are adhered to the photoelectrically converting surface by providing a member for vibration such as a piezoelectric element between the bare chip CCD and a substrate on which the bare chip CCD is placed and by applying a predetermined voltage to the member for vibration because the dusts and the like are adhered onto the photoelectrically converting surface in the bare chip CCD in many cases.

Further, for example, Japanese Unexamined Patent Application Publication No. 2001-298640 proposes means for removing dust and the like adhered to the surface of an optical member such as a low-pass filter arranged in front of the image pick-up device in conventional interchangeable lens digital cameras.

The camera disclosed in Japanese Unexamined Patent Application Publication No. 2001-298640 comprises a wiper member as means for removing dust and the like adhered to the surface of the optical member arranged in front of the image pick-up device.

The wiper member grinds the surface of the optical member such as the low-pass filter and moves on the surface, thereby shaking off dust on the surface of the optical member, removing dust and the like adhered to the surface of the optical member. The dust and the like brushed off by the wiper are put into a groove portion of a camera main body, which is formed near the optical member.

However, the means disclosed in Japanese Unexamined Patent Application Publication No. 2000-29132 suppresses the adhesion of dust and the like by neutralizing electric charges of the charged image pick-up device. Consequently, the means is not optimal for removing dust which is adhered to the photoelectrically converting surface of the image pick-up device, irrespective of the static electricity.

Various factors are considered, for example, the adhesion of dust due to electrostatic force and the adhesion of dust independent of the electrostatic force. Further, the size of the adhered dust particles varies.

Moreover, the means disclosed in Japanese Unexamined Patent Application Publication No. 9-130654 cannot be optimal for applying to the image pick-up device such as the packaged CCD generally used for the conventional digital cameras because the means is devised in view of the bare chip CCD.

In other words, when the means disclosed in Japanese Unexamined Patent Application Publication No. 9-130654 is applied to the general packaged CCD or the like, vibrations to the image pick-up device or the package are applied. Thus, it is likely that the vibrating operation adversely influences various mechanisms arranged near the image pick-up device, for example, by causing the deterioration of mechanisms and the occurrence of errors.

Furthermore, the means disclosed in Japanese Unexamined Patent Application Publication No. 2001-298640 needs the wiper member and another member, such as a driving motor, for driving the wiper member. The arrangement of the members requires space in the camera. Therefore, there is a problem that the camera itself is increased in scale.

SUMMARY OF THE INVENTION

Accordingly, it is a first object of the present invention to provide a camera and an image pick-up device unit used for the camera, in which the structure is simplified, mechanical accuracy is stably ensured, and a manufacturing process is simplified by devising the structure of a dust-proofing mechanism arranged for removing dust and the like adhered to an optical member arranged in the camera.

Further, it is a second object of the present invention to provide an image pick-up device unit and a camera using the image pick-up device unit, in which means for removing dust, etc. adhered to an optical member provided in the camera further improves a dust-proofing action and the increase in size of the camera having the dust-proofing means is suppressed.

Furthermore, it is a third object of the present invention to provide a camera having a member for vibration for reducing the amount of dust, etc. adhered to a surface of a dust-proofing member provided therein, and an image pick-up device unit used for the camera having the structure for improving the adhering force for adhering a member for vibration to the dust-proofing member.

In addition, it is a fourth object of the present invention to provide an image pick-up device unit having a structure such that a process for adhering the member for vibration to the dust-proofing member is simplified and the camera using the image pick-up device unit.

In addition, it is a fifth object of the present invention to provide a camera and an image pick-up device unit used for the camera, in which the structure is simplified, mechanical accuracy is stably ensured, and a manufacturing process is simplified by devising the structure of a dust-proofing mechanism for removing dust, etc. adhered to an optical member provided in the camera.

In addition, it is a sixth object of the present invention to provide a camera having means for vibration which removes dust, etc. adhered to a surface of a dust-proofing member provided therein and an image pick-up device unit used for the camera, wherein the adhesion of dust, etc. to the dust-proofing member hardly occurs irrespective of adhering factors and size of the dust particles, etc. and, even if dust particles, etc. are adhered, they are removed by slightly applying vibrations by using the member for vibration.

In addition, it is a seventh object of the present invention to provide a camera using an image pick-up device unit having a dust-proofing member for sealing and protecting a photoelectrically converting surface of an image pick-up device and a member for vibration for applying vibrations with a predetermined amplitude to the dust-proofing member, and the image pick-up device unit used for the camera, wherein the member for vibration applies stronger vibrating force with a simple structure, and the dust, etc. adhered to a surface of the dust-proofing member are removed easily and surely.

In addition, it is an eighth object of the present invention to provide a camera having a dust-proofing member arranged at a predetermined position in front of an image pick-up device and a member for vibration for vibrating the dust-proofing member and an image pick-up device unit used for the camera, wherein a part of a sealing structure surely supports the dust-proofing member without inhibiting vibrations of the dust-proofing member caused by the member for vibration.

Briefly, according to a first aspect of the invention, a camera comprises: an image pick-up device which obtains an image signal corresponding to beams irradiated onto a photoelectrically converting surface thereof; a dust-proofing member having a substantially circular or polygonal plate-shape, and comprising a transparent portion at an area having at least a predetermined length in a radial direction from the center thereof, the transparent portion being opposed to the front side of the image pick-up device at a predetermined interval; a member for vibration which is annularly arranged at a peripheral portion of the dust-proofing member, which applies vibrations to the dust-proofing member; a sealing structure arranged at a portion formed by opposing the image pick-up device and the dust-proofing member, which seals a space portion that is substantially sealed at peripheral portions of the image pick-up device and the dust-proofing member; and an image signal processing circuit which converts an image signal obtained from the image pick-up device, corresponding to an image formed onto the photoelectrically converting surface of the image pick-up device, into a signal suitable to recording.

According to a second aspect of the invention, an image pick-up device unit comprises: an image pick-up device which obtains an image signal corresponding to beams irradiated onto a photoelectrically converting surface thereof; an optical member which is opposed to the front side of the image pick-up device at a predetermined interval; a member for vibration which is arranged at a peripheral portion of the optical member so as to surround valid beams incident on the photoelectrically converting surface, and which applies vibrations to the optical member; and a sealing structure which is arranged at a portion formed by opposing the image pick-up device and the optical member, and which seals a space portion that is substantially sealed at peripheral portions of the image pick-up device and the optical member.

According to a third aspect of the invention, a camera comprises: an image pick-up device which obtains an image signal corresponding to beams irradiated onto a photoelectrically converting surface thereof; a plate-shaped optical member which is arranged to be opposed to the front side of the image pick-up device at a predetermined interval, and which has at least three linear axes of symmetry; a member for vibration which is arranged at a peripheral portion of the optical member, and which applies vibrations to the optical member; and a sealing structure which is arranged at a portion formed by opposing the image pick-up device and the optical member, and which seals a space portion that is substantially sealed at peripheral portions of the image pick-up device and the optical member.

The above-mentioned and other objects and benefits of the present invention will be obvious from the following detailed description.

That is, according to the present invention, there are provided the camera and the image pick-up device unit used for the camera, in which the structure is simplified, mechanical accuracy is stably ensured, and the manufacturing process is simplified by devising the structure of the dust-proofing mechanism arranged for removing dusts and the like adhered to the optical member arranged in the camera.

Further, according to the present invention, there are provided the image pick-up device unit and the camera using the image pick-up device unit, in which the means for removing dust, etc. adhered to the optical member provided in the camera further improves the dust-proofing operation and the increase in side of the camera having the dust-proofing means is suppressed.

Furthermore, according to the present invention, there are provided the camera having the member for vibration for reducing dusts, etc. adhered to the surface of the dust-proofing member provided therein, and the image pick-up device unit used for the camera having the structure for improving adhering force for adhering the member for vibration to the dust-proofing member.

In addition, according to the present invention, there are provided the image pick-up device unit having the structure in which the process for adhering the member for vibration to the dust-proofing member is simplified and the camera using the image pick-up device unit.

In addition, according to the present invention, there are provided the camera and the image pick-up device unit used for the camera, in which the structure is simplified, mechanical accuracy is stably ensured, and the manufacturing process is simplified by devising the structure of the dust-proofing mechanism for removing dust, etc. adhered to the optical member provided in the camera.

In addition, according to the present invention, there is provided the camera, in particular, a digital camera in which the adhesion of dust, etc. onto the photoelectrically converting surface of the image pick-up device is sufficiently prevented and the dust, etc. adhered to an outer surface of the dust-proofing member for sealing or protecting the image pick-up device is surely removed.

In addition, according to the present invention, there are provided the camera using the image pick-up device unit having the dust-proofing member for sealing and protecting the photoelectrically converting surface of the image pick-up device and the member for vibration for applying vibrations with the predetermined amplitude to the dust-proofing member, and the image pick-up device unit used for the camera, wherein the member for vibration which applies stronger vibrating force with the simple structure and the dust, etc. adhered to the surface of the dust-proofing member are removed easily and surely.

In addition, according to the present invention, there is provided the camera having the dust-proofing member which is arranged at the predetermined position in front of the image pick-up device, the member for vibration for vibrating the dust-proofing member and the image pick-up device unit used for the camera. In the image pick-up device, a part of the sealing structure surely supports the dust-proofing member without inhibiting vibrations of the dust-proofing member caused by the member for vibration.

DESCRIPTION OF THE PREFERRED EMBODIMENTS

First, a description is given of the schematic structure of the camera according to the first embodiment of the present invention.

Figure 1:
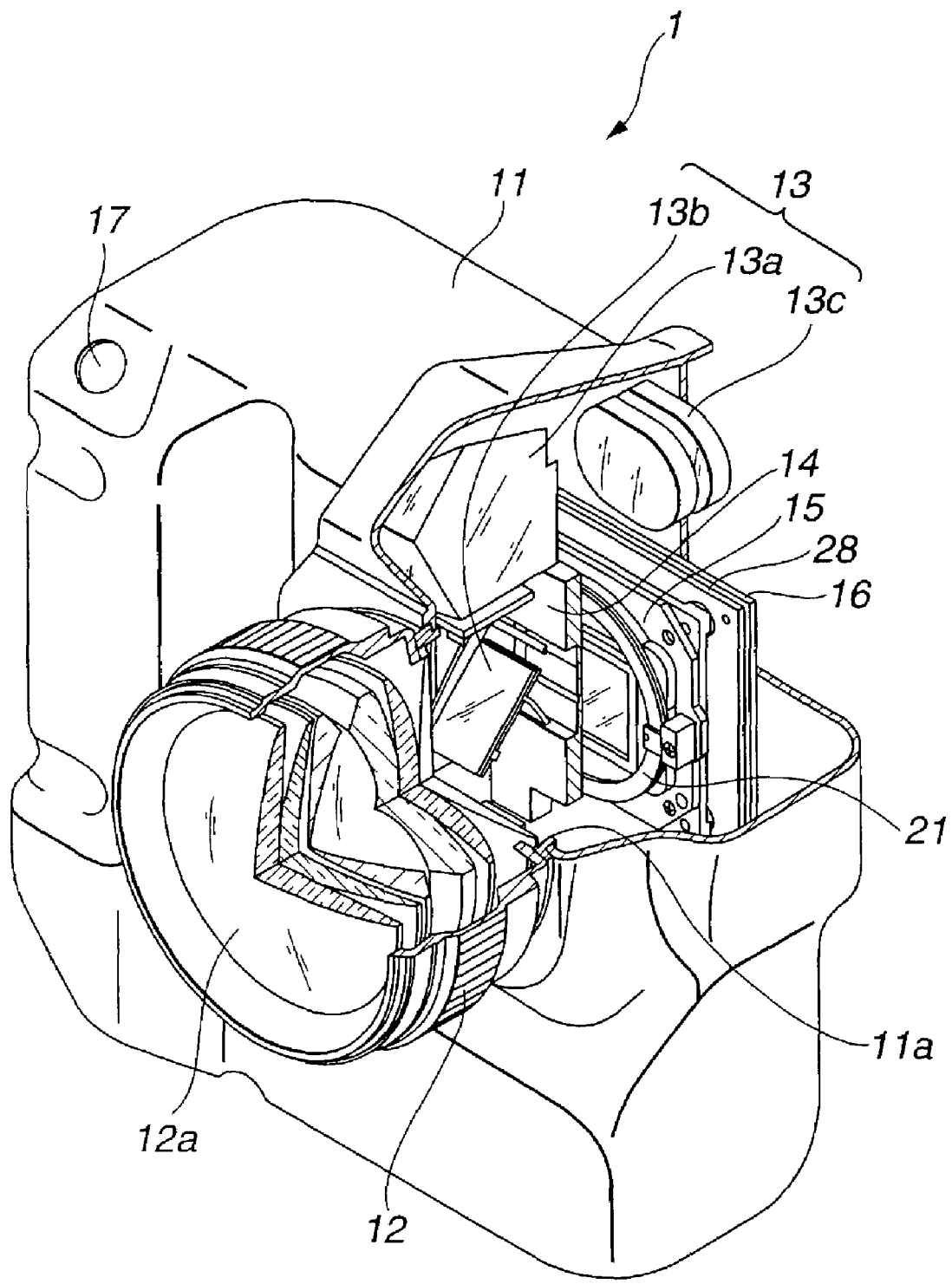
FIG. 1 is a perspective view schematically showing the internal structure of a camera by cutting off a part of the camera according to a first embodiment of the present invention.
Figure 2:
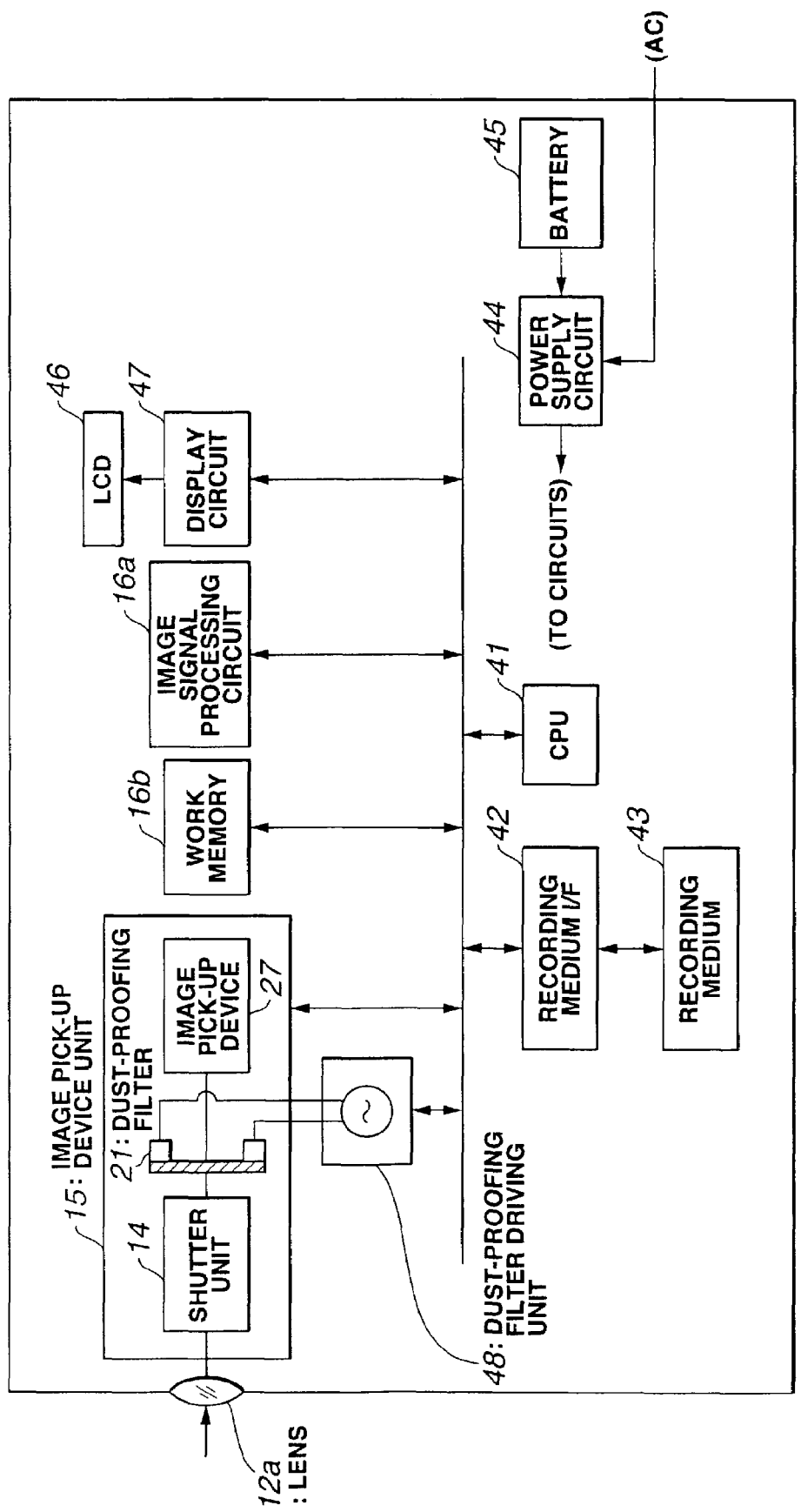
FIG. 2 is a block diagram schematically showing the main electrical structure of the camera shown in FIG. 1.

FIGS. 1 and 2 are diagrams showing the schematic structure of the camera according to the first embodiment of the present invention. FIG. 1 is a perspective view schematically showing the internal structure of a cut-off part of the camera, and FIG. 2 is a block diagram schematically showing mainly the electrical structure of the camera.

According to the first embodiment, a camera 1 comprises a camera main body unit 11 and a lens barrel 12 which are provided independently. The camera main body unit 11 and the lens barrel 12 are detachable from each other.

The lens barrel 12 holds a photographing optical system (photographing lenses) 12a comprising a plurality of lenses and a driving mechanism of the lenses. The photographing optical system 12a comprises a plurality of optical lenses through which subject beams are transferred so as to form the subject image generated by the subject beams at a predetermined position (on a photoelectrically converting surface of an image pick-up device 27, which will be described later). The lens barrel 12 is projected toward the front side of the camera main body unit 11.

The lens barrel 12 is a common one used in conventional cameras. Therefore, a description of the detailed structure is omitted.

The camera main body unit 11 is a so-called single-lens reflex camera comprising various members therein, and further having a photographing optical system attaching unit (referred to as a photographing lens attaching unit) 11a in front thereof as a connecting member for detachably the lens barrel 12 for holding the photographing optical system 12a.

In other words, an opening for exposure having a predetermined diameter for guiding the subject beams into the camera main body unit 11 is formed substantially in the center in front of the camera main body unit 11. The photographing optical system loading unit 11a is formed at a peripheral portion of the opening for exposure.

The above-mentioned photographing optical system loading unit 11a is arranged in front of an outer-surface side of the camera main body unit 11. In addition, various operating members for operating the camera main body unit 11, e.g., a release button 17 and the like for generating an instruction signal to start the photographing operation are arranged at predetermined positions on an upper-surface portion or a back-surface portion of the other-surface side of the camera main body unit 11. Since the operating members do not directly relate to the present invention, a description and an illustration of the operating members except for the release button 17 are omitted for the purpose of preventing the complication of the drawing.

Referring to FIG. 1, in the camera main body unit 11, various members are arranged at predetermined positions. For example, the camera main body unit 11 comprises: a finder device 13 forming a so-called observation optical system which is provided for forming a desired subject image formed by the photographing optical system 12a at a predetermined position different from that on the photoelectrically converting surface of an image pick-up device 27 (refer to FIG. 2); a shutter unit 14 having a shutter mechanism and the like for controlling an irradiation time and the like of the subject beams onto the photoelectrically converting surface of the image pick-up device 27; an image pick-up device unit 15 as an assembly of the image pick-up device 27, including the shutter unit 14, for obtaining an image signal corresponding to the subject image formed based on the subject beams which are transmitted through the photographing optical system 12a, and a dust-proofing filter 21 (which will be described in detail later) having optical members, etc., as a dust-proofing member for preventing the adhesion of dust and the like to the photoelectrically converting surface of the image pick-up device 27, arranged at a predetermined position in front of the photoelectrically converting surface; and a plurality of circuit boards (only a main circuit board 16 is illustrated in FIG. 1) such as a main circuit board 16 on which various electrical members forming an electrical circuit, e.g., an image signal processing circuit 16a (refer to FIG. 2) for performing various signal processing to the image signal obtained by the image pick-up device 27, are mounted.

The finder device 13 comprises a reflecting mirror 13b for bending and guiding an optical axis of the subject beams transmitted through the photographing optical system 12a to an observation optical system side, a roof prism 13a for receiving the beams outputted from the reflecting mirror 13b to form an erecting image, an ocular lens 13c for enlarging the image formed by the roof prism 13a to form an image optimal for observation.

The reflecting mirror 13b is movable between a position evacuated from the optical axis of the photographing optical system 12a and a predetermined position on the optical axis, and is arranged at a predetermined angle, e.g., 45° with respect to the optical axis of the photographing optical system 12a in a normal state. Thus, the optical axis of the subject beams transmitted through the photographing optical system 12a is bent by the reflecting mirror 13b when the camera 1 is in the normal state, and is reflected to the roof prism 13a arranged at an upper position of the reflecting mirror 13b.

Upon executing the photographing operation of the camera 1, the reflecting mirror 13b is moved to a predetermined position evacuated from the optical axis of the photographing optical system 12a during the actual exposure operation. Consequently, the subject beams are guided to the image pick-up device 27 side and irradiate the photoelectrically converting surface.

The shutter unit 14 uses a focal plane type shutter mechanism, driving circuit for controlling the operation of the shutter mechanism, etc. which are similar to those generally used in the conventional cameras. Therefore, a description of the detailed structure is omitted.

Incidentally, referring to FIG. 1, a member shown by reference numeral 28 is an image pick-up device fixing plate 28 which fixes and supports the image pick-up device 27 (which will be described in detail later).

As mentioned above, a plurality of circuit boards are arranged in the camera 1, and form various electrical circuits. Referring to FIG. 2, as the electrical structure, the camera 1 comprises: a CPU 41 as an overall control circuit for controlling the entire camera 1; the image signal processing circuit 16a for performing various signal processing such as signal processing for converting the image signal obtained by the image pick-up device 27 into a signal suitable to a recording format; a work memory 16b for temporarily recording the image signal processed by the image signal processing circuit 16a, image data, and various information associated therewith; a recording medium 43 for recording the image data used for recording in a predetermined format generated by the image signal processing circuit 16a to a predetermined area; a recording medium interface 42 for electrically connecting the recording medium 43 to the electrical circuits of the camera 1; a display unit 46 comprising a liquid crystal display device (LCD) for displaying the image; a display circuit 47 for electrically connecting the display unit 46 to the camera 1, receiving the image signal processed by the image signal processing circuit 16a, and generating an image signal optimal to the display operation by using the display unit 46; a battery 45 comprising a secondary battery such as a dry cell; a power supply circuit 44 for receiving power from the battery 45 or from external power supply (AC) supplied by a predetermined connection cable (not shown), controlling the power to match the operation of the camera 1, and supplying electricity to the electrical circuits; a dust-proofing member driving unit 48 as the electrical circuit for driving the dust-proofing filter 21 included in the image pick-up device unit 15, comprising an oscillator, and the like.

Next, a detailed description is given of the image pick-up device unit 15 in the camera 1 according to the first embodiment.

Figure 3:
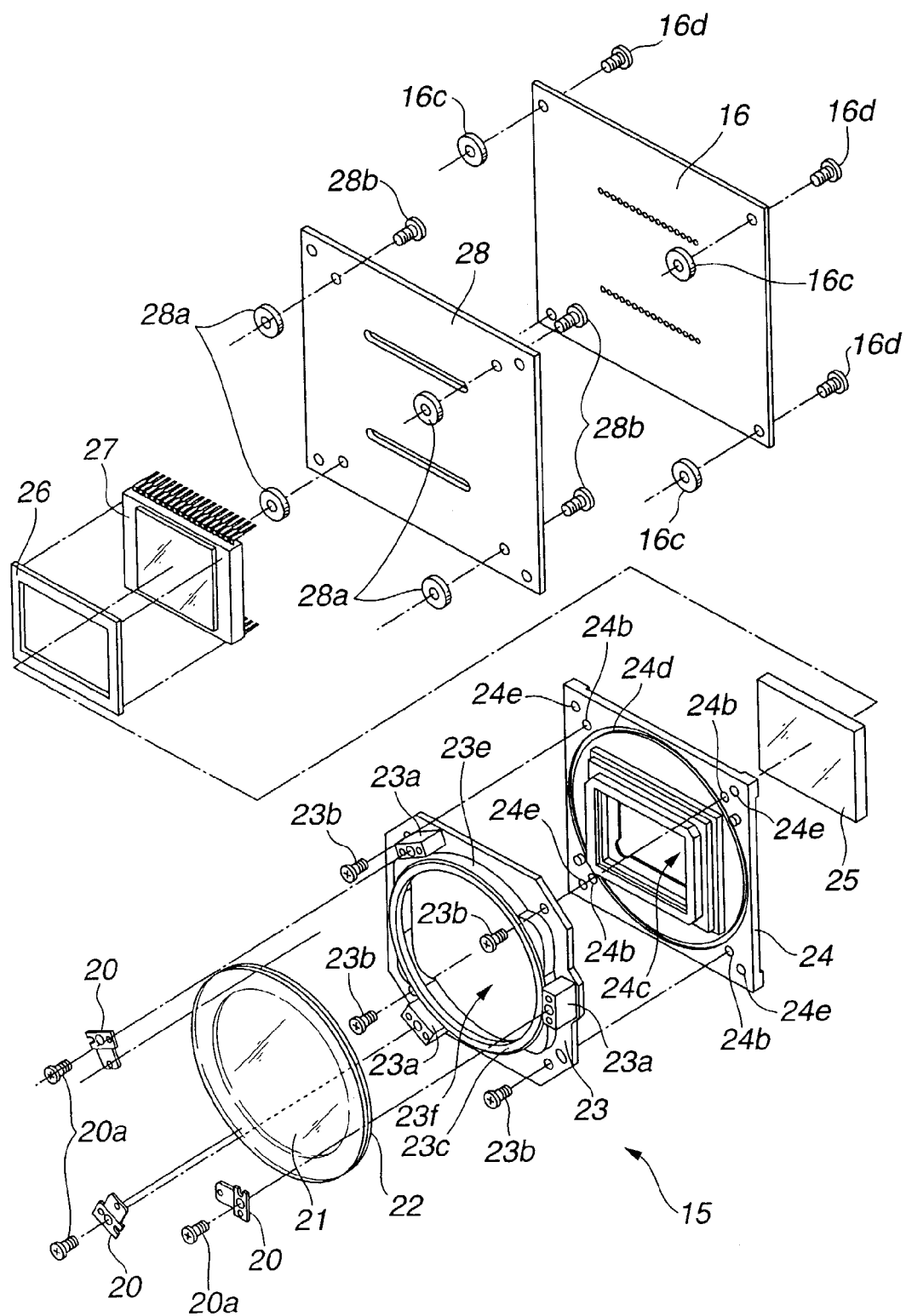
FIG. 3 is a diagram showing by extracting a part of an image pick-up device unit in the camera shown in FIG. 1 and a main exploded perspective view showing the disassembled image pick-up device unit.
Figure 4:
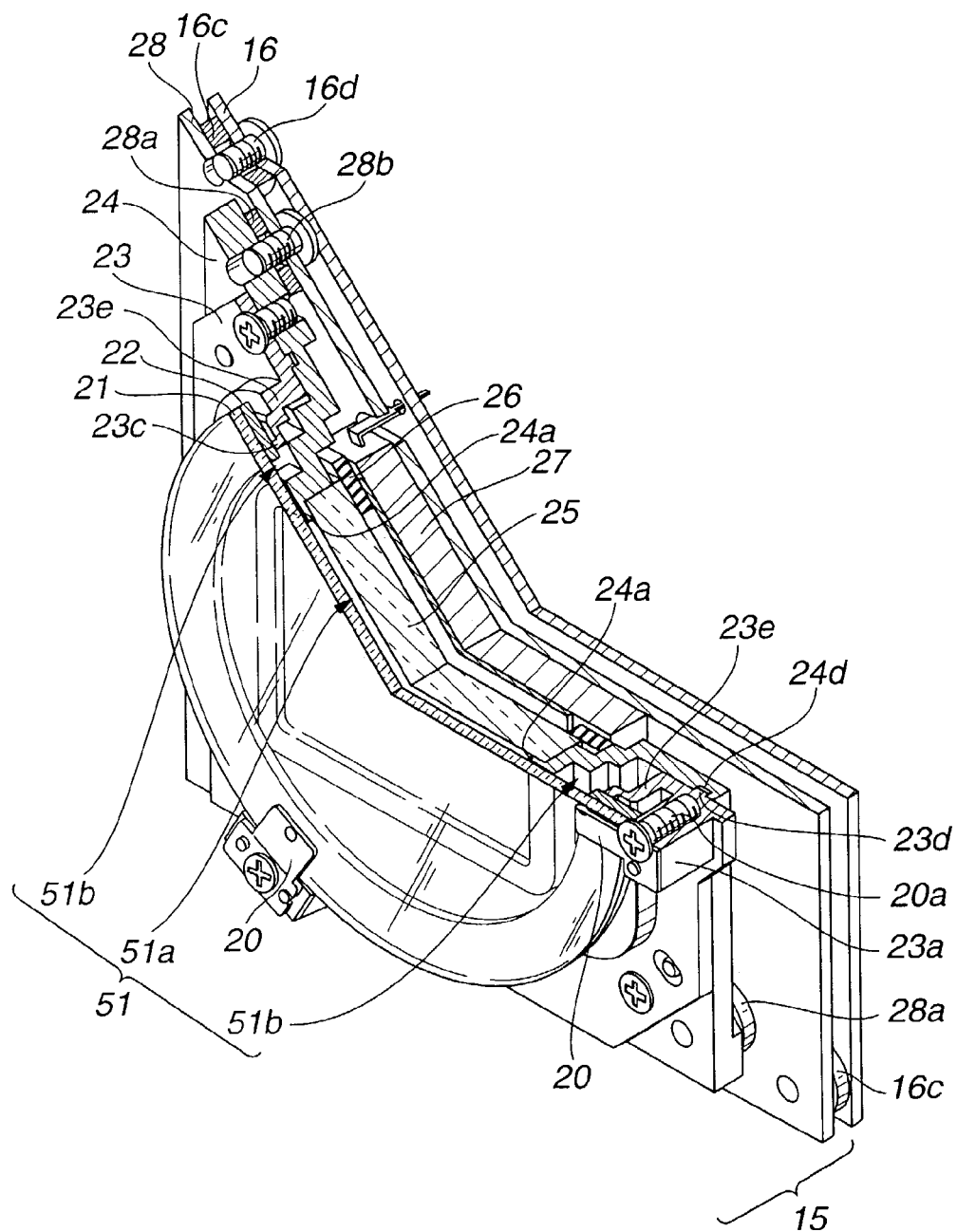
FIG. 4 is a perspective view showing a cut-off part of the assembled image pick-up device unit in the camera shown in FIG. 1.
Figure 5:
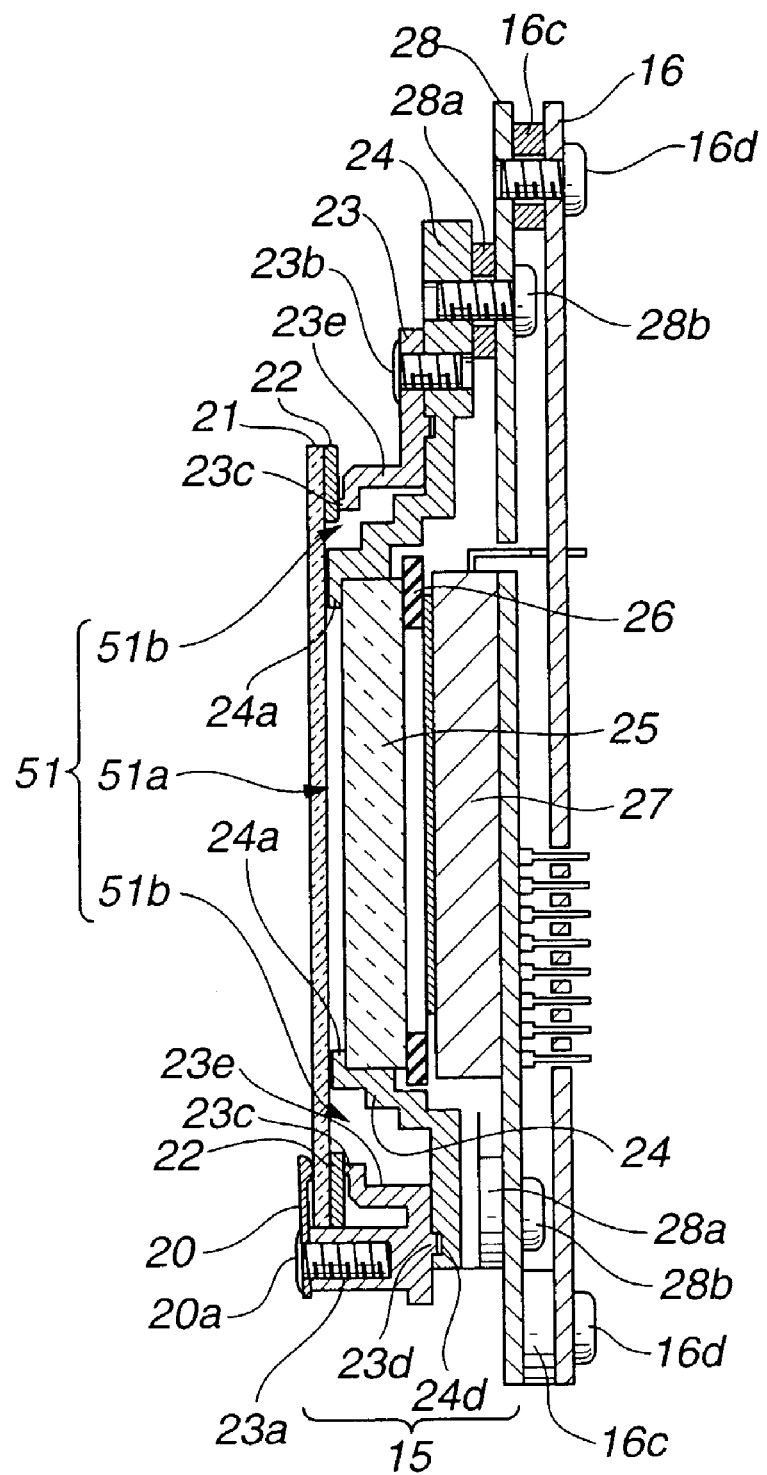
FIG. 5 is a sectional view along a cut-off plane of FIG. 4.

FIGS. 3 to 5 are diagrams showing by extracting a part of the image pick-up device unit in the camera 1 according to the first embodiment. FIG. 3 is a main-part exploded perspective view showing the schematic structure of the disassembled image pick-up device unit. FIG. 4 is a perspective view showing a cut-off part of the assembled image pick-up device unit. FIG. 5 is a sectional view along a cut-off plane shown in FIG. 4.

According to the first embodiment, as mentioned above, the image pick-up device unit 15 in the camera 1 is a unit comprising a plurality of members including the shutter unit 14. However, referring to FIGS. 3 to 5, the main portion is only shown and an illustration of the shutter unit 14 is omitted.

Referring to FIGS. 3 to 5, for the purpose of showing a positional relationship of the members, being the image pick-up device 27 loaded and provided near the image pick-up device unit 15, the main circuit board 16 on which the image pick-up system electrical circuits comprising the image signal processing circuit 16a and the work memory 16b are mounted is illustrated.

The main circuit board 16 is a main circuit board of the type generally used in conventional cameras, and a detailed description thereof is omitted.

The image pick-up device unit 15 comprises: the image pick-up device 27 comprising the CCD and the like, which obtains the image signal corresponding to the light transmitted through the photographing optical system 12a (refer to FIG. 1) and irradiated to the photoelectrically converting surface thereof; the image pick-up device fixing plate 28 comprising a thin-sheet member for fixing and supporting the image pick-up device 27; an optical low-pass filter (hereinafter, referred to as an optical LPF) 25 arranged on the photoelectrically converting surface side of the image pick-up device 27, as an optical device which is formed to remove high frequency components from the subject beams transmitted and irradiated through the photographing optical system 12a; a low-pass filter supporting member 26 provided in the periphery between the optical LPF 25 and the image pick-up device 27, which is made of substantially frame-shaped elastic members; an image pick-up device accommodating case member 24 (hereinafter, referred to as a CCD case 24) which accommodates, fixes, and holds the image pick-up device 27, supports the optical LPF 25 (optical device) in contact with a peripheral portion or an adjacent portion of the optical LPF 25, and which is arranged so as to come into close contact with a dust-proofing filter supporting member 23 constituting a part of a sealing structure, which will be described later, at a predetermined portion; the dust-proofing filter supporting member 23 which comes into contact with a dust-proofing filter 21 (dust-proofing member) arranged in front of the CCD case 24 at a peripheral portion or an adjacent portion thereof and supports it; the dust-proofing filter 21 as an optical member and a dust-proofing member, opposed and arranged to the front of the optical LPF 25 at a predetermined position and at a predetermined interval on the photoelectrically converting surface side of the image pick-up device 27, which is supported by the dust-proofing filter supporting member 23; a member for vibration 22 substantially annularly arranged to a surface opposed to the image pick-up device 27 at a peripheral portion of the dust-proofing filter 21, for applying predetermined vibrations to the dust-proofing filter 21; a pressing member 20 comprising an elastic member which airtightly joints the dust-proofing filter 21 to the dust-proofing filter supporting member 23, and the like.

The image pick-up device 27 obtains the image signal corresponding to the subject image formed onto the photoelectrically converting surface thereof by receiving the subject beams transmitted through the photographing optical system 12a onto the photoelectrically converting surface thereof and by performing photoelectrically converting processing, and uses, e.g., a CCD (Charge Coupled Device).

The image pick-up device 27 is mounted at a predetermined position on the main circuit board 16 via the image pick-up device fixing plate 28 interposed therebetween. As mentioned above, the image signal processing circuit 16a, the work memory 16b, etc. are mounted on the main circuit board 16 so that an output signal from the image pick-up device 27, that is, the image signal obtained by the photoelectrically converting processing is electrically transmitted to the image signal processing circuit 16a and the like.

The signal processing in the image signal processing circuit 16a includes various signal processing, for example, processing in which the image signal obtained from the image pick-up device 27 is converted, by the photographing optical system 12a held in the lens barrel 12 loaded to the photographing optical system loading unit 11a, into a signal matching the recording, corresponding to the image formed onto the photoelectrically converting surface of the image pick-up device 27. The above-mentioned signal processing is the same as processing for treating a digital image signal, which is generally performed in conventional digital cameras. Therefore, a detailed description of various signal processing which is usually executed in the camera 1 is omitted.

The optical LPF 25 is arranged in front of the image pick-up device 27 via the low-pass filter supporting member 26 interposed therebetween. The CCD case 24 is arranged to cover the optical LPF 25.

That is, an opening 24c which is rectangular-shaped is provided substantially in the center of the CCD case 24. The optical LPF 25 and the image pick-up device 27 are arranged behind the opening 24c. Referring to FIGS. 4 and 5, a step portion 24a whose cross section is substantially L-shaped is formed at an inner peripheral portion of the back side of the opening 24c.

As mentioned above, the low-pass filter supporting member 26 made of the elastic member or the like is arranged between the optical LPF 25 and the image pick-up device 27. In the peripheral portion in front of the image pick-up device 27, the low-pass filter supporting member 26 is arranged within a valid range of the photoelectrically converting surface, in other words, at a position for evacuating the valid beams incident on the image pick-up device 27, and is abutted onto an adjacent portion of the periphery behind the optical LPF 25. The airtightness is substantially held between the optical LPF 25 and the image pick-up device 27. Thus, elastic force generated by the low-pass filter supporting member 26 acts to the optical LPF 25 in the optical axis direction.

Then, the peripheral portion in front of the optical LPF 25 airtightly comes into contact with the step portion 24a of the CCD case 24. Thus, the position of the optical LPF 25 in the optical axis direction is regulated against the elastic force which is generated by the low-pass filter supporting member 26 and, which displaces the optical LPF 25 in the optical axis direction.

In other words, the optical LPF 25 inserted from the back side in the opening 24c of the CCD case 24 is subjected to the position regulation in the optical direction by using the step portion 24a. Consequently, it is possible to prevent the optical LPF 25 from breaking away from the inside of the CCD case 24 to the front side.

As mentioned above, after inserting the optical LPF 25 in the opening 24c of the CCD case 24 from the back side, the image pick-up device 27 is arranged on the back side of the optical LPF 25. In this case, the low-pass filter supporting member 26 is sandwiched between the optical LPF 25 and the image pick-up device 27 in the peripheral portion of the low-pass filter supporting member 26.

Further, as mentioned above, the image pick-up device 27 is mounted on the main circuit board 16 via the image pick-up device fixing plate 28 interposed. The image pick-up device fixing plate 28 is fixed to a screw hole 24e from the back of the CCD case 24 via a spacer 28a interposed by a screw 28b. The main circuit board 16 is fixed to the image pick-up device fixing plate 28 via a spacer 16c interposed by a screw 16d.

In front of the CCD case 24, the dust-proofing filter supporting member 23 is fixed to the screw hole 24b of the CCD case 24 by a screw 23b. In this case, a circumferential groove 24d is substantially annularly formed at a predetermined position in front of the CCD case 24 in the peripheral side thereof, as will be described in detail in FIGS. 4 and 5. On the other hand, at a predetermined position on the back and the peripheral side of the dust-proofing filter supporting member 23, an annular convex portion 23d (not shown in FIG. 3) corresponding to the circumferential groove 24d of the CCD 24 is formed throughout the circumference with a substantially annular shape. By fitting the annular convex portion 23d to the circumferential groove 24d, the CCD case 24 is airtightly fit to the dust-proofing filter supporting member 23 in an annular area, that is, in an area in which the circumferential groove 24d and the annular convex portion 23d are formed.

The dust-proofing filter 21 is an optical member which is circularly or polygonally plate-shaped as a whole, and which includes a transparent portion at least at an area having a predetermined length in a radial direction from the center of the dust-proofing filter 21. The transparent portion is an optical member which is opposed and arranged to the front of the optical LPF 25 at a predetermined interval. Further, the transparent portion is formed such that the valid beams incident on the photoelectrically converting surface of the image pick-up device 27 from the photographing optical system 12a (photographing lens) can be transmitted.

At the peripheral portion of one surface of the dust-proofing filter 21 (at the back thereof according to the first embodiment), the predetermined member for vibration 22 for vibrating the dust-proofing filter 21 is integrally formed, by using adhering means such as an adhesive.

The member for vibration 22 comprises a vibrating device, or an electromechanical transducer, a piezoelectric element, or piezoelectric ceramics with an annular shape. Predetermined vibrations are generated in the dust-proofing filter 21 by externally applying a predetermined driving voltage to the member for vibration 22.

The dust-proofing filter 21 is fixed and held by the pressing member 20 made of the elastic member such as a plate-shaped spring so as to airtightly joint to the dust-proofing filter supporting member 23.

A circular or polygonal opening 23f is provided substantially in the center of the dust-proofing filter supporting member 23. Through the opening 23f, the subject beams which are transmitted through the photographing optical system 12a pass, and the opening 23f has a size large enough to irradiate the photoelectrically converting surface of the image pick-up device 27 arranged at the back.

A wall portion 23e (refer to FIGS. 4 and 5) projecting toward the front side is substantially annularly formed at a peripheral portion of the opening 23f. Further, a supporting portion 23c is formed such that it projects towards the front side at the distal end of the wall portion 23e.

A plurality of (three, according to the first embodiment) projecting portions 23a with a substantially rectangular shape are formed to project toward the front side, near an outer peripheral portion in front of the dust-proofing filter supporting member 23. The projecting portions 23a are portions formed to fix the pressing member 20 for fixing and holding the dust-proofing filter 21. The pressing member 20 is fixed by fastening means such as fixing screws 20a to the distal portion of the projecting portions 23a. That is, the projecting portions 23a are supporting members for attaching the pressing member 20.

The pressing member 20 is a member made of the elastic member such as a plate spring, and a proximal end portion of the pressing member 20 is fixed to the projecting portions 23a. Further, a free end portion thereof is abutted on an outer peripheral portion of the dust-proofing filter 21, thereby pressing the dust-proofing filter 21 toward the side of the dust-proofing filter supporting member 23, that is, in the optical axis direction.

In this case, a predetermined portion of the member for vibration 22 arranged at the outer peripheral portion at the back of the dust-proofing filter 21 is abutted to the supporting portion 23c, thereby regulating the positions of the dust-proofing filter 21 and the member for vibration 22 in the optical axis direction. Therefore, the dust-proofing filter 21 is fixed and held to airtightly be jointed to the dust-proofing filter supporting member 23 via the member for vibration 22 interposed.

In other words, the dust-proofing filter supporting member 23 is airtightly jointed to the dust-proofing filter 21 via the member for vibration 22 interposed by pressing force generated by the pressing member 20.

As mentioned above, with respect to the dust-proofing filter supporting member 23 and the CCD case 24, the circumferential groove 24d and the annular convex portion 23d (refer to FIGS. 4 and 5) are airtightly fixed. Further, the dust-proofing filter supporting member 23 is airtightly jointed to the dust-proofing filter 21 via the member for vibration 22 interposed by the pressing force generated by the pressing member 20.

The optical LPF 25 arranged to the CCD case 24 is airtightly arranged between the peripheral portion in front of the optical LPF 25 and the step portion 24a of the CCD case 24. Further, the image pick-up device 27 is arranged at the back of the optical LPF 25 via the low-pass filter supporting member 26 interposed. The airtightness is substantially held between the optical LPF 25 and the image pick-up device 27.

Therefore, in a space formed by opposing the optical LPF 25 and the dust-proofing filter 21, a predetermined void portion 51a is formed. A space portion 51b is formed on the peripheral side of the optical LPF 25, that is, formed by the CCD case 24, the dust-proofing filter supporting member 23, and the dust-proofing filter 21. The space portion 51b is a sealed space formed projecting toward the outside of the optical LPF 25 (refer to FIGS. 4 and 5). Further, the space portion 51b is set to be wider than the void portion 51a. A space containing the void portion 51a and the space portion 51b constitutes a sealing space 51 which is substantially airtightly sealed by the CCD case 24, the dust-proofing filter supporting member 23, the dust-proofing filter 21, and the optical LPF 25 as mentioned above.

As mentioned above, according to the first embodiment, the image pick-up device unit 15 in the camera includes the sealing structure which seals the sealing space 51 (space portion) having the portion (void portion 51a) formed by opposing the image pick-up device 27 and the dust-proofing filter 21 and having the space portion 51b that is substantially sealed at the peripheries of the optical LPF 25 and the dust-proofing filter 21. The sealing structure is arranged to the outside from the peripheral portion or the adjacent portion of the optical LPF 25.

Namely, according to the first embodiment, the sealing structure comprises the dust-proofing filter 21, the member for vibration 22, the dust-proofing filter supporting member 23 for supporting the dust-proofing filter 21 (and the member for vibration 22) in contact with the peripheral portion or the adjacent portion thereof, the CCD case 24 which supports the optical LPF 25 in contact with the peripheral portion or the adjacent portion thereof and which is arranged airtightly in contact with the dust-proofing filter supporting member 23 at the predetermined portion of the CCD case 24, and the pressing member 20 which presses the dust-proofing filter 21 (and the member for vibration 22) to the dust-proofing filter supporting member 23.

According to the first embodiment, in the camera with the above-mentioned structure, the dust-proofing filter 21 is opposed at a predetermined position to the front of the image pick-up device 27, and the sealing space 51 at the peripheries of the photoelectrically converting surface of the image pick-up device 27 and the dust-proofing filter 21 is sealed. Consequently, the adhesion of dust, etc. to the photoelectrically converting surface of the image pick-up device 27 is prevented.

By applying a periodic voltage to the member for vibration 22 arranged integrally with the periphery portion of the dust-proofing filter 21 and by applying predetermined vibrations to the dust-proofing filter 21, dust and the like adhered to an exposure surface in front of the dust-proofing filter 21 are removed.

Figure 6:
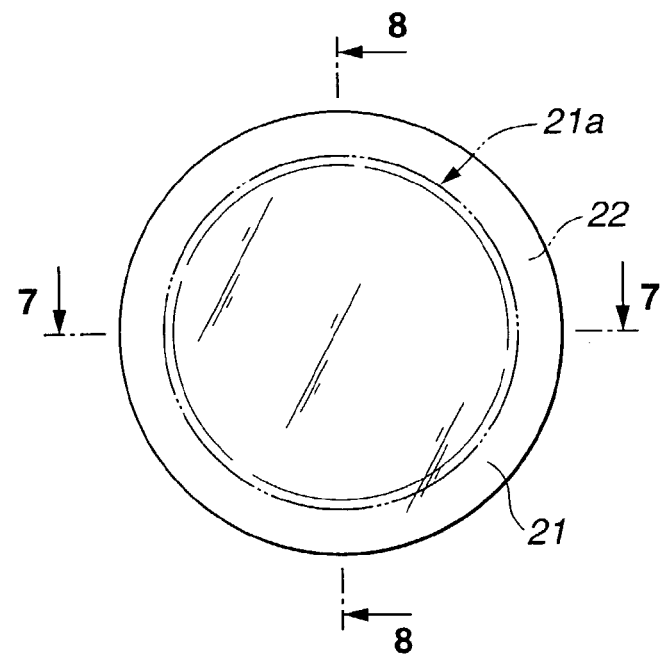
FIG. 6 is a front view showing by extracting only a dust-proofing filter and a member for vibration integrated with the dust-proofing filter in the image pick-up device unit in the camera shown in FIG. 1.
Figure 7:
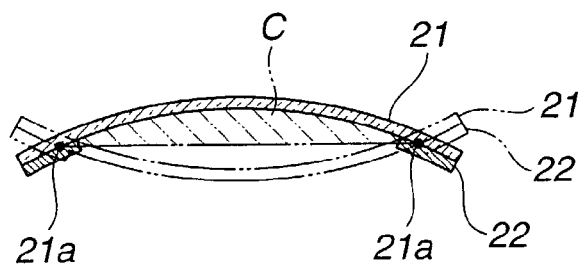
FIG. 7 is a sectional view along a line 7-7 shown in FIG. 6, showing one example of the change in status of the dust-proofing filter and the member for vibration upon applying a voltage to the member for vibration shown in FIG. 6.
Figure 8:
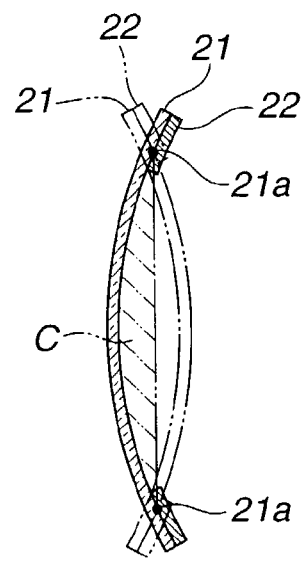
FIG. 8 is a sectional view along a line 8-8 shown in FIG. 6, showing another example of the change in status of the dust-proofing filter and the member for vibration upon applying the voltage to the member for vibration shown in FIG. 6.

FIG. 6 is a front view showing by extracting only the dust-proofing filter 21 and the member for vibration 22 arranged integrally therewith in the image pick-up device unit 15 in the camera 1. FIGS. 7 and 8 show the change in status of the dust-proofing filter 21 and the member for vibration 22 upon applying the driving voltage to the member for vibration 22 shown in FIG. 6, in which FIG. 7 is a sectional view along a line 7-7 shown in FIG. 6, and FIG. 8 is a sectional view along a line 8-8 shown in FIG. 6.

When a negative (−) voltage is applied to the member for vibration 22, the dust-proofing filter 21 is modified as shown by a solid line in FIGS. 7 and 8. On the other hand, when a positive (+) voltage is applied to the member for vibration 22, the dust-proofing filter 21 is modified as shown by a dotted line in FIGS. 7 and 8.

In this case, the amplitude is substantially equal to zero at a node upon vibrations as shown by reference symbols 21a shown in FIGS. 6 to 8. Thus, the supporting portion 23c of the dust-proofing filter supporting member 23 is abutted to a portion corresponding to the node 21a. Consequently, the dust-proofing filter 21 is efficiently supported without reducing the vibrations.

In this status, the CPU 41 controls the dust-proofing filter driving unit 48 (refer to FIG. 2) at a predetermined timing and applies the periodic voltage to the member for vibration 22, thereby vibrating the dust-proofing filter 21. Thus, it is possible to remove dust and the like which are adhered to the surface of the dust-proofing filter 21.

A resonant frequency in this case is determined depending on the plate thickness, the material, the shape and the like of the dust-proofing filter 21. In one example shown in FIGS. 6 to 8, a first-degree vibration is generated, however, the present invention is not limited to this, and a high-degree vibration may be generated.

Figure 9:
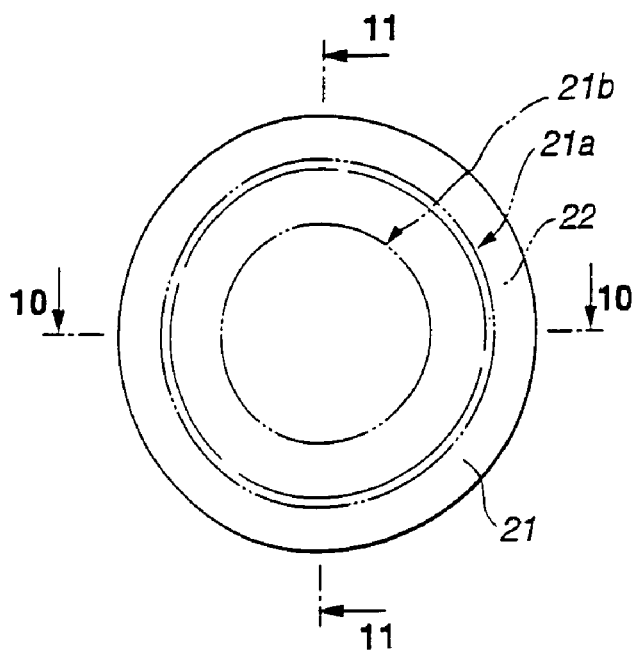
FIG. 9 is a front view showing by extracting only the dust-proofing filter and the member for vibration integrated with the dust-proofing filter in the image pick-up device unit in the camera shown in FIG. 1.
Figure 10:
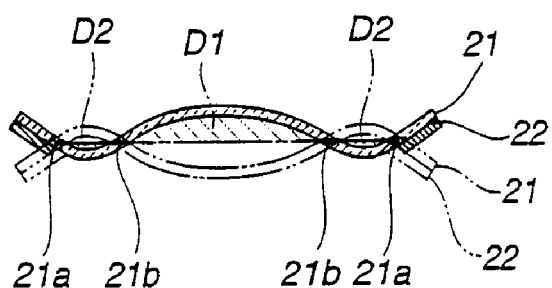
FIG. 10 is a sectional view along a line 10-10 shown in FIG. 9, showing another example of the change in status in the dust-proofing filter and the member for vibration upon applying the voltage to the member for vibration shown in FIG. 9.
Figure 11:
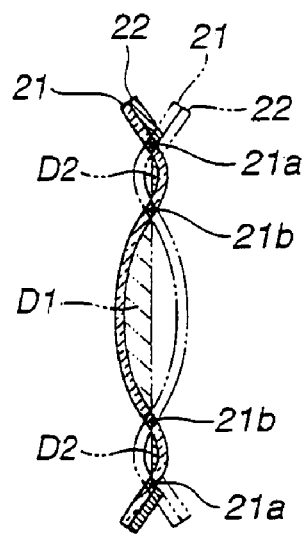
FIG. 11 is a sectional view along a line 11-11 shown in FIG. 9, showing another example of the change in status of the dust-proofing filter and the member for vibration upon applying the voltage to the member for vibration shown in FIG. 9.

In another example shown in FIGS. 9 to 11, a second-degree vibration is generated to the dust-proofing filter with the same structure as that in the example shown in FIGS. 6 to 8.

In this case, FIG. 9 is a front view showing by extracting only the dust-proofing filter 21 and the member for vibration 22 arranged integrally therewith in the image pick-up device unit 15 in the camera 1, similarly to the example shown in FIG. 6. FIGS. 10 and 11 show the change in status of the dust-proofing filter 21 and the member for vibration 22 when the voltage is applied to the member for vibration 22 shown in FIG. 9, in which FIG. 10 is a sectional view along a line 10-10 shown in FIG. 9, and FIG. 11 is a sectional view along a line 11-11 shown in FIG. 9.

Herein, when a negative (−) voltage is applied to the member for vibration 22, the dust-proofing filter 21 is modified as shown by a solid line in FIGS. 10 and 11. On the other hand, when a positive (+) voltage is applied to the member for vibration 22, the dust-proofing filter 21 is modified as shown by a dotted line in FIGS. 10 and 11.

In this case, as shown by reference symbols 21a and 21b shown in FIGS. 9 to 11, the vibration has a two pairs of nodes. By setting the supporting portion 23c of the dust-proofing filter supporting member 23 such that it is abutted to a portion corresponding to the joint 21a, the dust-proofing filter 21 is efficiently supported without reducing the vibration similarly to the above-described example shown in FIGS. 6 to 8.

In this status, the CPU 41 controls the dust-proofing filter driving unit 48 (refer to FIG. 2) at a predetermined timing and applies the periodic voltage to the member for vibration 22, thereby vibrating the dust-proofing filter 21. Thus, it is possible to remove dust and the like which are adhered to the surface of the dust-proofing filter 21.

When a first-degree vibration is generated as shown in FIGS. 6 to 8, in the sealing space 51, the amplitude of the dust-proofing filter 21 generates the change in volume shown by a reference symbol C. As shown in FIGS. 9 to 11, when a second-degree vibration is generated, the change in volume in the sealing space 51 generated by the amplitude of the dust-proofing filter 21 is obtained by subtracting an area shown by a reference symbol D2×2 from an area shown by a reference symbol D1, that is, $D1-(D2\times2)$.

The smaller the change in volume to the sealing space 51 is, the smaller the change in inner pressure in the sealing space 51 is. Therefore, it will be understood that, the smaller the change in volume of the sealing space 51 is, the more efficient vibration can be obtained. Thus, in views of the efficiency of the electromechanical transducing, it is preferable to set the generated vibration in a high-degree mode.

Preferably, the supporting portion 23c of the dust-proofing filter supporting member 23 is set at the position where it is abutted onto the node upon the vibrations of the dust-proofing filter 21. The position of the node upon the vibrations of the dust-proofing filter is varied depending on the size (thickness or diameter) of the dust-proofing filter 21 or the size of the member for vibration 22 which vibrates the dust-proofing filter 21. Therefore, the supporting portion 23c of the dust-proofing filter supporting member 23 is not always set at the position at which it is abutted onto the member for vibration 22 as shown in the case according to the first embodiment. For example, the supporting portion 23c of the dust-proofing filter supporting member 23 can be set at a predetermined position onto the surface of the dust-proofing filter 21.

As mentioned above, in the image pick-up device unit 15 of the camera 1, according to the first embodiment, the member for vibration 22 for vibrating the dust-proofing filter 21 is arranged at the peripheral portion of the dust-proofing filter 21 by the adhering means such as the adhesive.

Hereinbelow, a detailed description is given of the structures of the dust-proofing filter 21 (dust-proofing member) and the member for vibration 22 in the image pick-up device unit 15.

Figure 12:
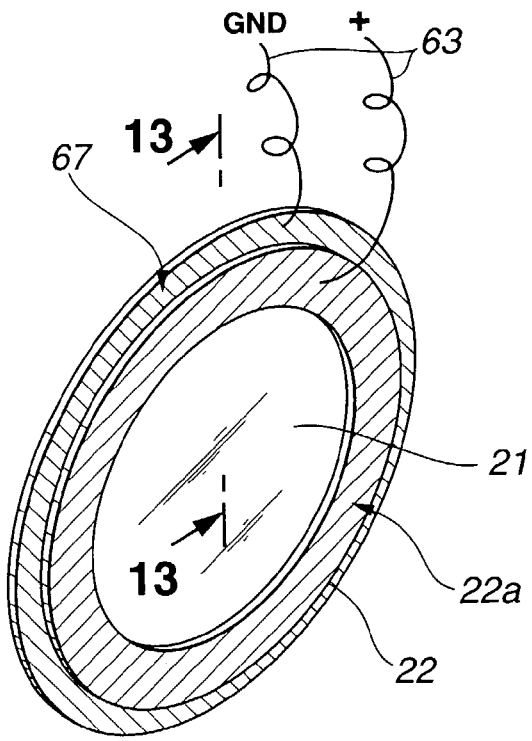
FIG. 12 is a perspective view showing the dust-proofing member to which the member for vibration is adhered in the members forming the image pick-up device unit in the camera shown in FIG. 1.
Figure 13:
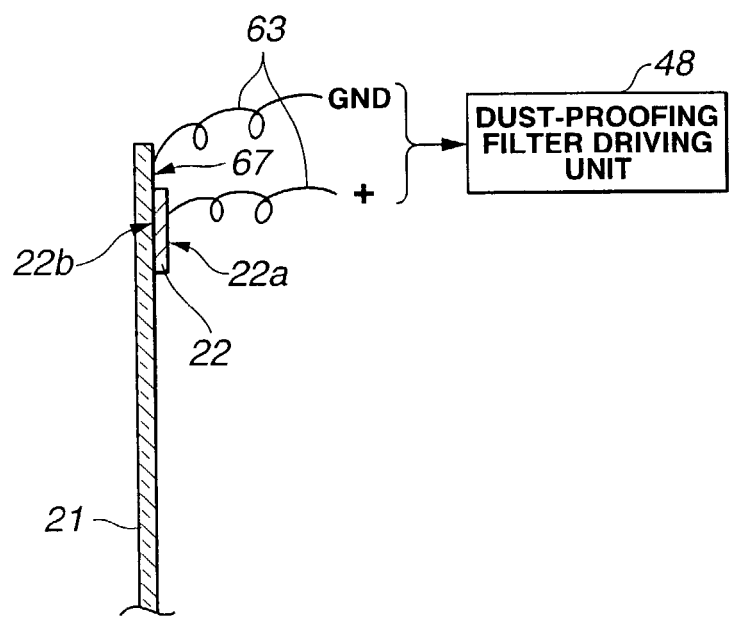
FIG. 13 is a sectional view along a line 13-13 shown in FIG. 12.

FIGS. 12 and 13 are diagrams showing by extracting a part of the image pick-up device unit in the camera according to the first embodiment of the present invention. FIG. 12 is a perspective view showing the dust-proofing member (optical member; dust-proofing filter) to which the member for vibration is adhered. FIG. 13 is a sectional view along a line 13-13 shown in FIG. 12.

The member for vibration 22 in the image pick-up device unit 15 is an electromechanical transducer made of a piezo-electric ceramics plate with a substantially circular shape. The member for vibration 22 includes a conductive member on one surface 22b which is adhered to the dust-proofing filter 21 and a conductive member on another surface, namely, a surface 22a (surface one the back side) of the reversed side of the surface 22b on the dust-proofing filter 21 side.

The surfaces 22a and 22b of the member for vibration 22 are electrically connected to the dust-proofing filter driving unit 48 by a connecting member such as leads 63. Thus, vibrations are generated by applying a periodic voltage to the member for vibration 22 and the generated vibrations cause the dust-proofing filter 21 to be vibrated for a predetermined period.

In this case, according to the first embodiment, the member for vibration 22 is adhered to the one surface of the dust-proofing filter 21 by the adhering means. Therefore, the one surface 22b of the member for vibration 22 becomes an adhering surface of the dust-proofing filter 21 and the connecting member such as the lead 63 is not connected to the conductive members provided for the other surface 22b.

Then, according to the first embodiment, the conductive thin-film such as an electrostatic charge preventing film is formed at a part or the entirety of the dust-proofing filter 21. The forming portion of the conductive thin-film is at least on the surface of the dust-proofing filter 21, and corresponds to a portion between a portion indicated by reference numeral 67 in a shaded portion in FIG. 12 and the adhering portion having the member for vibration 22 adhered. Alternatively, the conductive thin-film may be formed all over the dust-proofing filter 21.

As the electrostatic charge preventing film, a general transparent conductive film used for the optical system is applied. The transparent conductive film has the large conductivity and the high translucency in a visible area and, mainly, a visible light average transmittance is about 80% or more and the resistivity is, in many case, about $1\times10^{-3}$ Ω·cm or less.

The transparent conductive film includes a metal transparent conductive film made of Gold (Au), Silver (Ag), Platinum (Pt), etc., and an oxide semiconductor transparent conductive film made of Indium Oxide ($In_2O_3$), Tin Oxide ($SnO_2$), Zinc Oxide ($ZnO_2$), etc.

The metal transparent conductive film has a problem of the translucency and the film intensity and therefore the optical fields mainly use the oxide semiconductor transparent conductive film.

The conductive member in the member for vibration 22 is adhered in contact with the portion where the conductive thin-film of the dust-proofing filter 21 is formed. Referring to FIG. 13, the leads 63 from the dust-proofing filter driving unit 48 are connected to the portion 67 where the conductive thin-film is formed at the outermost portion of the dust-proofing filter 21 and the conductive member on the other surface 22a of the member for vibration 22. As a result, the dust-proofing filter driving unit 48 applies a predetermined voltage to the member for vibration 22. In other words, the conductive thin-films of the dust-proofing filter 21 which are formed onto the surfaces 22a and 22b of the member for vibration 22 function as electrodes of the member for vibration 22, and the conductive thin-film of the dust-proofing filter 21 connects the dust-proofing filter driving unit 48 to the member for vibration 22 as a part of a connecting member for electrical conduction from the dust-proofing filter driving unit 48 to the member for vibration 22.

Incidentally, the portion denoted by numeral 67 is enlargedly shown between the outermost portion of the dust-proofing filter 21 and the outermost portion of the member for vibration 22 in FIGS. 12 and 13 for the purpose of the emphasis of the part so as to prevent the complication of the drawing. Actually, this portion 67 may have a size only to arrange the leads 63 and is not required to be as large as shown in FIGS. 12 and 13.

As stated above, according to the first embodiment, the sealing structure is arranged to the outside the peripheral portion or the adjacent portion of the optical LPF 25. Further, the sealing structure seals the space portion 51b at the peripheries of the optical LPF 25 and the dust-proofing filter 21 so as to form the sealing space 51 which is substantially sealed, including the void portion 51a formed by opposing the optical LPF 25 (optical device) and the dust-proofing filter 21 (dust-proofing member). Thus, in the case of ensuring a predetermined volume of the space portion, an interval between the optical LPF 25 (optical device) and the dust-proofing filter 21 (dust-proofing member) is set to be short.

In general, the set short interval between the optical LPF 25 (optical device) and the dust-proofing filter 21 (dust-proofing member) causes the reduction in volume of the void portion 51a. It is well known that the vibration of the dust-proofing filter 21 by using the member for vibration 22 increases an inner pressure of the sealing space 51. However, the increase in inner pressure of the sealing space 51 inhibits the vibration of the dust-proofing filter 21 using the member for vibration 22.

On the other hand, when the interval between the optical LPF 25 (optical device) and the dust-proofing filter 21 (dust-proofing member) is set to be long, the dimension of the image pick-up device unit 15 in the optical axis direction is increased and this inhibits the reduction in size of the camera 1 in the optical axis direction.

Then, according to the first embodiment, by arranging the space portion 51b to the outside the peripheral portion or the adjacent portion of the optical LPF 25, the volume of the sealing space 51 is sufficiently assured and the increase in dimension of the image pick-up device unit 15 in the optical axis direction is suppressed without inhibiting the vibrations of the dust-proofing filter 21 using the member for vibration 22. Thus, this contributes to easy reduction in size of the camera 1 in the optical axis direction.

According to the first embodiment, by forming the conductive thin-film to a part or all over the surface of the dust-proofing filter 21, the member for vibration 22 is easily connected to the dust-proofing filter driving unit 48, in particular, the one surface 22b of the member for vibration 22 is easily connected to the dust-proofing filter driving unit 48. By this, the wiring configuration between the dust-proofing filter driving unit 48 and the member for vibration 22 is simplified and the assembling work time in the manufacturing process is reduced and the manufacturing process is simplified by the reduction in work process. In accordance therewith, this contributes to the decrease in manufacturing costs.

Further, by simplifying the dust-proofing mechanism including the dust-proofing filter 21 and the member for vibration 22, the mechanical accuracy is stably ensured without variation in manufacturing.

According to the first embodiment, the leads 63 are used as shown in FIG. 12, as the connecting means for connecting the conductive thin-film of the dust-proofing filter 21 to the dust-proofing filter driving unit 48, and for connecting the other surface 22a of the member for vibration 22 to the dust-proofing filter driving unit 48. The connecting means may comprise the leads 63 or various connecting means such as a flexible printed board.

Figure 14:
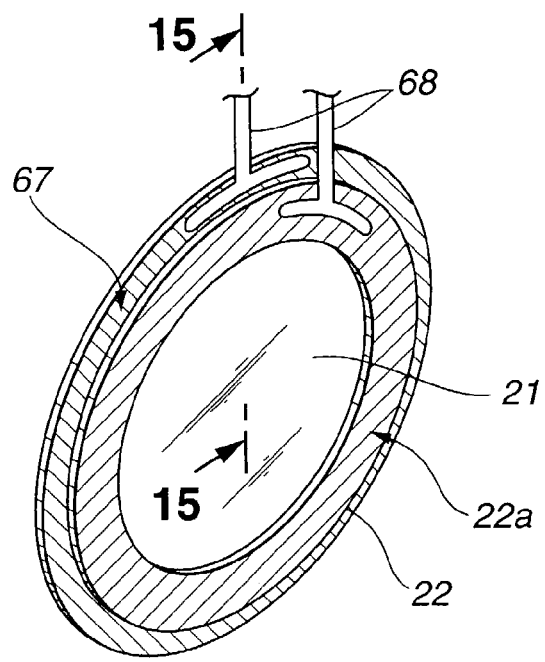
FIG. 14 is a perspective view showing by extracting a part of the members forming an image pick-up device unit in a camera according to a second embodiment of the present invention, namely showing the dust-proofing member to which the member for vibration is adhered.
Figure 15:
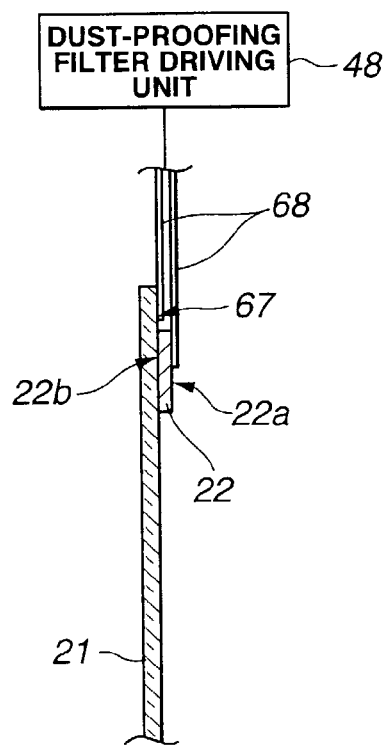
FIG. 15 is a sectional view along a line 15-15 shown in FIG. 14.

FIGS. 14 and 15 are diagrams showing by extracting a part of members forming an image pick-up device unit in a camera according to the second embodiment of the present invention. FIG. 14 is a perspective view showing a dust-proofing member (dust-proofing filter 21) to which the member for vibration 22 is adhered. FIG. 15 is a cross view along a line 15-15 shown in FIG. 14.

According to the second embodiment, unlike the structure according to the first embodiment, a flexible printed board 68 is arranged in place of the leads 63 as the connecting means according to the first embodiment. Thus, other structure is not described in detail and is referred to the first embodiment and the drawing used therefor.

According to the second embodiment, the same advantages as those according to the first embodiment are obtained.

According to the first and second embodiments, the dust-proofing member (dust-proofing filter) used for the image pick-up device unit in the camera comprises a circular or polygonal plate-shaped optical member as a whole and includes a transparent portion at least at an area having a predetermined extensity in the radial direction from the center thereof.

A piezoelectric element working as a member for vibration which applies the vibrations to the dust-proofing filter is annularly arranged at the peripheral portion of the dust-proofing filter. The piezoelectric element comprises a vibrating device such as an electromechanical transducer with a circular or polygonal shape.

Then, the dust-proofing filter and the piezoelectric element have various shapes. According to the third embodiment, an example is given of the shapes of the dust-proofing filter and the piezoelectric element.

According to the third embodiment, the structures of a camera and an image pick-up device unit are basically the same as those according to the first embodiment. In the following, FIGS. 1 to 11 used for the description of the first embodiment and the descriptions are referred to, an illustration and a detailed description thereof are omitted, and only different portions, namely, the dust-proofing filter and the piezoelectric element are described in detail.

Figure 16:
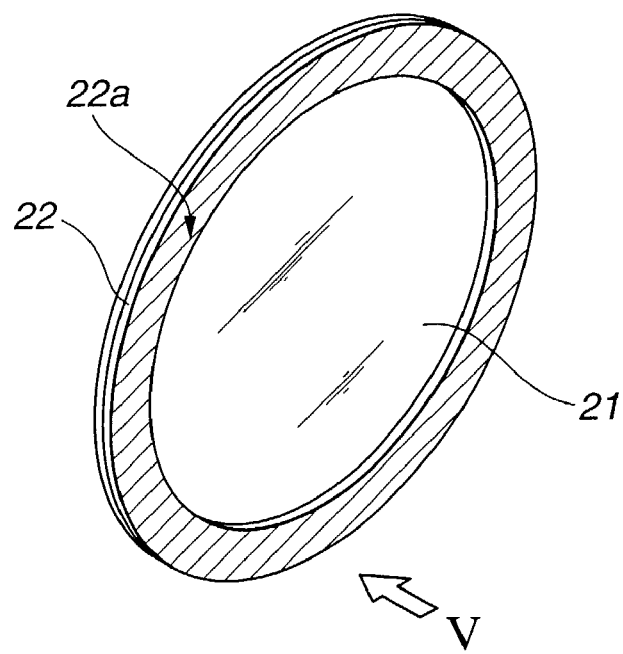
FIG. 16 is a perspective view showing a first example of the structures of a dust-proofing member and a member for vibration in an image pick-up device unit in a camera when the member for vibration is attached to the dust-proofing member according to a third embodiment of the present invention.
Figure 17:
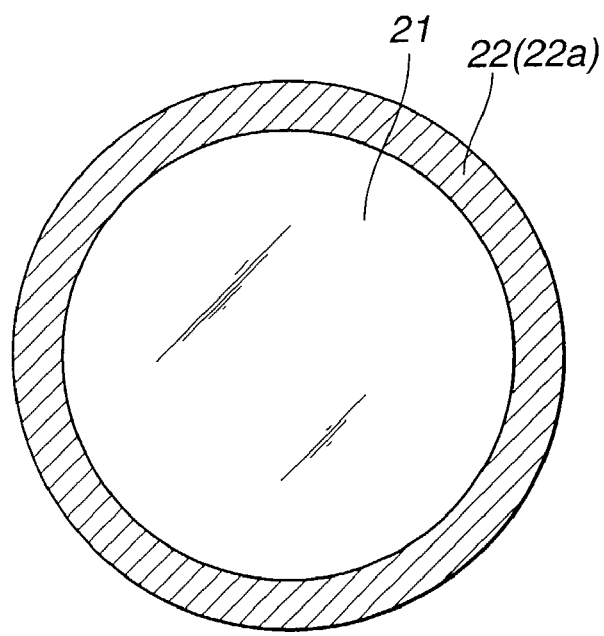
FIG. 17 is a front view seen from the direction indicated by an arrow V in FIG. 16.

FIGS. 16 and 17 are diagrams showing by extracting the dust-proofing member (optical member; dust-proofing filter) and the member for vibration in the image pick-up device unit in the camera according to the third embodiment, that is, showing a first example of the structures of the dust-proofing member and the member for vibration. FIG. 16 is a perspective view showing a status in which the member for vibration is attached to the dust-proofing member. FIG. 17 is a front view seen from the direction indicated by an arrow V in FIG. 16.

The first example shows the image pick-up device unit 15 in the camera 1 according to the first embodiment explained with reference to FIGS. 1 to 11.

That is, the first example shows the dust-proofing filter comprising a circular plate-shaped optical member 21. The circular member for vibration 22 is annularly arranged along the outer peripheral portion of the circular plate-shaped member 21.

Figure 18:
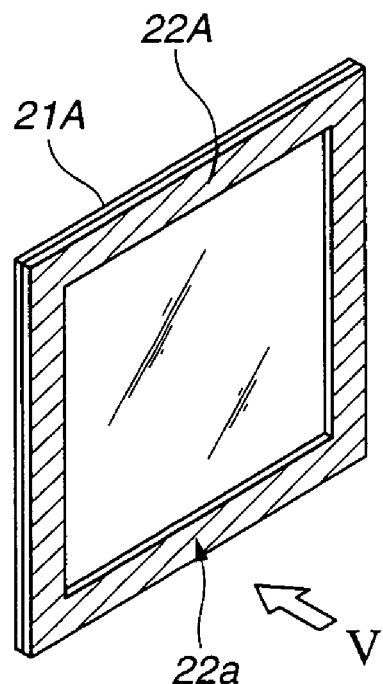
FIG. 18 is a perspective view showing a second example of the structures of the dust-proofing member and the member for vibration in the image pick-up device unit in the camera when the member for vibration is attached to the dust-proofing member according to the third embodiment of the present invention.
Figure 19:
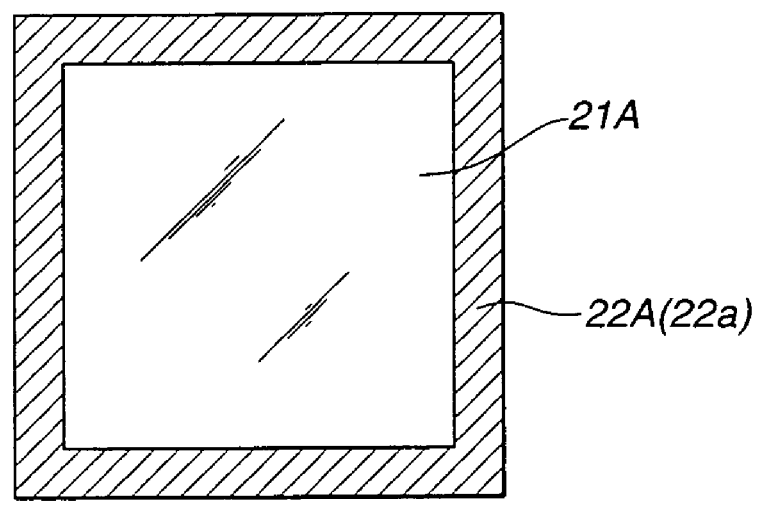
FIG. 19 is a front view seen from the direction indicated by an arrow V in FIG. 18.

FIGS. 18 and 19 are diagrams showing by extracting the dust-proofing member and the member for vibration in the image pick-up device unit in the camera according to the third embodiment, that is, showing a second example of the structures of the dust-proofing member and the member for vibration. FIG. 18 is a perspective view showing a status in which the member for vibration is attached to the dust-proofing member. FIG. 19 is a front view seen from the direction of an arrow V shown in FIG. 18.

The second example shows the dust-proofing filter comprising a square plate-shaped optical member 21A. In accordance therewith, a frame-shaped member for vibration 22A is arranged at the peripheral portion of the square plate member 21A. In this case, the frame-shaped member for vibration 22A is arranged along the outer edges of each of the sides of the square plate member 21A.

Figure 20:
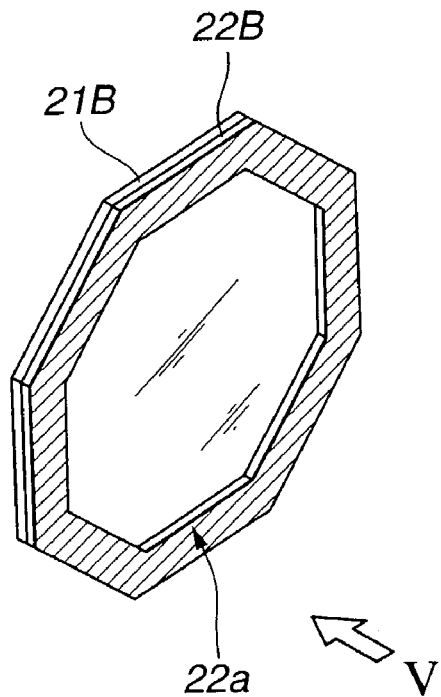
FIG. 20 is a perspective view showing a third example of the structures of the dust-proofing member and the member for vibration in the image pick-up device unit in the camera when the member for vibration is attached to the dust-proofing member according to the third embodiment of the present invention.
Figure 21:
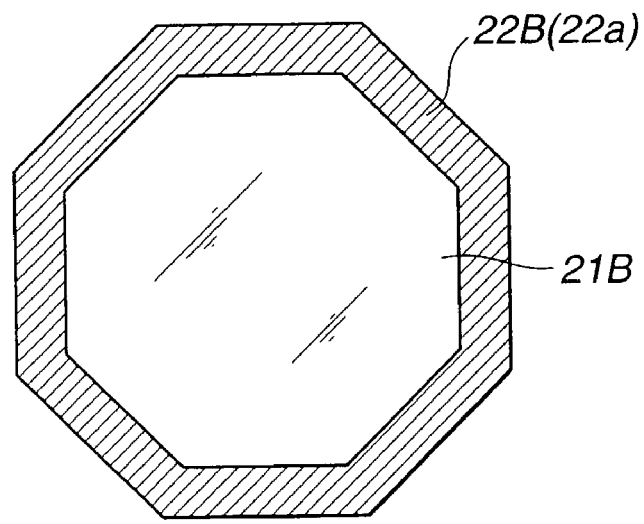
FIG. 21 is a front view seen from the direction indicated by an arrow V in FIG. 20.

FIGS. 20 and 21 are diagrams showing by extracting the dust-proofing member and the member for vibration in the image pick-up device unit in the camera according to the third embodiment, that is, showing a third example of the structures of the dust-proofing member and the member for vibration. FIG. 20 is a perspective view showing a status in which the member for vibration is attached to the dust-proofing member. FIG. 21 is a front view seen from the direction indicated by an arrow V in FIG. 20.

The third example shows the dust-proofing filter comprising a polygonal, specifically, regularly-octagonal plate-shaped optical member 21B. In accordance therewith, a polygonal member for vibration 22B is arranged at the peripheral portion of the regularly-octangonal plate member 21B. In this case, the polygonal member 22B is arranged along outer edges of each of the sides of the regularly-octagonal member 21B.

As mentioned above, in the first to third examples according to the third embodiment, the dust-proofing member comprises circular or polygonal plate-shaped optical member 21, 21A, or 21B and the member for vibration 22, 22A, or 22B is arranged along the peripheral portion. Therefore, the member for vibration 22, 22A, or 22B comprises a single member. With the above-mentioned structure, the electrode of the one surface 22a (shaded portion shown in FIGS. 16 to 21) on the member for vibration 22, 22A, or 22B is continuously arranged. The arrangement of wiring for applying a predetermined voltage to the member for vibration 22, 22A, or 22B is relatively freely set.

The piezoelectric element working as the member for vibration is not limited to the single member shown in the first to third examples and may be formed by arranging a plurality of piezoelectric elements at the peripheral portion of the dust-proofing filter 21 with an annular or frame shape. In this case, the piezoelectric element can variously be shaped, for example, can be rectangular or arcuate. Next, forth to eighth examples are shown thereof.

Figure 22:
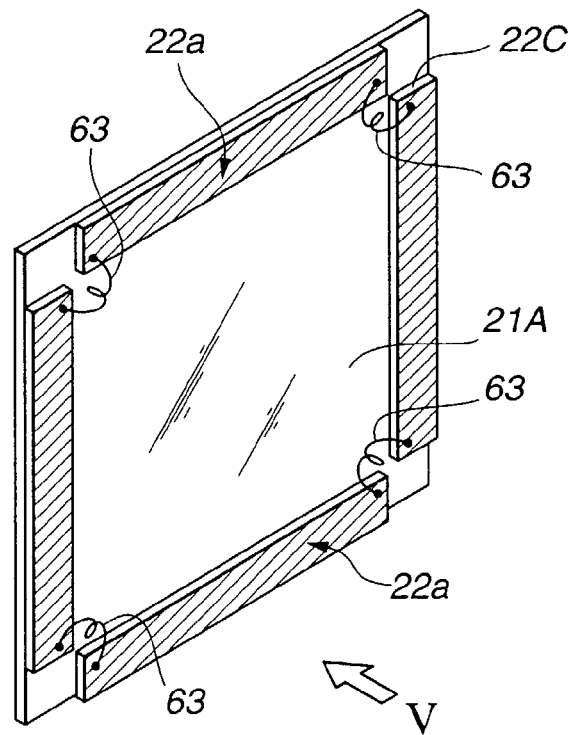
FIG. 22 is a perspective view showing a fourth example of the structures of the dust-proofing member and the member for vibration in the image pick-up device unit in the camera when the member for vibration is attached to the dust-proofing member according to the third embodiment of the present invention.
Figure 23:
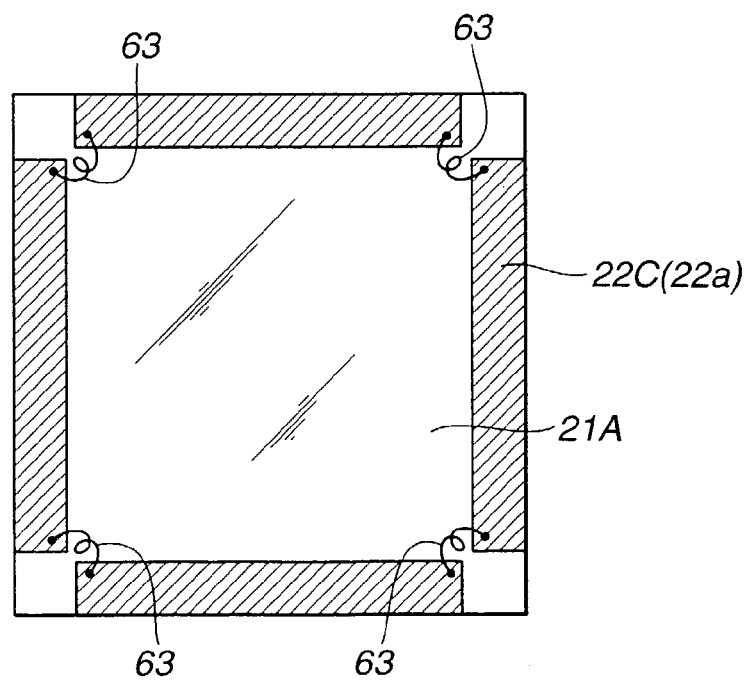
FIG. 23 is a front view seen from the direction indicated by an arrow V in FIG. 22.

FIGS. 22 and 23 are diagrams showing by extracting the dust-proofing member and the member for vibration in the image pick-up device unit in the camera according to the third embodiment, that is, showing the fourth example of the structures of the dust-proofing member and the member for vibration. FIG. 22 is a perspective view showing a status in which the member for vibration is attached to the dust-proofing member. FIG. 23 is a front view seen from the direction indicated by an arrow V in FIG. 22.

The fourth example shows the dust-proofing filter comprising the square plate-shaped optical member 21A, similarly to the second example. In accordance therewith, a rectangular member for vibration 22C is arranged to each of the sides of the square plate-shaped optical member 21A at the peripheral portion thereof. In other words, in this case, a plurality of rectangular members for vibration 22C are arranged near outer edges of the sides of the square plate member 21A. The plurality of rectangular members for vibration 22C are electrically connected by connecting members such as the leads 63, and are arranged with a substantially frame shape as a whole.

The fourth example shows the square plate-shaped optical member 21A. However, the plate-shaped optical member 21A may be rectangular as another shape, similarly to the second example.

Figure 24:
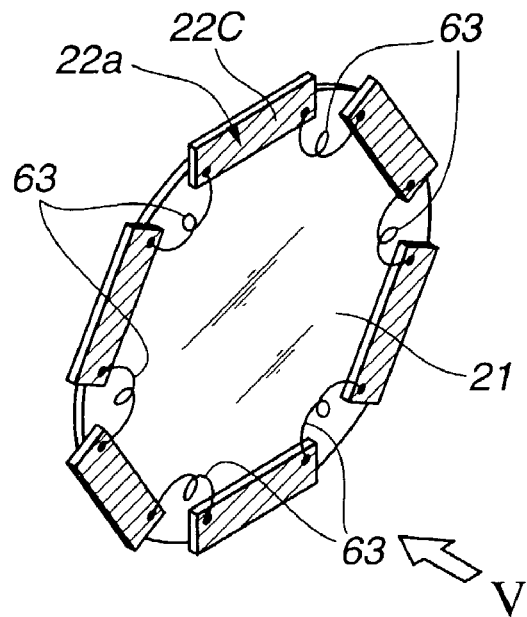
FIG. 24 is a perspective view showing a fifth example of the structures of the dust-proofing member and the member for vibration in the image pick-up device unit in the camera when the member for vibration is attached to the dust-proofing member according to the third embodiment of the present invention.
Figure 25:
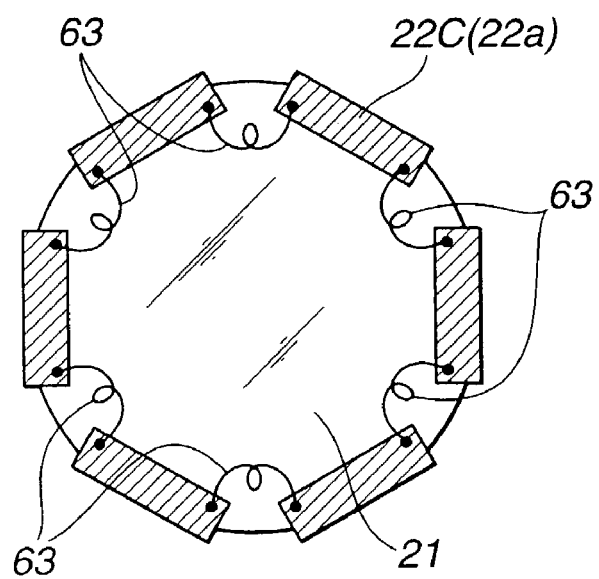
FIG. 25 is a front view seen from the direction indicated by an arrow V in FIG. 24.

FIGS. 24 and 25 are diagrams showing by extracting the dust-proofing member and the member for vibration in the image pick-up device unit in the camera according to the third embodiment, that is, showing the fifth example of the structures of the dust-proofing member and the member for vibration. FIG. 24 is a perspective view showing a status in which the member for vibration is attached to the dust-proofing member. FIG. 25 is a front view seen from the direction indicated by an arrow V in FIG. 24.

The fifth example shows the dust-proofing filter comprising a circular plate-shaped optical member 21. In accordance therewith, a plurality of rectangular members for vibration 22C are arranged at the peripheral portion of the circular plate member 21. In this case, the plurality of rectangular members for vibration 22C are arranged along the peripheral portion of the circular plate member 21. The plurality of rectangular members for vibration 22C are electrically connected by connecting members such as the leads 63. The plurality of rectangular members for vibration 22C are arranged with a substantially frame shape as a whole.

Figure 26:
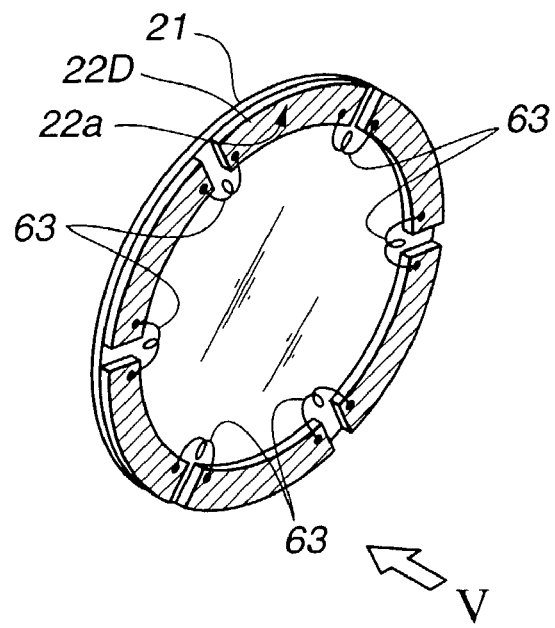
FIG. 26 is a perspective view showing a sixth example of the structures of the dust-proofing member and the member for vibration in the image pick-up device unit in the camera when the member for vibration is attached to the dust-proofing member according to the third embodiment of the present invention.
Figure 27:
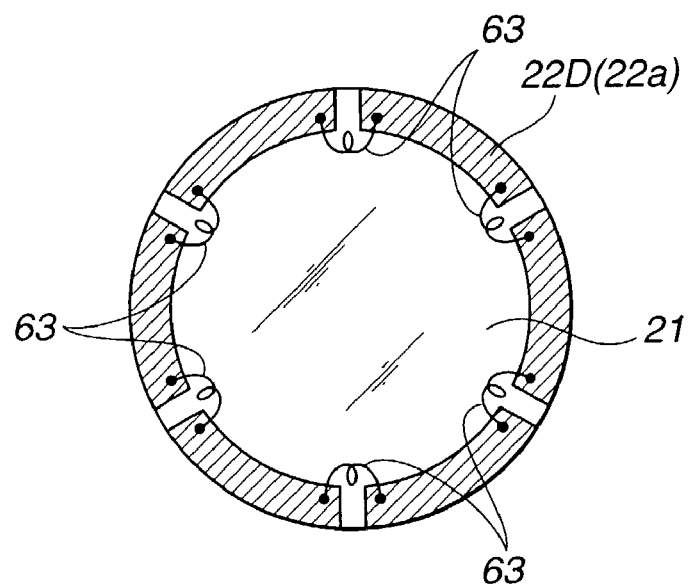
FIG. 27 is a front view seen from the direction indicated by an arrow V in FIG. 26.

FIGS. 26 and 27 are diagrams showing by extracting the dust-proofing member and the member for vibration in the image pick-up device unit in the camera according to the third embodiment, that is, showing the sixth example of the structures of the dust-proofing member and the member for vibration. FIG. 26 is a perspective view showing a status in which the member for vibration is attached to the dust-proofing member. FIG. 27 is a front view seen from the direction indicated by an arrow V in FIG. 26.

The sixth example shows the dust-proofing filter comprising a circular plate-shaped optical member 21. In accordance therewith, a plurality of arcuate members for vibration 22D are arranged at the peripheral portion of the circular plate member 21. In this case, the plurality of arcuate members for vibration 22D are arranged along the peripheral portion of the circular plate member 21. The plurality of arcuate members for vibration 22D are electrically connected by connecting members such as the leads 63. The plurality of arcuate members for vibration 22D are arranged with a substantially frame shape as a whole.

Figure 28:
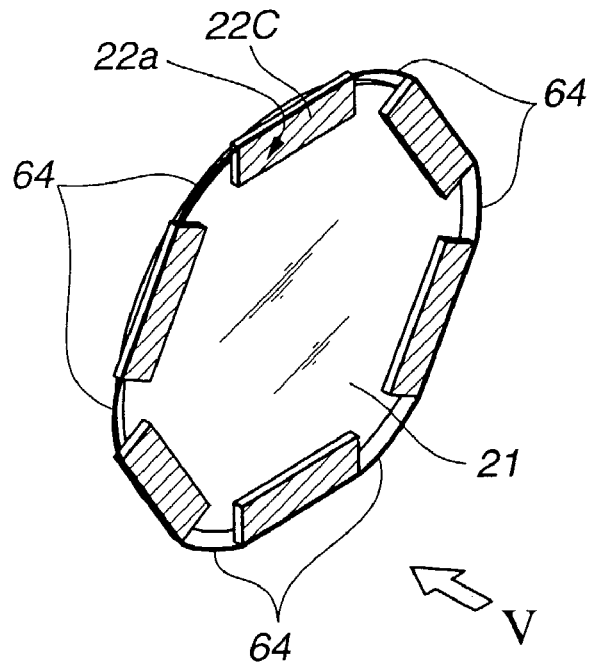
FIG. 28 is a perspective view showing a seventh example of the structures of the dust-proofing member and the member for vibration in the image pick-up device unit in the camera when the member for vibration is attached to the dust-proofing member according to the third embodiment of the present invention.
Figure 29:
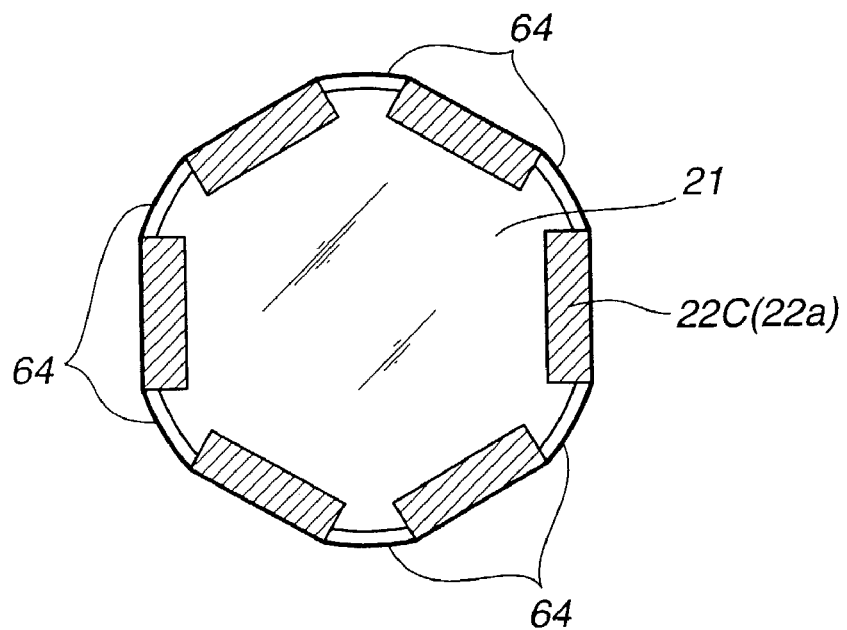
FIG. 29 is a front view seen from the direction indicated by an arrow V in FIG. 28.

FIGS. 28 and 29 are diagrams showing by extracting the dust-proofing member and the member for vibration in the image pick-up device unit in the camera according to the third embodiment, that is, showing the seventh example of the structures of the dust-proofing member and the member for vibration. FIG. 28 is a perspective view showing a status in which the member for vibration is attached to the dust-proofing member. FIG. 29 is a front view seen from the direction indicated by an arrow V in FIG. 28.

The seventh example shows the dust-proofing filter comprising a circular plate-shaped optical member 21. In accordance therewith, a plurality of rectangular members for vibration 22C are arranged at the peripheral portion of the circular plate member 21, similarly to the fifth example.

In the seventh example, the plurality of rectangular members for vibration 22C arranged along the peripheral portion of the circular plate member 21 are electrically connected by circular electrodes 64 as connecting members. The plurality of rectangular members for vibration 22C are arranged with a substantially frame shape as a whole.

The circular electrodes 64 are adhered to the front side of the members for vibration 22C, and are formed by evaporation or the like of a flexible printed board or silver etc.

Figure 30:
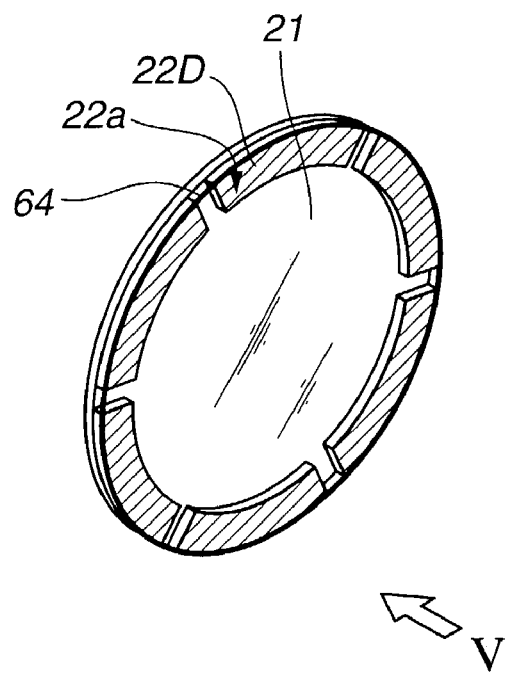
FIG. 30 is a perspective view showing an eighth example of the structures of the dust-proofing member and the member for vibration in the image pick-up device unit in the camera when the member for vibration is attached to the dust-proofing member according to the third embodiment of the present invention.
Figure 31:
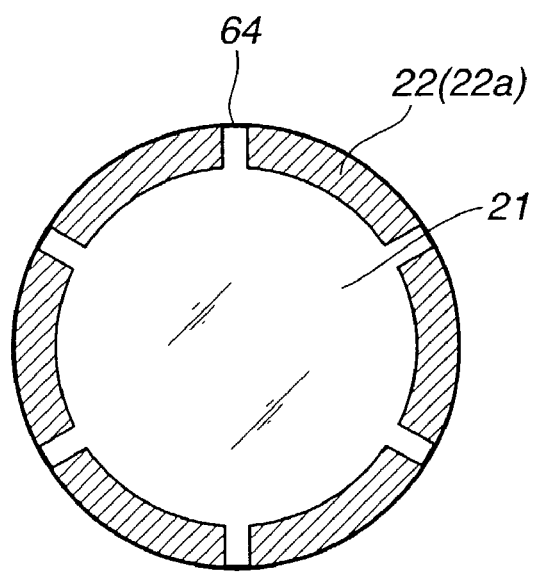
FIG. 31 is a front view seen from the direction indicated by an arrow V in FIG. 30.

FIGS. 30 and 31 are diagrams showing by extracting the dust-proofing member and the member for vibration in the image pick-up device unit in the camera according to the third embodiment, that is, showing the eighth example of the structures of the dust-proofing member and the member for vibration. FIG. 30 is a perspective view showing a status in which the member for vibration is attached to the dust-proofing member. FIG. 31 is a front view seen from the direction indicated by an arrow V in FIG. 30.

The eighth example shows the dust-proofing filter comprising the circular plate-shaped optical member 21. In accordance therewith, a plurality of arcuate members for vibration 22D are arranged along the peripheral portion of the circular plate member 21 similarly to the sixth example.

In the eighth example, the plurality of arcuate members for vibration 22D arranged along the peripheral portion of the circular plate-shaped member 21 are electrically connected by the circular electrodes 64 (connecting member) similarly to the seventh example. The plurality of arcuate members for vibration 22D are arranged with a substantially frame shape as a whole.

As mentioned above, in the fourth to eighth examples according to the third embodiment, the dust-proofing member comprises the circular or polygonal plate-shaped optical member 21 or 21A and a plurality of rectangular or arcuate members for vibration 22C or 22D are arranged along the peripheral portion of the dust-proofing member. The plurality of members for vibration 22C or 22D are electrically connected by the connecting members such as the leads 63 or circular electrodes 64.

Since the shapes of the members for vibration 22C and 22D are simplified, the working performance is preferably ensured upon manufacturing the members for vibration 22C and 22D and this contributes to the reduction in manufacturing costs.

In particular, the piezoelectric elements constituting the plurality of members for vibration 22C and 22D are connected by the circular electrodes 64 in the seventh and eighth examples. As compared with the case of using the leads 63 as the connecting members of the piezoelectric elements, the assembling process is further simplified.

General line materials are used upon using the leads 63 as the connecting members of the piezoelectric elements. Advantageously, the members are easily shared.

The plurality of members for vibration 22C or 22D are electrically connected by predetermined connecting members with a substantially frame shape as a whole. Thus, the electrode of the one surface 22*a* (portion shown by shading in FIGS. 22 to 31) of the members for vibration 22C or 22D becomes continuous. In this case, the wiring for applying a predetermined voltage to the members for vibration 22C or 22D is relatively freely arranged.

Of course, the shape of the dust-proofing member and the shape of the member for vibration are not limited to the foregoing examples and can be varied based on the combination.

In the first to eighth examples, the member for vibration is arranged substantially all over the peripheral portion of the dust-proofing member. In addition, the member for vibration may be arranged at one predetermined portion of the peripheral portion of the dust-proofing member.

Figure 32:
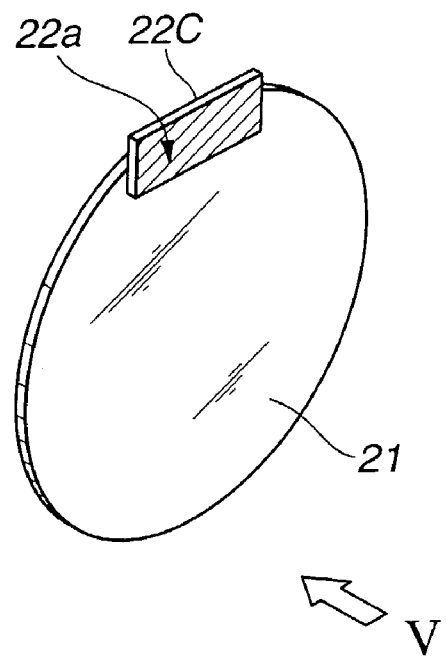
FIG. 32 is a perspective view showing a ninth example of the structures of the dust-proofing member and the member for vibration in the image pick-up device unit in the camera when the member for vibration is attached to the dust-proofing member according to the third embodiment of the present invention.
Figure 33:
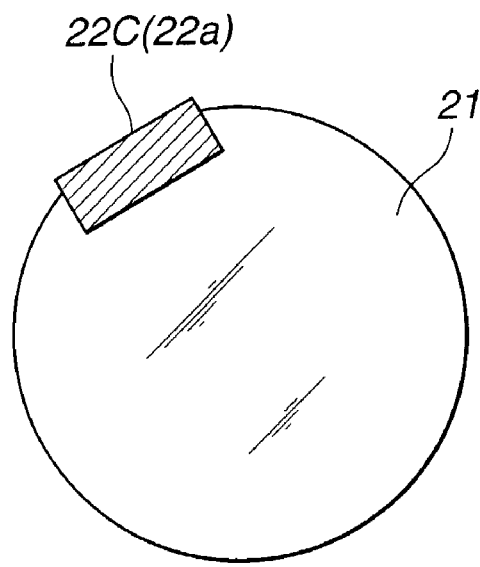
FIG. 33 is a front view seen from the direction indicated by an arrow V in FIG. 32.

FIGS. 32 and 33 are diagrams showing by extracting the dust-proofing member and the member for vibration in the image pick-up device unit in the camera, that is, showing the ninth example of the structures of the dust-proofing member and the member for vibration. FIG. 32 is a perspective view showing a status in which the member for vibration is attached to the dust-proofing member. FIG. 33 is a front view seen from the direction indicated by an arrow V in FIG. 32.

In the ninth example, the circular plate-shaped optical member 21 is used as the dust-proofing filter and only the single rectangular member for vibration 22C as the member for vibration is arranged at one predetermined portion of the peripheral portion of the optical member 21.

Figure 34:
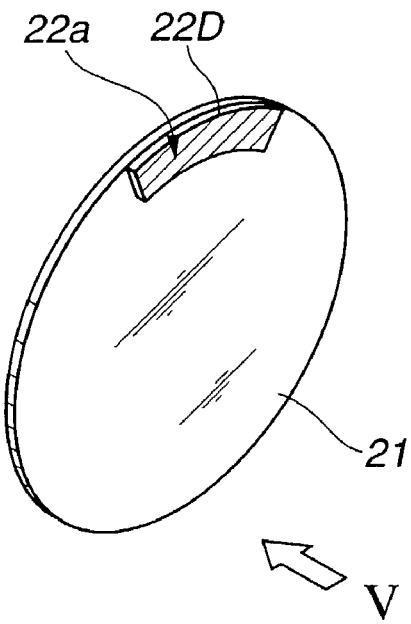
FIG. 34 is a perspective view showing a tenth example of the structures of the dust-proofing member and the member for vibration in the image pick-up device unit in the camera when the member for vibration is attached to the dust-proofing member according to the third embodiment of the present invention.
Figure 35:
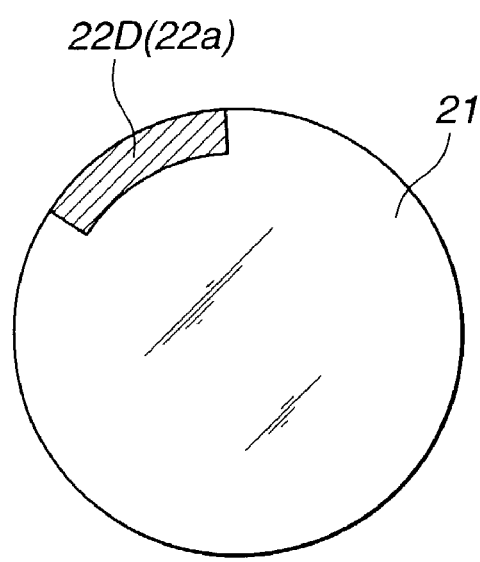
FIG. 35 is a front view seen from the direction indicated by an arrow V in FIG. 34.

FIGS. 34 and 35 are diagrams showing by extracting the dust-proofing member and the member for vibration in the image pick-up device unit in the camera, that is, showing the tenth example of the structures of the dust-proofing member and the member for vibration. FIG. 34 is a perspective view showing a status in which the member for vibration is attached to the dust-proofing member. FIG. 35 is a front view seen from the direction indicated by an arrow V in FIG. 34.

In the tenth example, the circular plate-shaped optical member 21 is used as the dust-proofing filter and only the single arcuate member for vibration 22D as the member for vibration is arranged at one predetermined position of the peripheral portion of the optical member 21.

Figure 36:
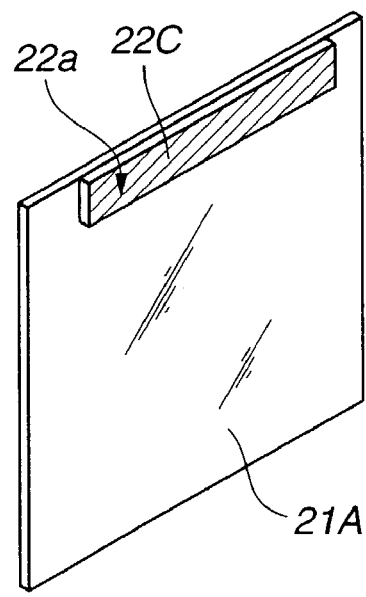
FIG. 36 is a perspective view showing an eleventh example of the structures of the dust-proofing member and the member for vibration in the image pick-up device unit in the camera when the member for vibration is attached to the dust-proofing member according to the third embodiment of the present invention.
Figure 37:
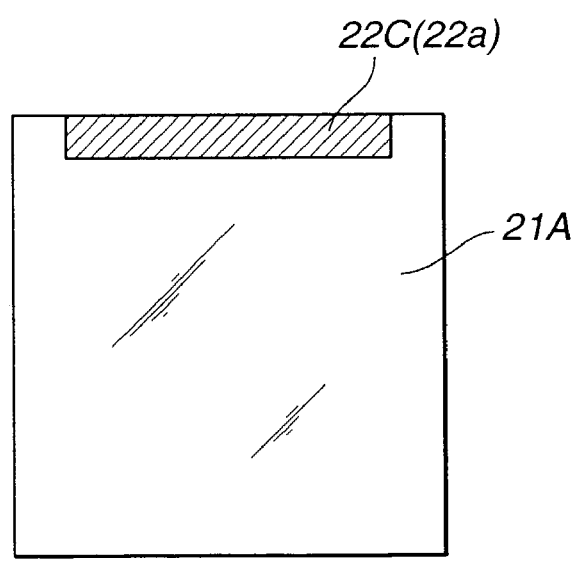
FIG. 37 is a front view seen from the direction indicated by an arrow V in FIG. 36.

FIGS. 36 and 37 are diagrams showing by extracting the dust-proofing member and the member for vibration in the image pick-up device unit in the camera, that is, showing the eleventh example of the structures of the dust-proofing member and the member for vibration. FIG. 36 is a perspective view showing a status in which the member for vibration is attached to the dust-proofing member. FIG. 37 is a front view seen from the direction indicated by an arrow V in FIG. 36.

In the eleventh example, the square plate-shaped optical member 21A is used as the dust-proofing filter and only the single rectangular member for vibration 22C as the member for vibration is arranged at one predetermined position of the peripheral portion of the optical member 22.

As stated above, in the ninth to eleventh examples according to the third embodiment, the single member for vibration is arranged at a part of the peripheral portion of the dust-proofing member. As a result, the image pick-up device unit is reduced in size and this contributes to the saving of the assembling process.

In place of using the ninth to eleventh examples according to the third embodiment, a pair of members for vibration may be arranged at two opposed portions on the peripheral portion of the dust-proofing member. In this case, the members for vibration improve the stability of the vibrations applied to the dust-proofing member.

In the first to eleventh examples according to the third embodiment, the dust-proofing member (dust-proofing filter) uses the circular or polygonal plate-shaped optical member 21, 21A, or 21B.

In this case, it is preferable that the dust-proofing member has three or more linear axes of symmetry so that the member for vibration always applies the vibrations with stability.

Figure 38:
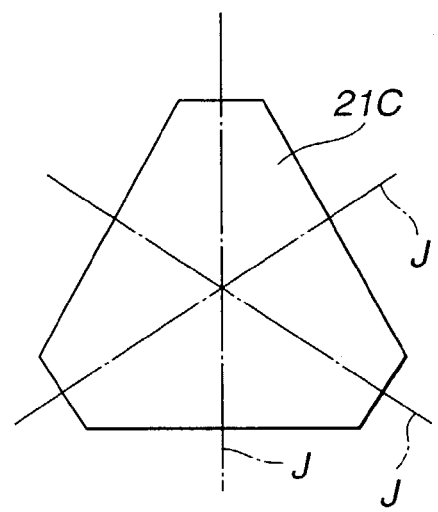
FIG. 38 is a diagram showing an example of the dust-proofing member which is shaped with two linear axes of symmetry in the image pick-up device unit in the camera according to the third embodiment of the present invention.
Figure 39:
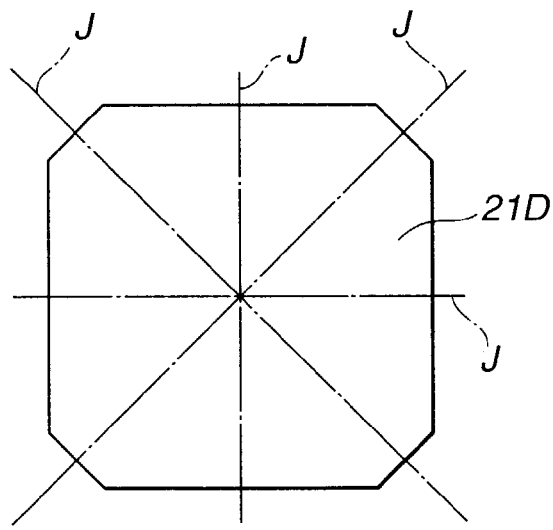
FIG. 39 is a diagram showing one example of the dust-proofing member which is shaped with three linear axes of symmetry in the image pick-up device unit in the camera according to the third embodiment of the present invention.
Figure 40:
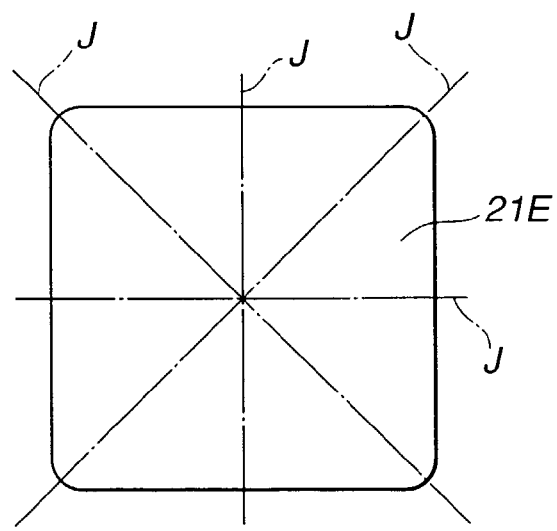
FIG. 40 is a diagram showing another example of the dust-proofing member which is shaped with three linear axes of symmetry in the image pick-up device unit in the camera according to the third embodiment of the present invention.

The dust-proofing member may be shaped as shown in FIGS. 38 to 40. Referring to FIGS. 38 to 40, one-dotted chain line indicated by reference numeral J denotes a linear axis of symmetry.

FIG. 38 is a diagram showing one example of the dust-proofing member shaped with three linear axes of symmetry, specifically showing a dust-proofing filter 21C which is shaped by cutting off a predetermined amount of space at three angles of equilateral triangle.

FIG. 39 is a diagram showing another example of the dust-proofing member shaped with four linear axes of symmetry, specifically showing a dust-proofing filter 21D which is shaped by cutting off a predetermined amount of space at four angles of square.

FIG. 40 is a diagram showing another example of the dust-proofing member shaped with four linear axes of symmetry, specifically showing a dust-proofing filter 21E which is shaped by rounding four angles of square.

In addition to the illustrated shapes of the dust-proofing member, many similar shapes can easily be considered.

As mentioned above, according to the third embodiment, the same advantages as those according to the first embodiment are obtained.

Further, according to the third embodiment, the dust-proofing member (21, etc.) and the member for vibration (22, etc.) for applying a predetermined periodic vibration to the dust-proofing member are variously formed. Consequently, the variously formed shapes of the dust-proofing member and the member for vibration can be applied to various cameras by selecting and combining the shapes if necessary. The manufacturing process is saved and this easily contributes to the reduction in size of the camera.

According to the first to third embodiments, the dust-proofing member (refer to the dust-proofing filter 21 shown in FIG. 1) is arranged at the predetermined position between the photographing optical system (12a) and the image pick-up device (27). In other words, the subject beams for contributing to the formation of the optical subject image are transmitted through the dust-proofing filter (21).

In consideration of the foregoing, so-called coating processing is generally performed on the surface of the dust-poof filter (21), that is, the formation of various thin films such as (a reflection preventing film or electrostatic charge preventing film) for preventing the reflection or the electro-static charge, and (an infrared cut-off film or ultraviolet cut-off film) for preventing the absorption and the transmission of the infrared or the ultraviolet.

In this case, as the coating processing performed for the dust-proofing filter (21), various processing formats are considered, for example, processing for forming a thin film as a single member having a function of the above various thin films, processing for forming a thin film multi-functioned by laminating a plurality of thin films among the various thin films, and processing for forming a thin film multi-functioned among the various thin films.

Herein, the reflection preventing film (referred to as an AR coating) suppresses a reflection ratio of the surface and improves the transmittance by evaporating a multi-film obtained by laminating by a thickness of a ¼-wavelength (0.1 to 0.3 μm), for example, Silicon Oxide ($SiO_2$),
Titanate Oxide ($TiO_2$), and
Zinc Oxide ($ZnO_2$)

The surface reflection ratio of a normal glass is approximately 4%. However, the reflection ratio is suppressed to 1% or less by applying the reflection preventing film to the surface.

As the electrostatic charge preventing film, a transparent conductive film used for the optical system is applied. The transparent conductive film has a large conductivity and a high translucency in a visible area and, mainly, a visible light average transmittance is about 80% or more and the resistivity is, in many cases, about $1\times10^{-3}$ Ω·cm or less.

The transparent conductive film includes a metal transparent conductive film made of Gold (Au), Silver (Ag), Platinum (Pt), etc., and an oxide semiconductor transparent conductive film made of Indium Oxide ($In_2O_3$), Tin Oxide ($SnO_2$), Zinc Oxide ($ZnO_2$), etc. The metal transparent conductive film has a problem with the translucency and the film intensity and therefore the optical fields mainly use the oxide semiconductor transparent conductive film.

The infrared cut-off film (referred to as an IR cut-off film) reflects infrared light having a wavelength of 670 to 680 nm or more) and transmits light in other wavelength areas.

The ultraviolet cut-off film (referred to as a UV cut-off film) reflects ultraviolet light (having wavelength of 390 to 410 nm or less) and transmits light in other wavelength areas.

The infrared cut-off film and the ultraviolet cut-off film are basically formed by overlapping and multi-layering Silicon Oxide ($SiO_2$),
Titanate Oxide ($TiO_2$), and
Tantalum Pentoxide ($Ta_2O_5$).

As described above, the piezoelectric element (i.e., the member for vibration 22) for applying the vibrations to the dust-proofing filter (21) is arranged by adhering means at the surface of the peripheral portion of one side (at the back) of the dust-proofing filter (21).

In the case of adhering the piezoelectric element (22) on the surface of the dust-proofing filter (21), it is well known in views of the characteristics of adhesives that the smoother the adhering surface is, the harder to obtain high adhering force.

As mentioned above, various thin-films are formed on the surface of the dust-proofing filter (21). In the case of forming the thin films, the surface of the thin film becomes smoother as compared with the surface having no thin film. Therefore, the adhesion of the piezoelectric element (22) at the predetermined position on the surface of the dust-proofing filter 21 having the thin film does not cause the generation of higher adhering force.

According to the fourth embodiment of the present invention (refer to FIGS. 41 to 44), a dust-proofing filter 21F includes a thin-film formed portion having a thin film at a predetermined portion on the surface thereof through which the subject beams are transmitted and a thin-film non-forming portion having no thin film at a predetermined portion on the surface where the member for vibration 22 should be adhered.

Figure 41:
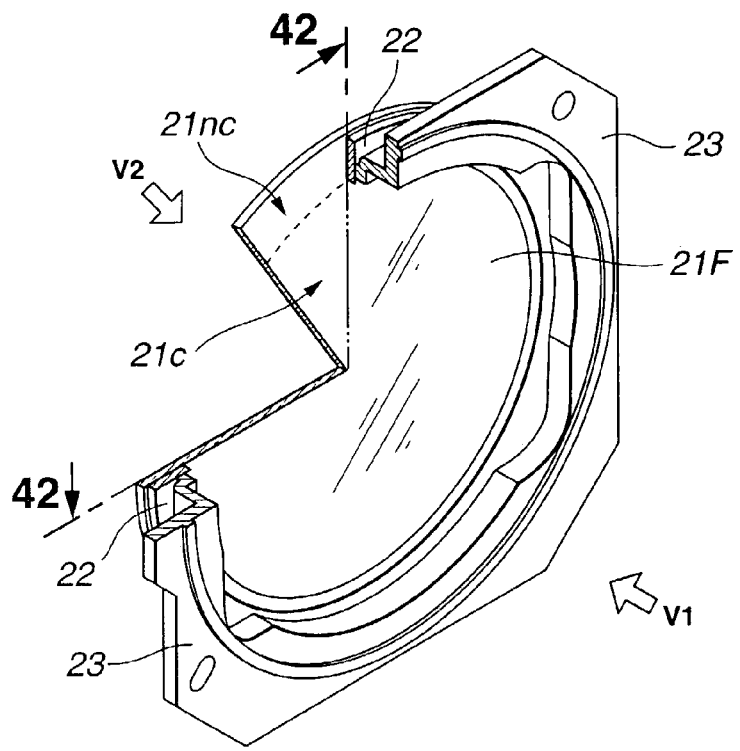
FIG. 41 is a perspective view showing by extracting a part of members (a dust-proofing filter, a member for vibration, and a dust-proofing filter supporting member) forming an image pick-up device unit in a camera according to a fourth embodiment of the present invention.
Figure 42:
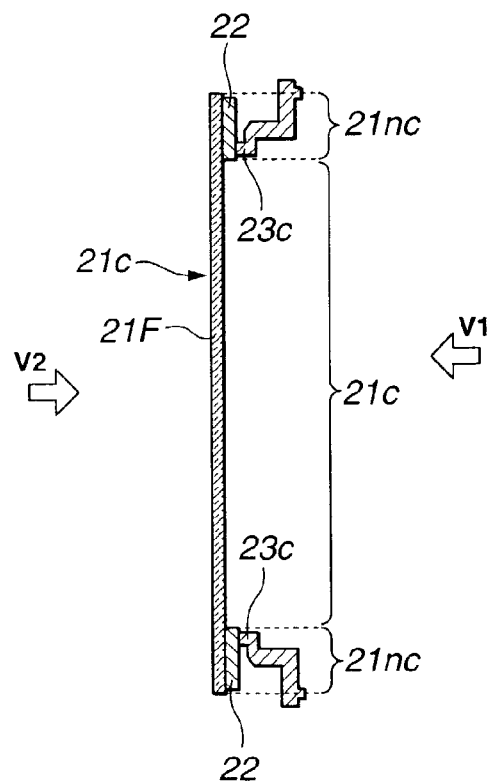
FIG. 42 is a sectional view along a line 42-42 shown in FIG. 41.

FIGS. 41 and 42 are diagrams showing by extracting a part of members forming an image pick-up device unit in a camera according to the fourth embodiment. FIG. 41 is a perspective view showing by extracting a part of the image pick-up device unit, that is, the dust-proofing filter, the piezoelectric element constituting the member for vibration, and the dust-proofing filter supporting member, namely showing a cut-off part thereof seen from the back side. FIG. 42 is a sectional view along a line 42-42 shown in FIG. 41.

Figure 43:
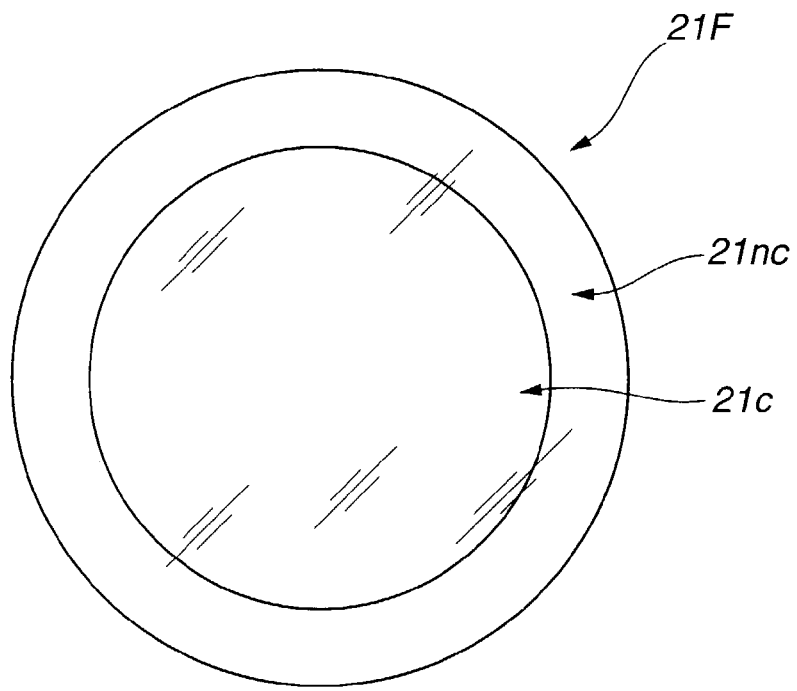
FIG. 43 is a plan view showing by extracting only the dust-proofing filter shown in FIG. 41 seen from the direction indicated by an arrow V1 (on the back side) in FIG. 41.
Figure 44:
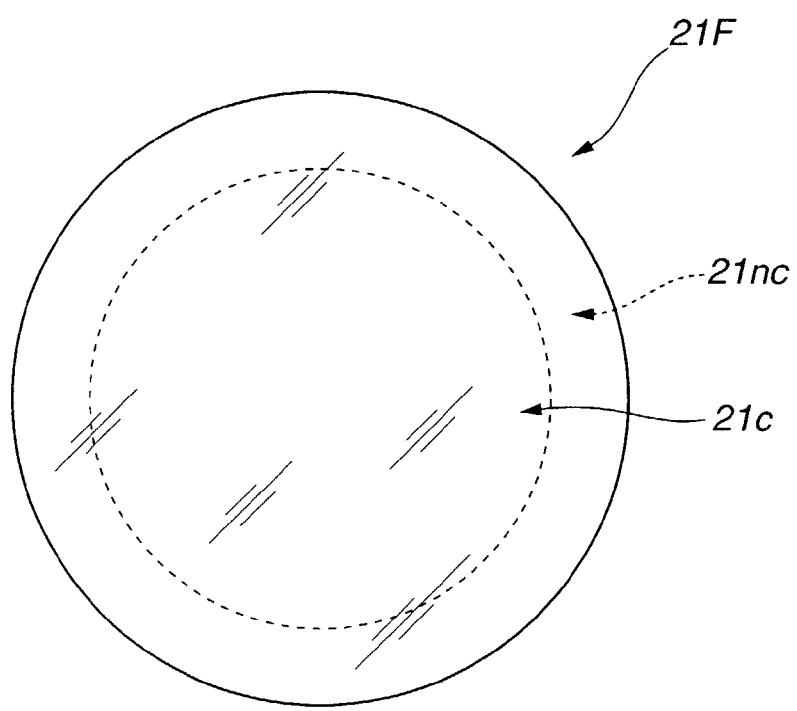
FIG. 44 is a plan view showing by extracting only the dust-proofing filter shown in FIG. 41 seen from the direction indicated by an arrow V2 (on the front side) in FIG. 41.

FIGS. 43 and 44 are diagrams showing by extracting only the dust-proofing filter in the members forming the image pick-up device unit. FIG. 43 is a plan view seen from the direction indicated by an arrow V1 (on the back side) shown in FIG. 41. FIG. 44 is a plan view seen from the direction indicated by an arrow V2 (on the front side) shown in FIG. 41.

According to the fourth embodiment of the present invention, the structures of the camera and the image pick-up device unit used therefor are basically the same as those according to the first embodiment. Therefore, the structures are described with reference to FIGS. 1 to 11 and the description used therefor according to the first embodiment, an illustration and a detailed description thereof are omitted, and only a different portion, namely, only the dust-proofing filter is described in detail.

Referring to FIGS. 41 to 44, a thin-film non-forming portion 21nc is provided on the surface of the peripheral portion on one side (on the back side) of the dust-proofing filter 21F, that is, at a portion on which the member for vibration 22 is adhered. At a portion except therefor, a thin-film formed portion 21c is provided. Further, the thin-film formed portion 21c is provided all over the surface of another surface (on the front side) of the dust-proofing filter 21F.

The thin-film non-forming portion 21nc is provided only at the predetermined portion on the surface of the dust-proofing filter 21F, that is, only at the portion where the member for vibration 22 is adhered. Consequently, the adhesion of the member for vibration 22 to the dust-proofing filter 21F is performed by an ensured higher adhering force.

According to the fourth embodiment, the dust-proofing filter 21F is abutted on the supporting portion 23c of the dust-proofing filter supporting member 23, thereby regulating the position of the dust-proofing filter 21F in the optical axis direction. The supporting portion 23c is abutted on the node 21a (refer to FIG. 6) upon vibration of the dust-proofing filter 21F caused by the member for vibration 22.

According to the fourth embodiment, the supporting portion 23c is abutted on the predetermined portion of the member for vibration 22 and the abutting portion corresponds to the node 21a upon vibrations.

The position of the node 21a upon vibrations of the dust-proofing filter 21F is varied depending on the size (thickness dimension or diameter) of the dust-proofing filter 21F or on the size of the member for vibration 22 for vibrating the dust-proofing filter 21F. Therefore, the structure in this case is not limited to that according to the fourth embodiment, namely, not limited to the setting in which the supporting portion 23c of the dust-proofing filter supporting member 23 is abutted on the member for vibration 22.

Hereinbelow, a modification is given of an image pick-up device unit in which the supporting portion 23c of the dust-proofing filter supporting member 23 is abutted on a predetermined position on one side of the dust-proofing filter 21F.

Figure 45:
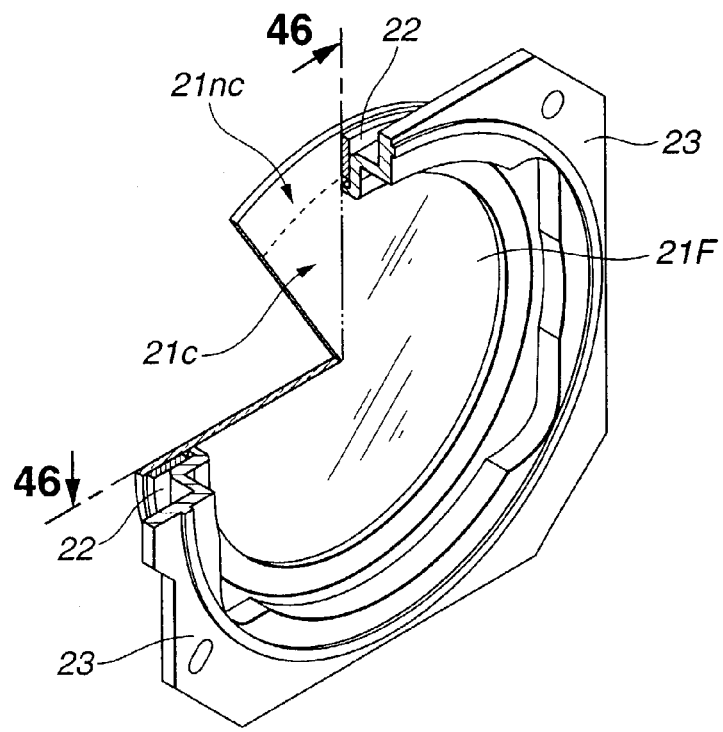
FIG. 45 is a perspective view showing by extracting a part of an image pick-up device unit (a dust-proofing filter, a member for vibration, and a dust-proofing filter supporting member) according to a modification in a fourth embodiment of the present invention.
Figure 46:
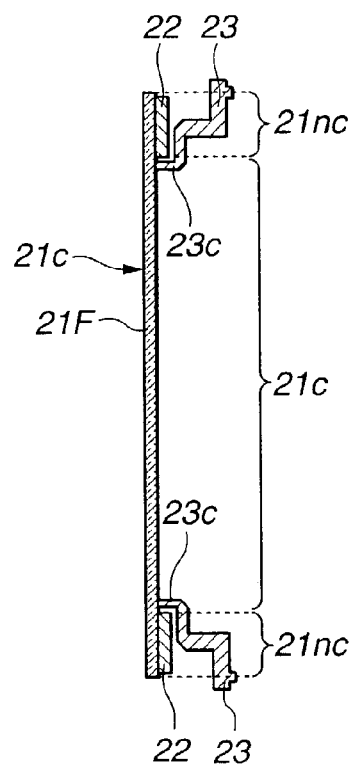
FIG. 46 is a sectional view along a line 46-46 shown in FIG. 45.

FIGS. 45 and 46 show the modification of the fourth embodiment. FIG. 45 is a perspective view showing by extracting a part of the image pick-up device unit, including the dust-proofing filter, the piezoelectric element constituting the member for vibration, and the dust-proofing filter supporting member, namely showing a cut-off part seen from the back side. FIG. 46 is a sectional view along a line 46-46 in FIG. 45.

According to the modification of the fourth embodiment, the supporting portion 23c of the dust-proofing filter supporting member 23 is abutted on a predetermined position on one side of the dust-proofing filter 21F, evacuated from the member for vibration 22. The abutting position is set to a position corresponding to the node 21a upon vibration of the dust-proofing filter 21F.

The dust-proofing filter 21F includes the thin-film formed portion 21c and the thin-film non-forming portion 21nc. Similarly to the first embodiment, the thin-film non-forming portion 21nc is provided at the position at which the member for vibration 22 is adhered on the dust-proofing filter 21F and the thin-film formed portion 21c is provided all over the portion except for the thin-film non-forming portion 21nc.

As stated above, according to the fourth embodiment, the same advantages as those according to the first embodiment are obtained.

In addition, according to the fourth embodiment, in consideration of adhering the member for vibration 22 for vibrating the dust-proofing filter 21F at the predetermined position of the dust-proofing filter 21F by using the adhesive or the like, the adhering position of the member for vibration 22 corresponds to the thin-film non-forming portion 21nc. Excluding the adhering position of the member for vibration 22, the thin-film formed portion 21c is formed and therefore the member for vibration 22 is adhered to the dust-proofing filter 21F with higher adhering force.

Ultraviolet hardening adhesives are widely used when the optical member is generally adhered. The ultraviolet hardening adhesives have such characteristics that they become hard for a short time by irradiating ultraviolet (having a wavelength ranging 200 to 400 nm (centering approximately to 365 nm)).

Consider the usage of the ultraviolet hardening adhesive as an adhesive for adhering the member for vibration 22 to the dust-proofing filter 21F according to the fourth embodiment.

In this case, the ultraviolet hardening adhesive is applied to a surface where the member for vibration 22 is abutted on the thin-film non-forming portion 21nc. The adhesive is hardened by irradiation of the ultraviolet having a predetermined wavelength from the front side of the dust-proofing filter 21F (in the direction indicated by an arrow V2 in FIGS. 41 and 42).

As described above, the dust-proofing filter 21F according to the fourth embodiment includes the thin-film formed portion 21c for forming the thin film such as the infrared cut-off film or ultraviolet cut-off film onto the dust-proofing filter 21F and the thin-film non-forming portion 21nc having no thin film. The thin-film formed portion 21c is formed only at the position to which the member for vibration 22 is adhered.

Therefore, the ultraviolet used for irradiation for the purpose of hardening the adhesive is reflected by the ultraviolet cut-off film or the infrared cut-off film (including one having characteristics for reflecting not only the infrared wavelength but also the ultraviolet wavelength) on the front side of the dust-proofing filter 21F, and does not reach the applied surface of the adhesive. Then, the adhesive is not hardened for a short time.

When the ultraviolet hardening adhesive is used for the adhesion of the dust-proofing filter 21F and the member for vibration 22, the thin-film non-forming portion 21nc must further be provided at a predetermined position on the front side of the dust-proofing filter 21F, namely, at a predetermined position on the surface opposed to the adhering position of the member for vibration 22.

In this case, the dust-proofing filter 21F has both surfaces as shown in FIG. 43. In other words, the thin-film non-forming portion 21nc is provided at a predetermined position and the thin-film formed portion 21c is provided at the position excluding the thin-film non-forming portion 21nc.

With the above-formed dust-proofing filter 21F, the ultraviolet hardening adhesive is hardened for a short time by the irradiation of ultraviolet having a predetermined wavelength from the front side of the dust-proofing filter 21F (in the direction indicated by the arrow V2 in FIGS. 41 and 42)

upon adhering the member for vibration 22 to the dust-proofing filter 21F by using the adhesive.

In this case, the setting of the thin-film non-forming portion 21*nc* at the same positions on both the surfaces of the dust-proofing filter 21F does not regulate an assembling direction of the dust-proofing filter 21F upon assembling.

That is, the setting of the thin-film non-forming portion 21*nc* only on one surface of the dust-proofing filter 21F regulates the surface on which the thin-film non-forming portion 21*nc* such that it is directed toward the side of the image pick-up device 27. However, in the foregoing example, the setting of the thin-film non-forming portion 21*nc* on both the surfaces of the dust-proofing filter 21F causes no problem even if either of the surfaces is directed toward either side upon assembling the dust-proofing filter 21F. Thus, the manufacturing process is easily simplified. Further, the occurrence of assembling errors is prevented.

In the image pick-up device unit (15) in the camera (1) according to the above embodiments, the member for vibration (22) for vibrating the dust-proofing filter (21, . . . ) is arranged at the peripheral portion of the dust-proofing filter (21, . . . ) by using the adhering means such as the adhesive.

Herein, a detailed description is given of the structure of the dust-proofing filter (21, . . . ) and the member for vibration (22) in the image pick-up device unit (15).

Figure 47:
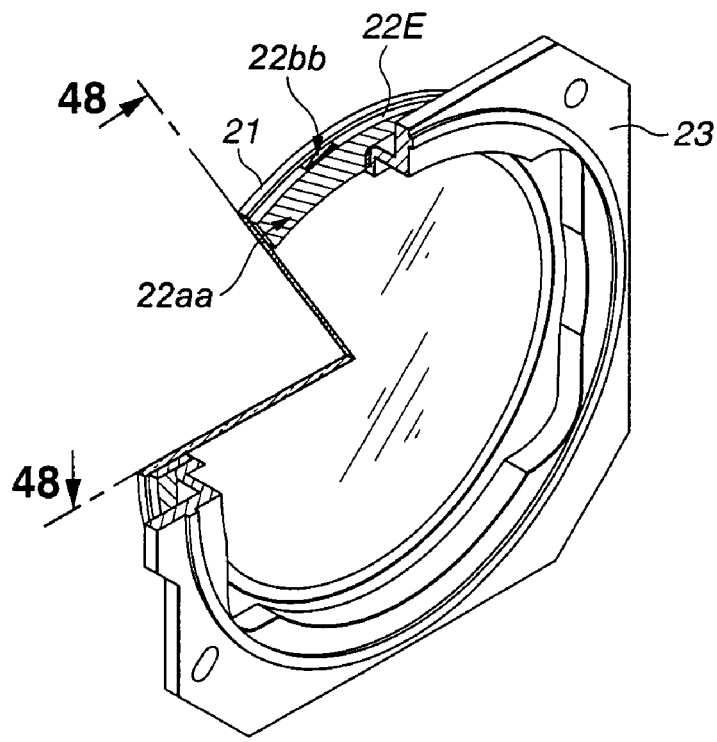
FIG. 47 is a perspective view showing the back side (on an image pick-up device side), by extracting a dust-proofing filter, a member for vibration, and a dust-proofing filter supporting member of an image pick-up device unit in a camera according to a fifth embodiment of the present invention.
Figure 48:
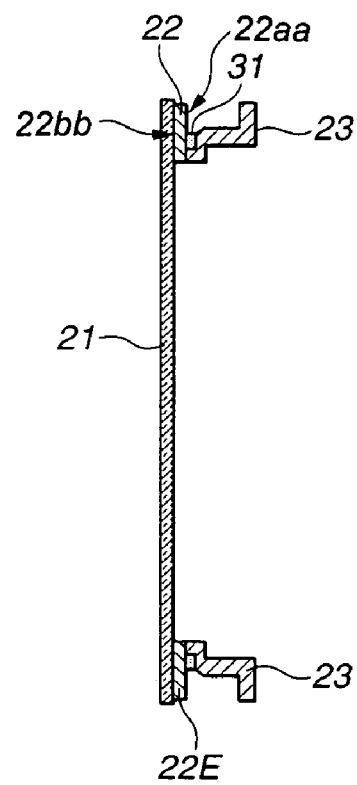
FIG. 48 is a sectional view along a line 48-48 shown in FIG. 47.
Figure 49:
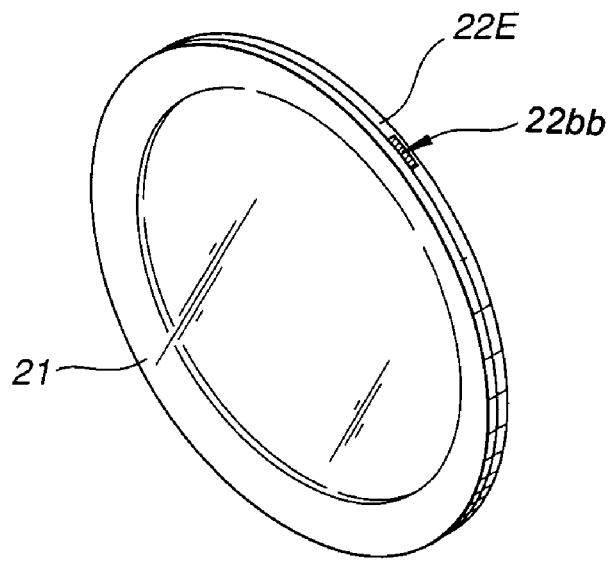
FIG. 49 is a perspective view seen from the front side (on the dust-proofing member side) of the dust-proofing member to which the member for vibration shown in FIG. 47 is adhered.
Figure 50:
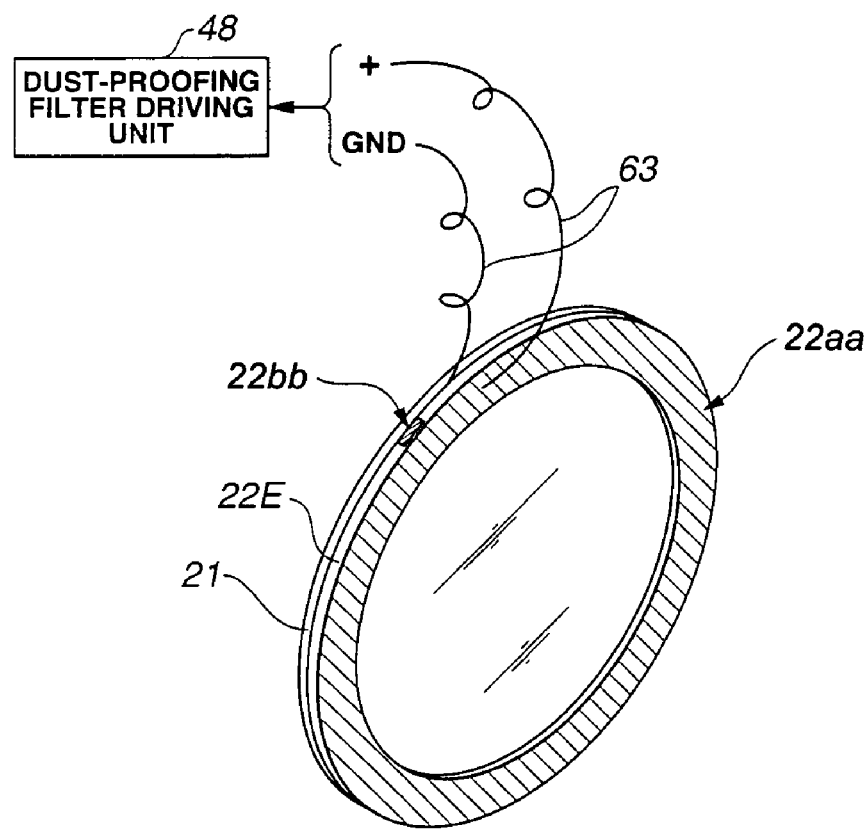
FIG. 50 is a perspective view seen from the back side (on the image pick-up device side) of the dust-proofing member to which the member for vibration shown in FIG. 47 is adhered.
Figure 51:
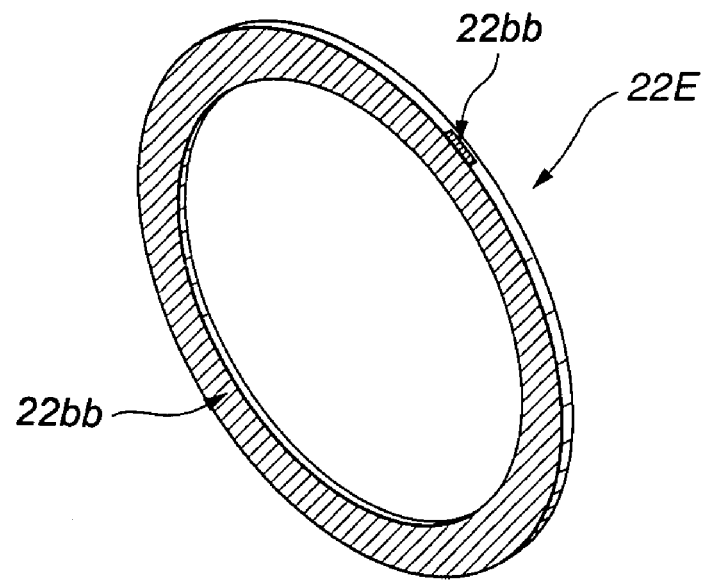
FIG. 51 is a perspective view seen from the front side (on the dust-proofing member side) of the member for vibration shown in FIG. 47.
Figure 52:
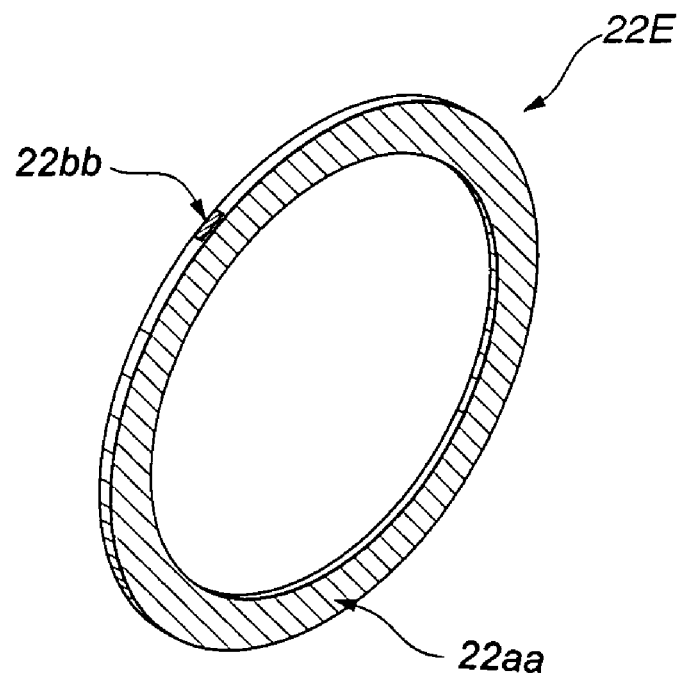
FIG. 52 is a perspective view seen from the back side (on the image pick-up device side) of the member for vibration shown in FIG. 47.

FIGS. 47 to 52 are diagrams showing by extracting a part of members forming an image pick-up device unit in a camera according to a fifth embodiment of the present invention. FIG. 47 is a perspective view showing by extracting and seen from the back side (on the image pick-up device side) of a cut-off part of a dust-proofing member (optical member; dust-proofing filter), a member for vibration, and a dust-proofing filter supporting member. FIG. 48 is a sectional view along a line 48-48 in FIG. 47. FIGS. 49 and 50 are perspective views showing by extracting the dust-proofing member to which the member for vibration is adhered in the image pick-up device unit, FIG. 49 is the perspective view seen from the front side (on the dust-proofing member side) and FIG. 50 is the perspective view seen from the back side (on the image pick-up device side). FIGS. 51 and 52 are perspective views showing by extracting only the member for vibration in the image pick-up device unit, FIG. 51 is the perspective view seen from the front side (on the dust-proofing member side), and FIG. 52 is the perspective view seen from the back side (on the image pick-up device side).

The structure according to the fifth embodiment is basically substantially the same as that according to the first embodiment. Hereinbelow, a description is given with reference to FIGS. 1 to 11 used for the first embodiment and the description thereof. An illustration and a detailed description thereof are omitted and a different portion, namely, only the piezoelectric element constituting the member for vibration is described in detail.

A member for vibration 22E applied in the image pick-up device unit 15 according to the fifth embodiment is an electromechanical transducer which is made of plate-shaped piezoelectric ceramics or the like substantially circular. The dust-proofing filter driving unit 48 is electrically connected to the member for vibration 22E. Therefore, a periodic voltage is applied to the member for vibration 22E, thereby vibrating the dust-proofing filter 21 at a predetermined period.

Referring to FIG. 51, the member for vibration 22E has a first conductive member 22*bb* at one surface thereof, namely, at the surface at which it is adhered to the dust-proofing filter 21, and a second conductive member 22*aa* as another surface, namely, at the reversed surface of the dust-proofing filter 21 (surface at the back side). Further, a part of the first conductive member 22*bb* is formed along the side surface of an outer edge side of the member for vibration 22E.

Referring to FIG. 50, the leads 63 from the dust-proofing filter driving unit 48 are connected to the first conductive member 22*bb* and the second conductive member 22*aa*. Consequently, the dust-proofing filter driving unit 48 applies a predetermined voltage to the member for vibration 22E. That is, the first conductive member 22*bb* and the second conductive member 22*aa* are members which functions as electrodes of the member for vibration 22E.

That is, according to the fifth embodiment, as mentioned above, the member for vibration 22E is adhered to the one surface at the peripheral portion of the dust-proofing filter 21 by the means such as an adhesive. Therefore, because the one surface of the member for vibration 22E becomes the adhering surface to the dust-proofing filter 21, the connecting member such as the lead 63 is not connected to the first conductive member 22*bb* arranged to the one surface if as it is. Then, a part of the first conductive member 22*bb* is formed along the side surface on the outer edge of the member for vibration 22E. The above formation of the first conductive member 22*bb* enables the connection of the connecting member such as the lead 63 to the first conductive member 22*bb*.

As stated above, according to the fifth embodiment, the same advantages as those according to the first embodiment are obtained.

Further, according to the fifth embodiment, the member for vibration 22E is made of the plate-shaped electromechanical transducer, comprises the first conductive member 22*bb* on the one surface of the member for vibration 22E and the second conductive member 22*aa* on the other surface thereof, and a part of the first conductive member 22*bb* is formed along the side surface on the outer edge side of the member for vibration 22E. Consequently, the connecting means such as the lead 63 is easily arranged and the wiring structure of the dust-proofing filter driving unit 48 and the member for vibration 22E is simplified. Thus, the assembling work time is reduced in the manufacturing process and the manufacturing process is simplified, e.g., the reduction of the working process and this contributes to the reduction in manufacturing costs.

Further, the simple structure of the dust-proofing mechanism including the dust-proofing filter 21 and the member for vibration 22E ensures stable mechanical accuracy without variation in manufacturing.

According to the fifth embodiment, a part of the first conductive member 22*bb* in the member for vibration 22E is formed along the side surface on the outer edge side of the member for vibration 22E. The first conductive member 22*bb* may further be extended. This example is described hereinbelow according to a sixth embodiment of the present invention.

Figure 53:
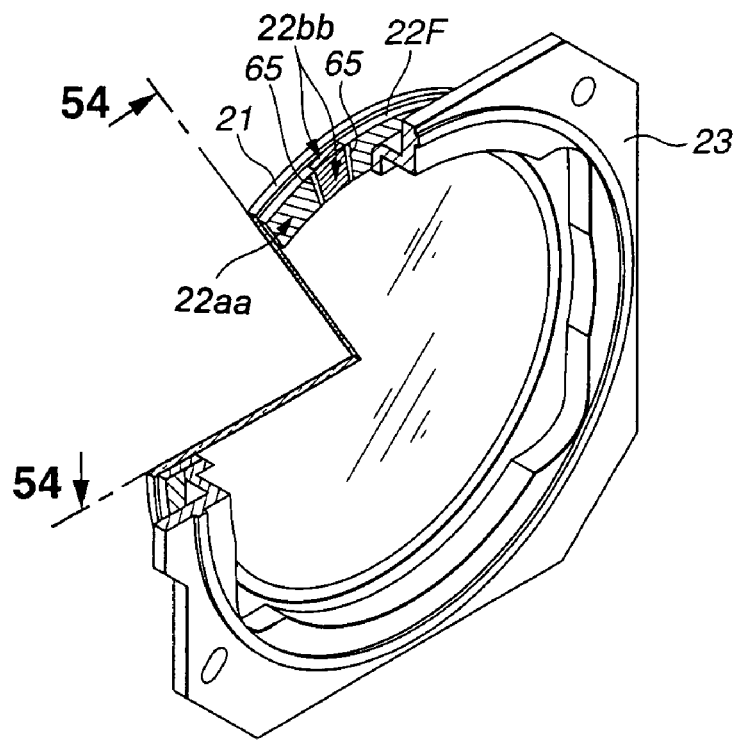
FIG. 53 is a perspective view showing the back side (on an image pick-up device side), by extracting a dust-proofing member, a member for vibration, and a dust-proofing filter supporting member, of an image pick-up device unit in a camera according to a sixth embodiment of the present invention.
Figure 54:
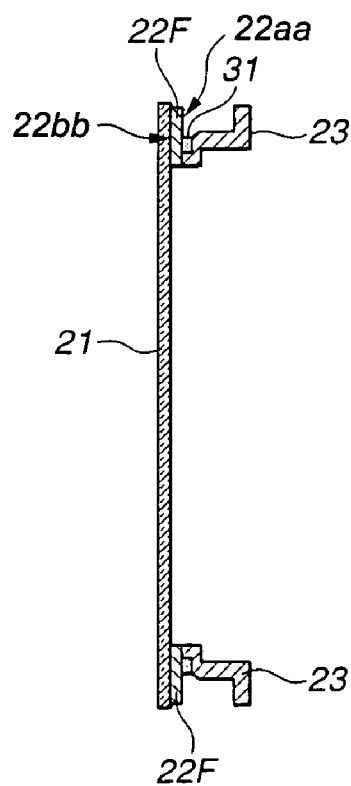
FIG. 54 is a sectional view along a line 54-54 shown in FIG. 53.
Figure 55:
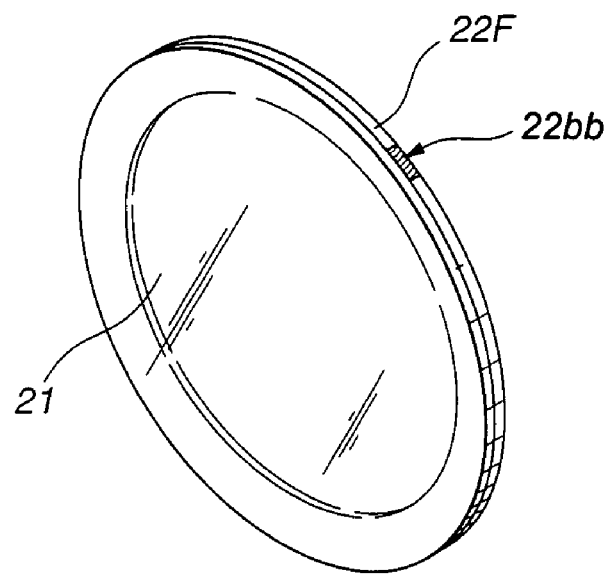
FIG. 55 is a perspective view seen from the front side (on the dust-proofing member side) of the dust-proofing member to which the member for vibration shown in FIG. 53 is adhered.
Figure 56:
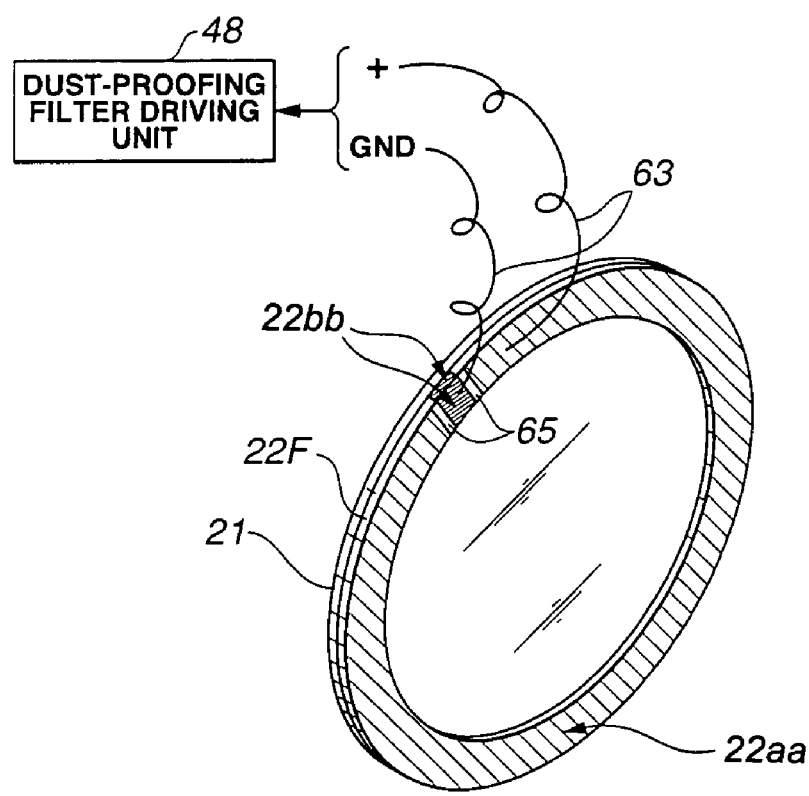
FIG. 56 is a perspective view seen from the back side (on the image pick-up device side) of the dust-proofing member to which the member for vibration shown in FIG. 53 is adhered.
Figure 57:
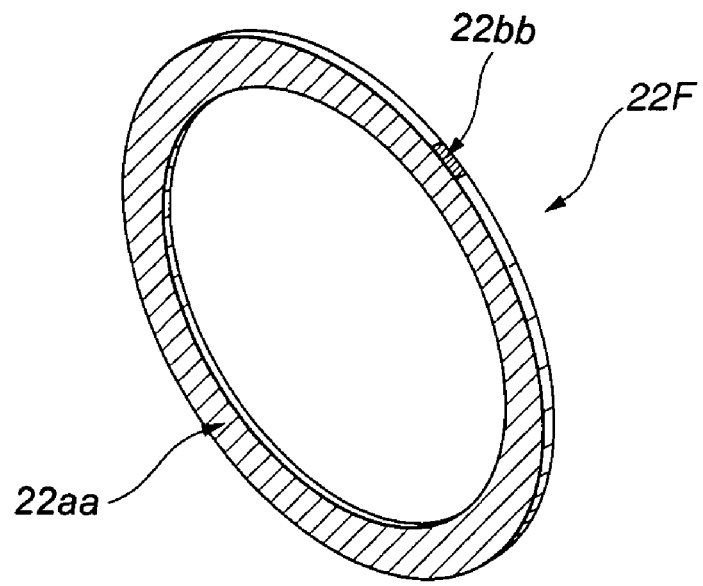
FIG. 57 is a perspective view seen from the front side (on the dust-proofing member side) of the member for vibration shown in FIG. 53.
Figure 58:
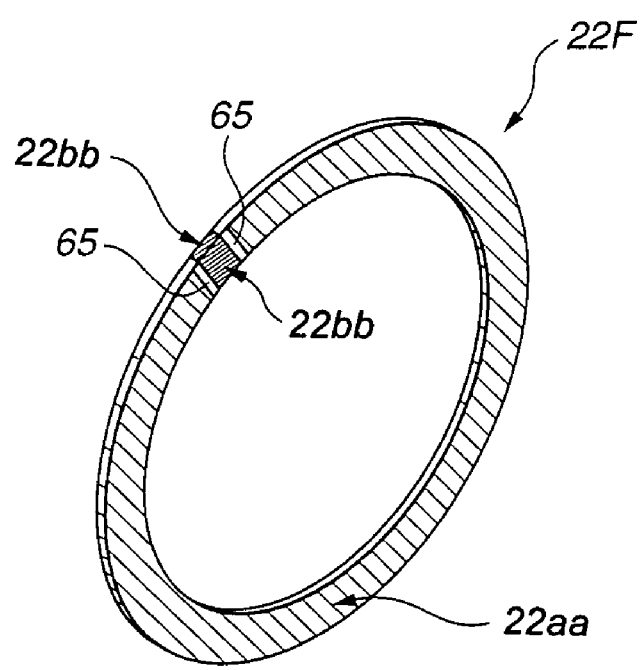
FIG. 58 is a perspective view seen from the back side (on the image pick-up device side) of the member for vibration shown in FIG. 53.

FIGS. 53 to 58 are diagrams showing by extracting a part of members forming an image pick-up device unit in a camera according to the sixth embodiment of the present invention. FIG. 53 is a perspective view showing by extracting a cut-off part of a dust-proofing member, a member for vibration, and a dust-proofing filter supporting member, and seen from the back side (on the image pick-up device side). FIG. 54 is a sectional view along a line 54-54 shown in FIG. 53. FIGS. 55 and 56 are perspective views showing by extracting the dust-proofing member to which the member for vibration is adhered in the image pick-up device unit, FIG. 55 is the perspective view seen from the front side (on the dust-proofing member side) and FIG. 56 is the perspective view seen from the back side (on the image pick-up device side). FIGS. 57 and 58 are perspective views showing by extracting only the member for vibration in the image pick-up device unit, FIG. 57 is the perspective view seen from the front side (on the dust-proofing member side), and FIG. 58 is the perspective view seen from the back side (on the image pick-up device side).

The structure according to the sixth embodiment is basically the same as those according to the first and fifth embodiments. Only the structure of the conductive members included in the member for vibration 22F is different. Therefore, other structures are neither described nor shown, but are referenced to the first embodiment.

According to the sixth embodiment, a part of the first conductive member 22bb arranged on the one surface of the member for vibration 22F, namely, at the surface adhered to the dust-proofing filter 21 is formed along the side surface on the outer edge side of the member for vibration 22F. Further, the first conductive member 22bb is formed extending to the other surface of the member for vibration 22F, namely, at the reversed surface of the dust-proofing filter 21 (at the surface on the back side, that is, at the surface on which the second conductive member 22aa is arranged).

Corresponding thereto, the second conductive member 22aa formed on the reversed surface of the dust-proofing filter 21 is formed, evacuated from the extending portion of the first conductive member 22bb. An insulating portion 65 is provided between the first conductive member 22bb and the second conductive member 22aa on the reversed surface (on the surface at the back). Thus, the conduction between the extending portion of the first conductive member 22bb and the second conductive member 22aa is prevented on the reversed surface.

The image pick-up device unit 15 is assembled in a status in which the above-structured member for vibration 22F is adhered at a predetermined position in the peripheral portion of the dust-proofing filter 21. In this case, the predetermined portion where the second conductive member 22aa of the member for vibration 22F is arranged is abutted on the supporting portion 23c of the dust-proofing filter supporting member 23. Therefore, there is a case that the supporting portion 23c of the dust-proofing filter supporting member 23 is arranged throughout the extending portion of the first conductive member 22bb and the second conductive member 22aa. However, the supporting portion 23c of the dust-proofing filter supporting member 23 is made of non-conductive member such as a molding member and therefore the conduction of the extending portion of the first conductive member 22bb and the second conductive member 22aa is prevented.

Other structures are the same as those according to the fifth embodiment.

As described above, according to the sixth embodiment, the first conductive member 22bb is extended to the other surface of the member for vibration 22F. Referring to FIG. 56, the connecting member such as the lead 63 which should be connected to the first conductive member 22bb can be arranged not only to the side surface of the outer edge side of the member for vibration 22F but also to the extending portion which is formed on the other surface and thus the degree of freedom is expanded in the wiring structure.

According to the fifth and sixth embodiments, the first conductive member 22bb is formed along the side surface on the outer edge side of the piezoelectric element (the member for vibration 22E or 22F). However, the first conductive member 22bb is not limited to this structure and can be formed along the side surface of the inner edge side. The structure of the member for vibration in this case is shown hereinbelow.

Figure 59:
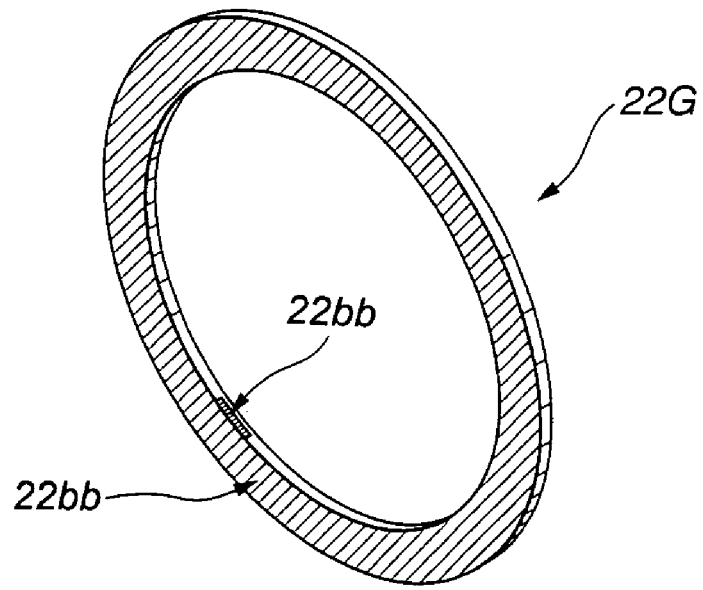
FIG. 59 is a perspective view seen from the front side (on a dust-proofing member side) of a member for vibration according to a seventh embodiment of the present invention.
Figure 60:
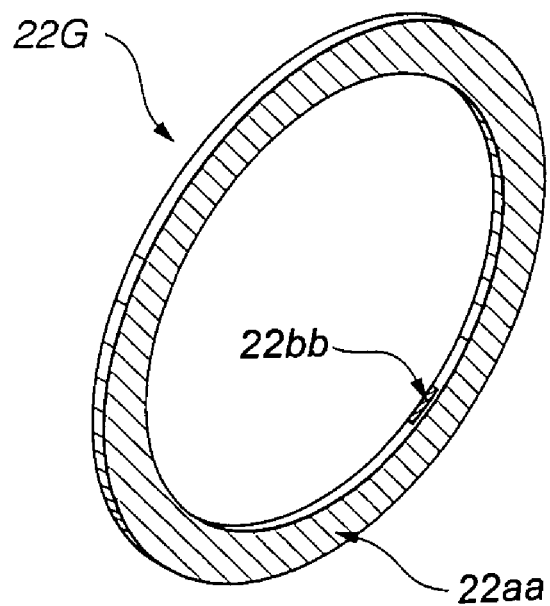
FIG. 60 is a perspective view seen from the back side (on the image pick-up device side) of the member for vibration shown in FIG. 59.

FIGS. 59 and 60 are perspective views showing by extracting only a member for vibration in members forming an image pick-up device unit according to a seventh embodiment of the present invention. FIG. 59 is the perspective view seen from the front side (on the dust-proofing member side) and FIG. 60 is the perspective view seen from the back side (on the image pick-up device side). According to the seventh embodiment, the first conductive member is formed along the side surface on the inner edge side of the member for vibration according to a modification of the fifth embodiment. Therefore, the structures other than the member for vibration are referred to the description of the fifth embodiment and FIGS. 47 to 52.

According to the seventh embodiment, a member for vibration 22G is formed with a part of the first conductive member 22bb arranged on one surface thereof along the side surface on the inner edge side.

Figure 61:
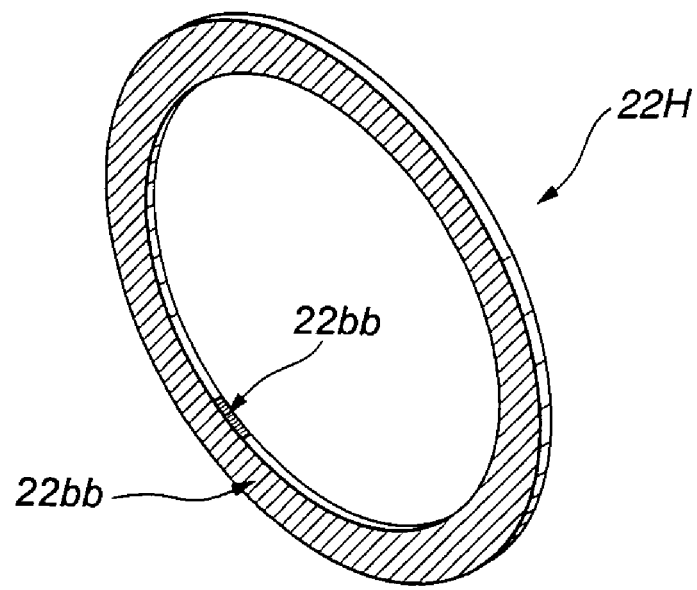
FIG. 61 is a perspective view seen from the front side (on a dust-proofing member side) of a member for vibration according to an eighth embodiment of the present invention.
Figure 62:
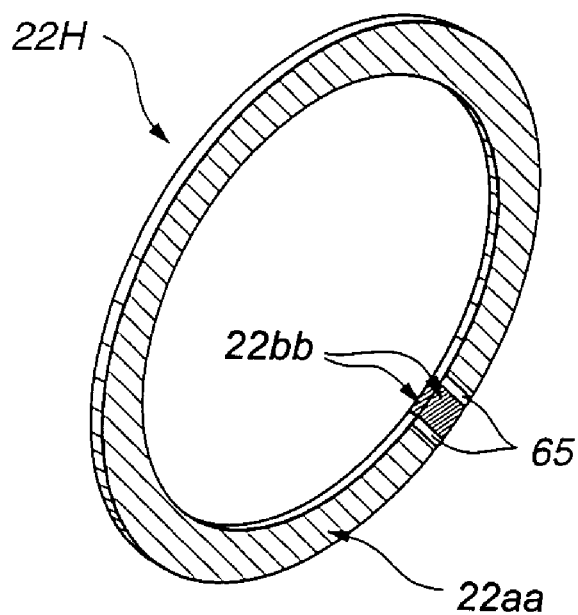
FIG. 62 is a perspective view seen from the back side (on an image pick-up device side) of the member for vibration shown in FIG. 61.

FIGS. 61 and 62 are perspective views showing by extracting only a member for vibration in members forming an image pick-up device unit according to an eighth embodiment of the present invention. FIG. 61 is the perspective view seen from the front side (on the dust-proofing member side) and FIG. 62 is the perspective view seen from the back side (on the image pick-up device side). According to the eighth embodiment, the first conductive member is formed along the side surface on the inner edge side of the member for vibration according to a modification of the sixth embodiment. Therefore, the structures other than the member for vibration are referred to the description of the sixth embodiment and FIGS. 53 to 58.

According to the eighth embodiment, a member for vibration 22H is formed with a part of the first conductive member 22bb which is arranged on one surface thereof along the side surface on the inner edge side and which is further extended to the other surface. An insulating portion 65 is formed between the extending portion of the first conductive member 22bb and the second conductive member 22aa.

Therefore, according to the seventh and eighth embodiments, the same advantages as those according to the fifth and sixth embodiments are obtained when the first conductive member 22bb is formed.

According to the fifth to eighth embodiments, the first conductive member 22bb is formed along the side surface on the outer edge side or the inner edge side of the piezoelectric element (the member for vibration 22E, 22F, 22G, or 22H). However, the first conductive member 22bb may be formed as follows.

Figure 63:
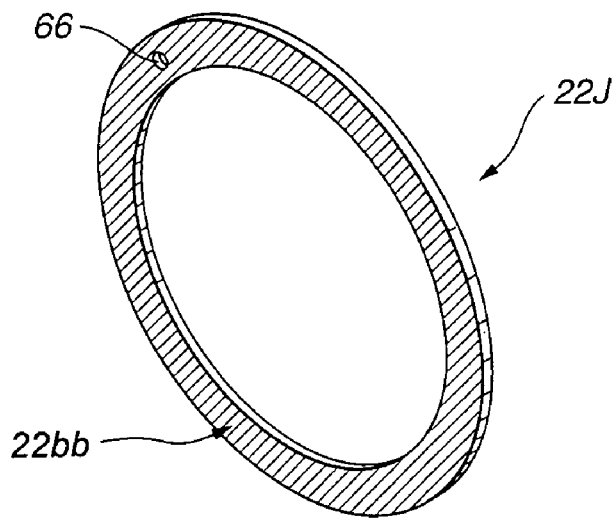
FIG. 63 is a perspective view seen from the front side (on a dust-proofing member side) of a member for vibration in members forming an image pick-up device unit in a camera according to a ninth embodiment of the present invention.
Figure 64:
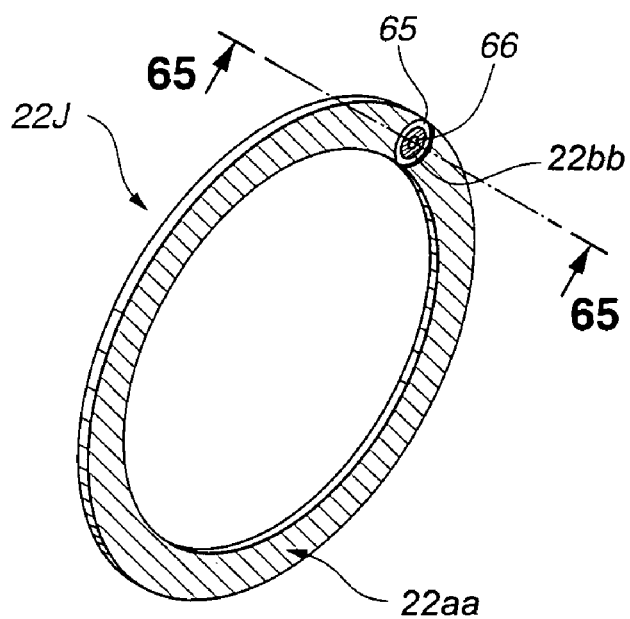
FIG. 64 is a perspective view seen from the back side (on the image pick-up device side) of the member for vibration in the members forming the image pick-up device unit in the camera according to the ninth embodiment of the present invention.
Figure 65:
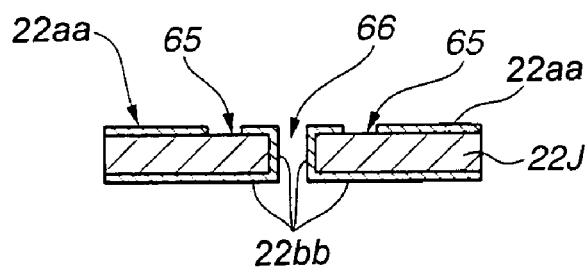
FIG. 65 is a main-part enlarged sectional view showing the cross section along a line 65-65 shown in FIG. 64.

FIGS. 63 and 64 are perspective views showing by extracting only a member for vibration in members forming an image pick-up device unit in a camera according to a ninth embodiment of the present invention. FIG. 63 is the perspective view seen from the front side (on the dust-proofing member side) and FIG. 64 is the perspective view seen from the back side (on the image pick-up device side). FIG. 65 is a main-part enlarged sectional view along a line 65-65 shown in FIG. 64.

According to the ninth embodiment, the structure is basically the same as that according to the fifth embodiment and only the structures of a member for vibration 22J and the conductive members (22aa and 22bb) provided therefor are different. Therefore, a description and an illustration of other structures are omitted and referred to the description of the fifth embodiment and FIGS. 1 to 11.

According to the ninth embodiment, referring to FIGS. 63 to 65, a pierced hole 66 is pierced at a predetermined position of the member for vibration 22J. A part of the first conductive member 22bb provided on one surface of the member for vibration 22J, namely, on the surface where it is adhered to the dust-proofing filter 21 is formed along an inner-wall surface of the pierced hole 66. Further, the first conductive member 22bb is extended to another surface of the member for vibration 22J, namely, to the reversed surface of the dust-proofing filter 21 side surface (the surface on the back side on which the second conductive member 22aa is provided).

Corresponding to thereto, referring to FIG. 65, the second conductive member 22aa formed on the reversed surface is formed, evacuated from a peripheral portion of the extending portion of the first conductive member 22bb. On the reversed surface (surface on the back side), the insulating portion 65 is circularly formed between the extending portion of the first conductive member 22bb and the second conductive member 22aa. Thus, the conduction of the extending portion of the first conductive member 22bb and the second conductive member 22aa is prevented on the reversed surface.

Other structures are the same as those according to the fifth embodiment.

With the above structure according to the ninth embodiment, the same advantages as those according to the fifth embodiment are obtained.

Next, a description is given of a tenth embodiment of the present invention.

According to the tenth embodiment, the structures of a camera and an image pick-up device unit used therefor are substantially the same as those according to the first embodiment and only surface treatment of a dust-proofing member (dust-proofing filter) is different. Therefore, the following is referred to FIGS. 1 to 11 used for the description of the first embodiment and to the description thereof. An illustration and a detailed description are omitted and only the surface treatment of the dust-proofing member (dust-proofing filter 21) is described in detail.

In the image pick-up device unit of the camera according to the tenth embodiment, the dust-proofing filter 21 is subjected to the surface treatment by an electrostatic charge preventing member. A transparent conductive film for the optical system is used as the electrostatic charge preventing member. As the transparent conductive film, a metal transparent conductive film made of Gold (Au), Silver (Ag), Platinum (Pt), etc., and an oxide semiconductor transparent conductive film made of Indium Oxide ($In_2O_3$), Tin Oxide ($SnO_2$), Zinc Oxide ($ZnO_2$), Indium Tin Oxide, Cadmium Tin Oxide, etc, are applicable. The metal transparent conductive film has a problem on the translucency and the film intensity and therefore the optical fields mainly use the oxide semiconductor transparent conductive film.

As a film forming method of the metal transparent conductive film, a sputtering method and a vacuum deposition method are available.

A film forming method of the Tin Oxide is a spraying method, a chemical vapor deposition (CVD), a vacuum deposition method, a sputtering method, or the like.

A film forming method of the Indium Oxide or Indium Tin Oxide is the spraying method, the chemical vapor deposition (CVD) method, a dip method, a spinner method, a coating method, the vacuum deposition method, the sputtering method, or the like.

Further, a film forming method of the Cadmium Tin Oxide includes the spraying method, and the sputtering method, or the like.

At least a reversed surface of the surface opposed to the image pick-up device 27 in the dust-proofing filter 21 (on the surface opposed to the photographing optical system 12a) may be subjected to the above-described surface treatment or both surfaces of the dust-proofing filter 21 may be subjected thereto. The surface treatment of both the surfaces does not require the consideration of the direction of the dust-proofing filter 21 and therefore troublesome work is unnecessary upon assembling and manufacturing. The thin film is necessarily formed onto both the surfaces by the dip method.

As mentioned above, according to the tenth embodiment, dust, etc. adhered to the dust-proofing filter 21 (dust-proofing member or optical member) can be removed by vibrating the dust-proofing filter 21 by using the member for vibration 22 arranged at the peripheral portion of the dust-proofing filter 21. In addition, the electrostatic charge preventing member performs the surface treatment at least to the reversed surface of the surface facing the image pick-up device in the dust-proofing filter 21. Thus, dust, etc. are removed irrespective of adhering factors and the size of the dust particles, etc. The adhered dust and the like can easily be removed by slight vibration applied by the member for vibration 22.

Next, an eleventh embodiment of the present invention will be described.

According to the eleventh embodiment, the structures of the camera and the image pick-up device unit are substantially the same as those according to the first embodiment. However, the structure of the member for vibration is slightly different. Consequently, FIGS. 1 and 2 and 4 to 11 for the first embodiment and the description thereof are referred to. An illustration and a detailed description are omitted, the same reference numeral denotes the same member, and only the structure of the member for vibration is described in detail hereinbelow.

According to the eleventh embodiment, similarly to the above embodiments, a member for vibration 22K used for the image pick-up device unit 15 is provided at the peripheral portion of the dust-proofing filter 21 by using predetermined adhering means such as an adhesive, as a member for vibration for applying predetermined vibrations to the dust-proofing filter 21 by externally applying a predetermined driving voltage to the dust-proofing filter 21.

Figure 66:
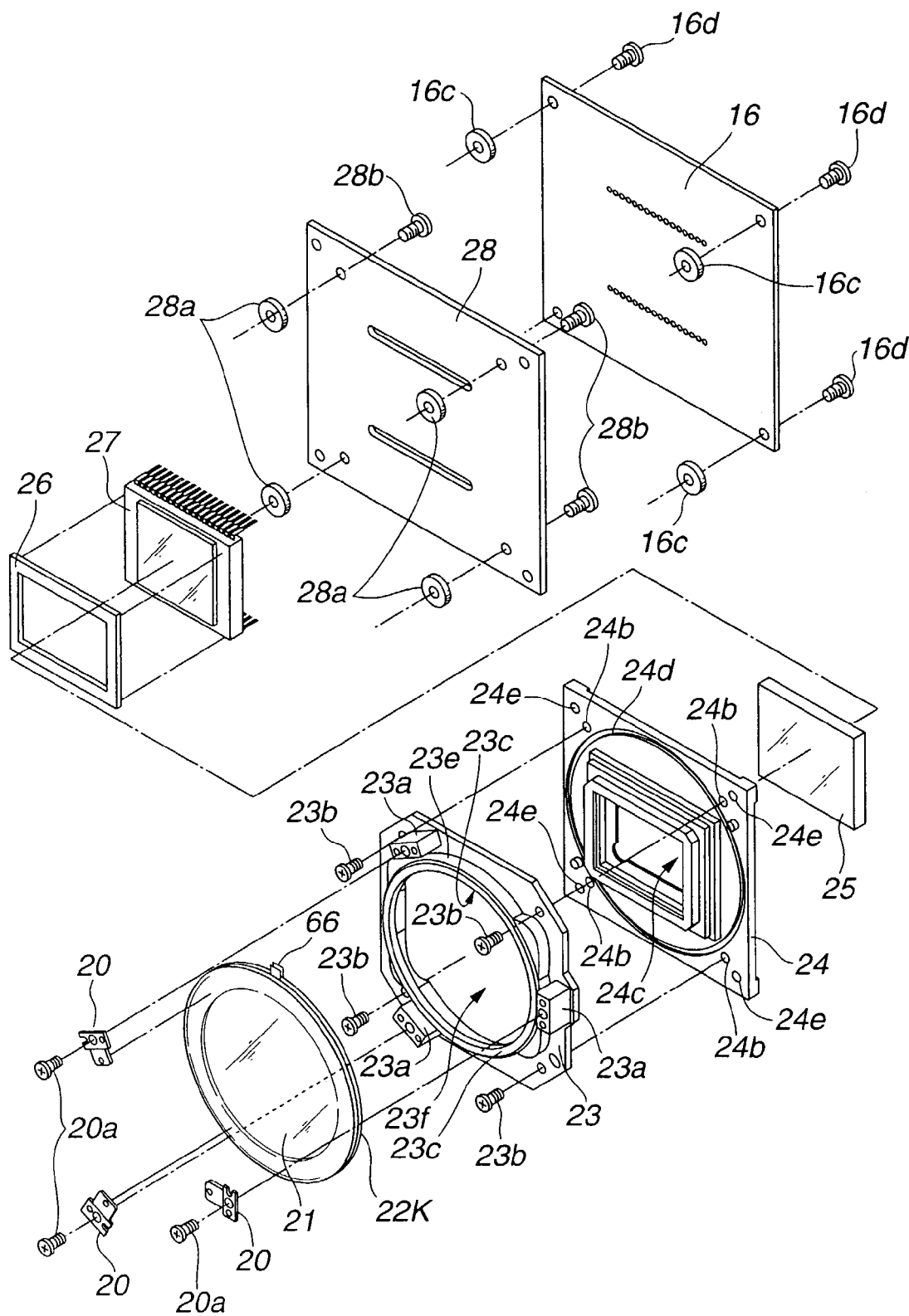
FIG. 66 is a main-part exploded perspective view showing by extracting a part of a disassembled image pick-up device unit in a camera according to an eleventh embodiment of the present invention.
Figure 67:
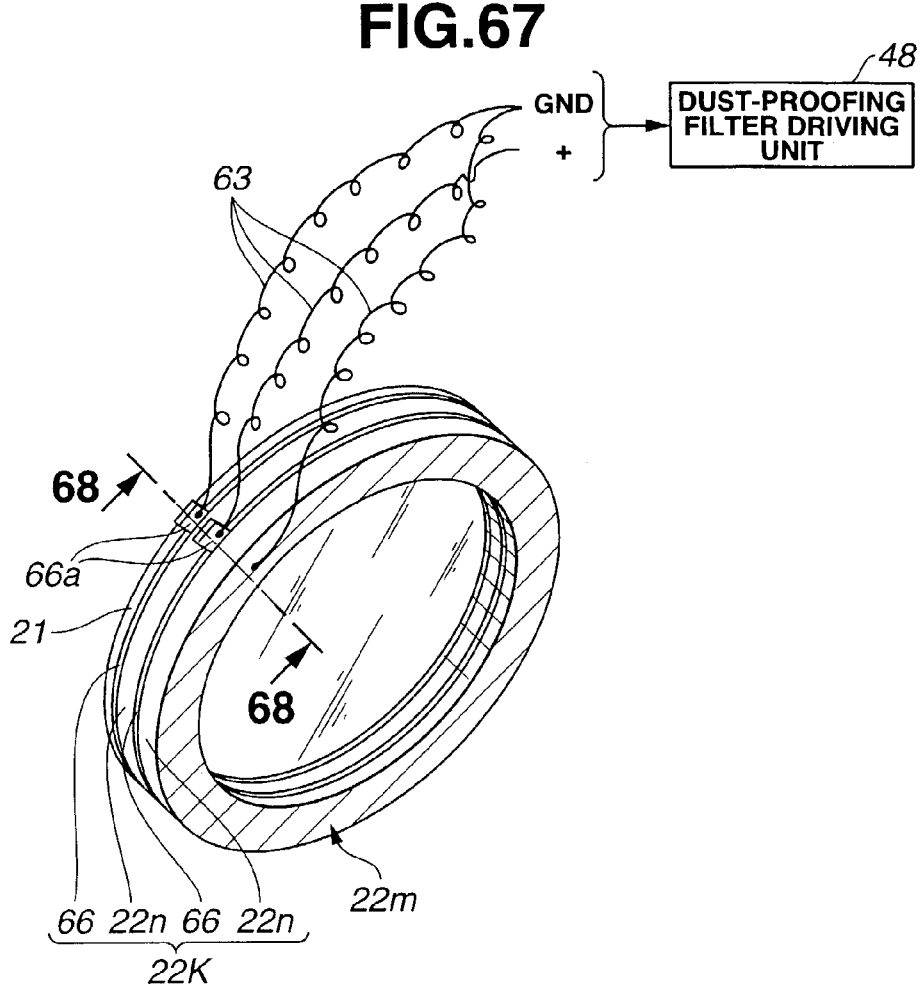
FIG. 67 is a perspective view showing the back side (on the image pick-up device side), by extracting a part of members (a dust-proofing member, a member for vibration, a conductive plate, etc.) forming the image pick-up device unit shown in FIG. 66.
Figure 68:
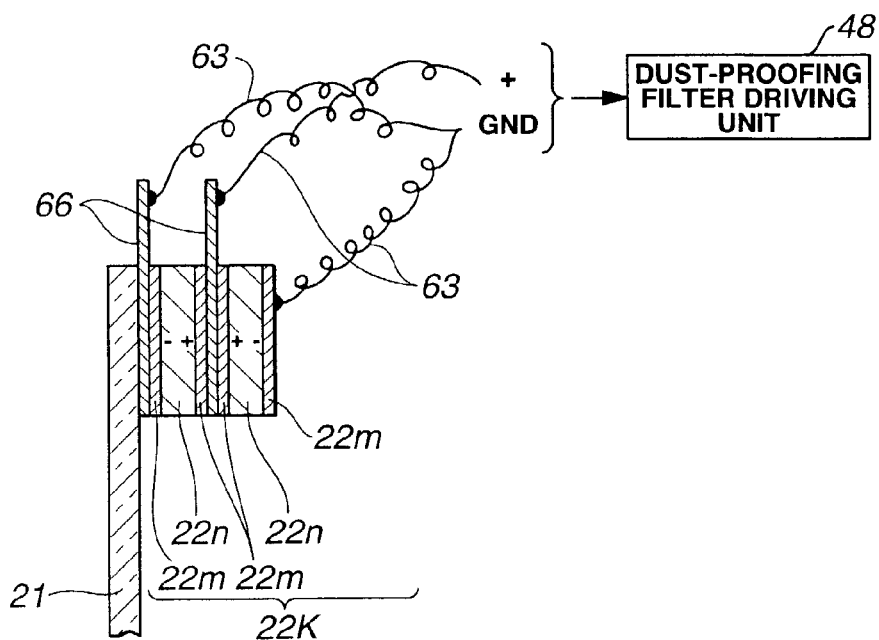
FIG. 68 is a sectional view along a line 68-68 shown in FIG. 67.

A description is given of the detailed structures of the member for vibration 22K and the dust-proofing filter 21 (dust-proofing member) with reference to FIGS. 66, 67, and 68.

FIG. 66 corresponds to FIG. 3 used for the description of the first embodiment, and is different from FIG. 3 in the illustration of only the structure of the member for vibration 22K according to the eleventh embodiment.

FIGS. 67 and 68 are diagrams showing by extracting a part of members forming an image pick-up device unit in a camera according to the eleventh embodiment. FIG. 67 is a perspective view showing by extracting a dust-proofing member (optical member; dust-proofing filter 21), a member for vibration, and a conductive plate, and seen from the back side (on the image pick-up device side). FIG. 68 is a sectional view along an R-R line shown in FIG. 67.

The member for vibration 22K in the image pick-up device unit 15 is multi-layering structured by alternately laminating a vibrating device 22n, which is made of piezoelectric ceramics as a plate-shaped electromechanical transducer with a substantially circular shape, and an electrode 22*m* (refer to FIG. 68) formed onto both surfaces of the vibrating device 22*n*, which apples a voltage thereto. Because vibrating force becomes stronger without changing the applied voltage by multi-layering the member for vibration 22K.

Referring to FIG. 67, only the electrode 22*m* of the surface portion shown by shading is shown and the electrode (22*m*) provided for interlayer portions is not shown. The electrode 22*m* provided for the interlayer portions is shown in FIG. 68.

With the member for vibration 22K having the multi-layering structure, according to the eleventh embodiment, a conductive plate 66 made of a circular thin-film member is arranged between layers of a plurality of vibrating devices 22*n* forming the member for vibration 22K. As a result, the conductive plate 66 is arranged in contact with the electrodes 22*m* of the member for vibration 22K.

Further, a piece 66*a* whose part is projected toward the outside is integrally formed at an outer edge portion of the conductive plate 66. Therefore, the piece 66*a* is conductive to the electrodes 22*m* provided between the layers of the vibrating devices 22*n* by connecting the connecting member such as the lead 63 to the piece 66*a*.

According to the eleventh embodiment, referring to FIG. 68, the member for vibration 22K comprises the two-layer vibrating device 22*n* as an example. The member for vibration 22K is annularly arranged onto the outer edge portion of the dust-proofing filter 21. The two conductive plates 66 are provided between the layers.

In this case, one of the two conductive plates 66 is sandwiched between the dust-proofing filter 21 and the other of the conductive plates 66. The other conductive plate 66 is sandwiched between the layers of the two-layer member for vibration 22*n*. The piece 66*a* of the one conductive plate 66 and the electrode 22*m* on the outer surface of the member for vibration 22 on the outer side (on the image pick-up device side) are connected to the ground (GND) via the lead 63. The piece 66*a* of the other conductive plate 66 is connected to the dust-proofing filter driving unit 48.

The dust-proofing filter 21 is vibrated by applying a predetermined periodic voltage to the member for vibration 22K from the dust-proofing filter driving unit 48 at a predetermined timing.

According to the eleventh embodiment, the same advantages as those according to the first embodiment are obtained.

Further, according to the eleventh embodiment, the member for vibration 22K is multi-layering structured. Thus, stronger vibrating force is obtained without changing the applied voltage. In order to solve a problem which is caused by the multi-layered member for vibration 22K, a problem that the electrode 22*m* positioned between the layers is not conductive, the conductive layer 66 having the piece 66*a* is arranged between the layers, thus to easily make the electrode 22*m* between the layers conductive. Therefore, the member for vibration 22K is easily multi-layered with the simple structure.

According to the eleventh embodiment, means for making the electrode 22*m* provided between the layers of the member for vibration 22 is not limited to the means according to the eleventh embodiment and can variously be formed. Another embodiment in which the electrode 22*m* is conductive between the layers is described hereinbelow.

Figure 69:
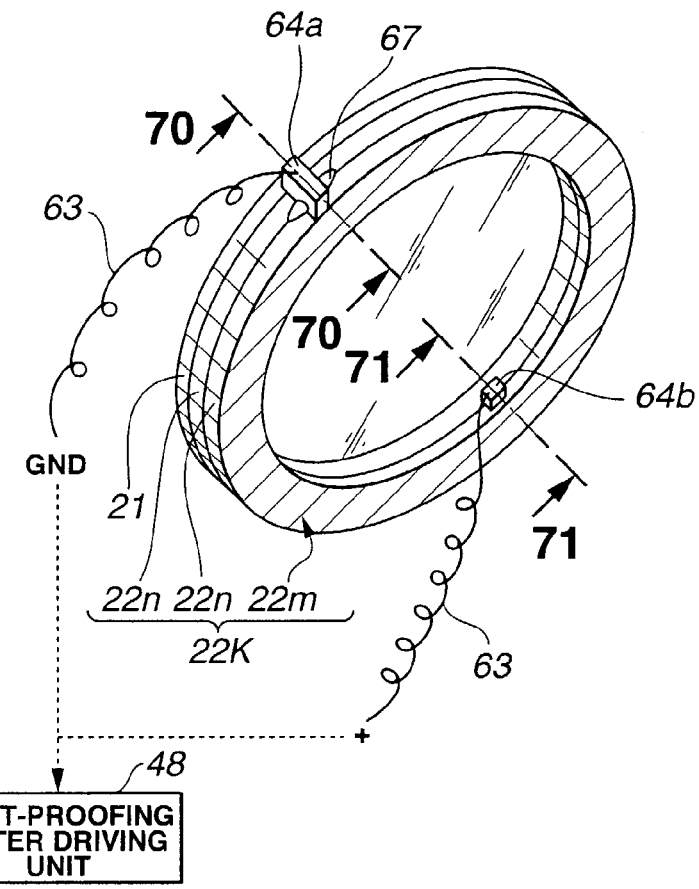
FIG. 69 is a perspective view showing the back side (on the image pick-up device side), by extracting a part of members (a dust-proofing filter, a member for vibration, a conductive plate, etc.) forming an image pick-up device unit according to a twelfth embodiment of the present invention.
Figure 70:
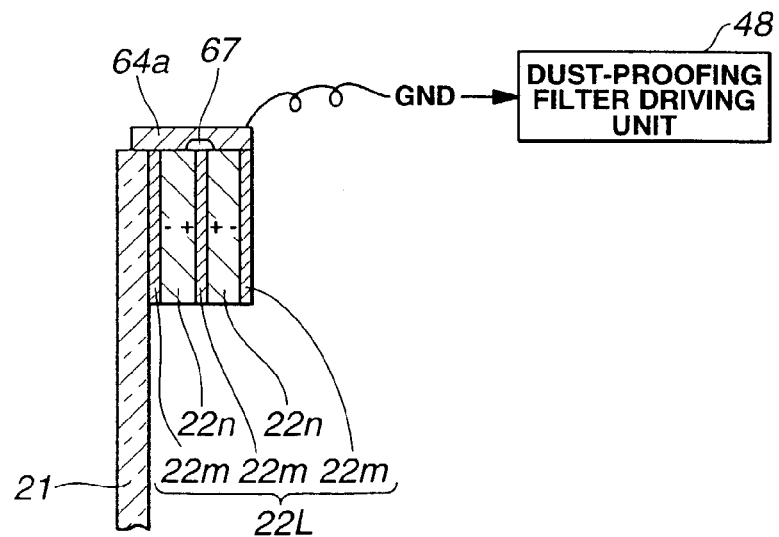
FIG. 70 is a sectional view along a line 70-70 shown in FIG. 69.
Figure 71:
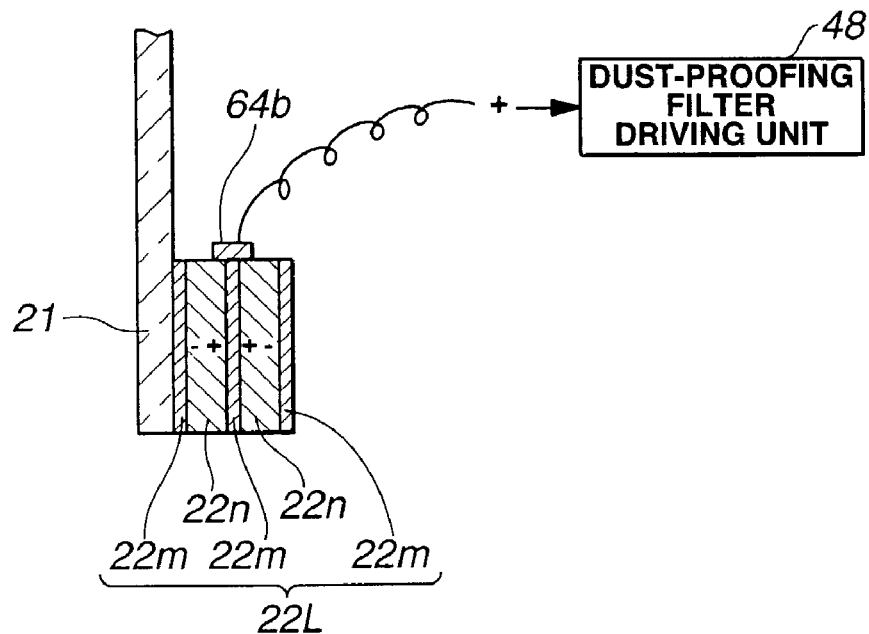
FIG. 71 is a sectional view along a line 71-71 shown in FIG. 69.

FIGS. 69 to 71 are diagrams according to a twelfth embodiment of the present invention. FIG. 69 is a perspective view showing by extracting a part (a dust-proofing member and a member for vibration) of members forming an image pick-up device unit, and seen from the back side (on the image pick-up device side). FIG. 70 is a sectional view along a line 70-70 shown in FIG. 69. FIG. 71 is a sectional view along a line 71-71 shown in FIG. 69.

According to the twelfth embodiment, a member for vibration 22L is multi-layered similarly to the eleventh embodiment. However, the conductive plate 66 according to the eleventh embodiment is excluded.

The member for vibration 22L is formed by alternately laminating the vibrating device 22*n* and the electrode 22*m* for applying the voltage to the vibrating device 22*n*, and is the two-layer structure according to the twelfth embodiment. In order to make conductive between the electrode 22*m* formed onto the outer surface side of the vibrating device 22*n* at the outermost one of the electrodes 22*m* (on the image pick-up device side) and the electrode 22*m* in contact with the dust-proofing filter 21, a first conductive member 64*a* made of silver paste, a conductive adhesive, and the like is arranged at a part of the outer edge portion of the member for vibration 22L. The lead 63 is connected to the first conductive member 64*a* and the first conductive member 64*a* is connected to the ground (GND) via the lead 63.

In order to make non-conductive only the interlayer electrode 22*m* provided at the position sandwiched between the two vibrating devices 22*n*, an insulating member 67 such as epoxy resin is formed at the position in contact with the interlayer electrode 22*m* as shown in FIGS. 69 and 70 in the first conductive member 64*a*.

Referring to FIG. 71, a second conductive member 64*b* made of the same material as that of the first conductive member 64*a* is provided at a position in contact with the interlayer electrode 22*m* at the inner peripheral portion of the member for vibration 22L. The lead 63 is connected to the second conductive member 64*b* which is electrically connected to the dust-proofing filter driving unit 48 via the lead 63.

Other structures are the same as those according to the eleventh embodiment.

According to the twelfth embodiment, with the above-formed structure, the same advantages as those according to the eleventh embodiment are obtained.

Figure 72:
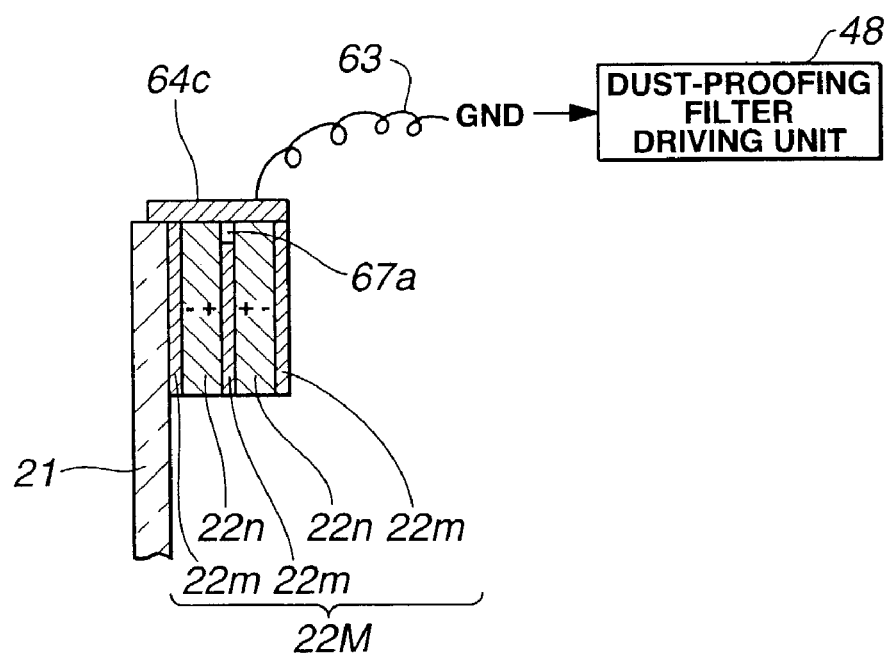
FIG. 72 is a sectional view showing portions along the line 70-70 shown in FIG. 69 according to a thirteenth embodiment of the present invention.

FIG. 72 is a sectional view along a line 70-70 in FIG. 69 according to a thirteenth embodiment of the present invention.

According to the thirteenth embodiment, the structure is substantially the same as that according to the eleventh embodiment. However, a member for vibration 22M is different from that according to the eleventh embodiment in the following point.

That is, according to the thirteenth embodiment, in the member for vibration 22M, the electrode 22*m* sandwiched between the layers of the two vibrating devices 22*n* is formed with a predetermined non-exposure area 67*a* so that the electrode 22*m* is not exposed to the outer peripheral edge portion.

According to the eleventh and twelfth embodiments, the electrodes 22*m* are formed all over both surfaces of the vibrating device 22*n*. However, according to the thirteenth embodiment, only the interlayer electrode 22*m* is formed excluding a predetermined range (portion shown by reference numeral 67*a*) on the outermost peripheral portion side.

Corresponding thereto, according to the thirteenth embodiment, a first conductive member 64*c* is used, in place of the first conductive member 64*a* according to the twelfth embodiment. The first conductive member 64*c* is simply formed by excluding the insulating member 67 of the first conductive member 64a according to the twelfth embodiment.

That is, according to the thirteenth embodiment, the interlayer electrode 22m is not exposed to the outer peripheral edge portion. Thus, when using the first conductive member 64c which is formed by excluding the insulating member 67, the first conductive member 64c makes only the interlayer electrode 22m non-conductive and makes two other electrodes 22m conductive.

The first conductive member 64a is connected to the lead 63 via which it is connected to the ground (GND). On the other hand, similarly to the twelfth embodiment, though not shown, the lead (63) is connected to the second conductive member (64b) which is electrically connected to the dust-proofing filter driving unit 48 via the lead (63).

Other structures are the same as those according to the eleventh embodiment.

According to the thirteenth embodiment, with the above structure, the same advantages as those according to the eleventh and twelfth embodiments are obtained. Further, according to the thirteenth embodiment, the insulating member 67 is not formed and this contributes to the reduction in manufacturing costs.

Figure 73:
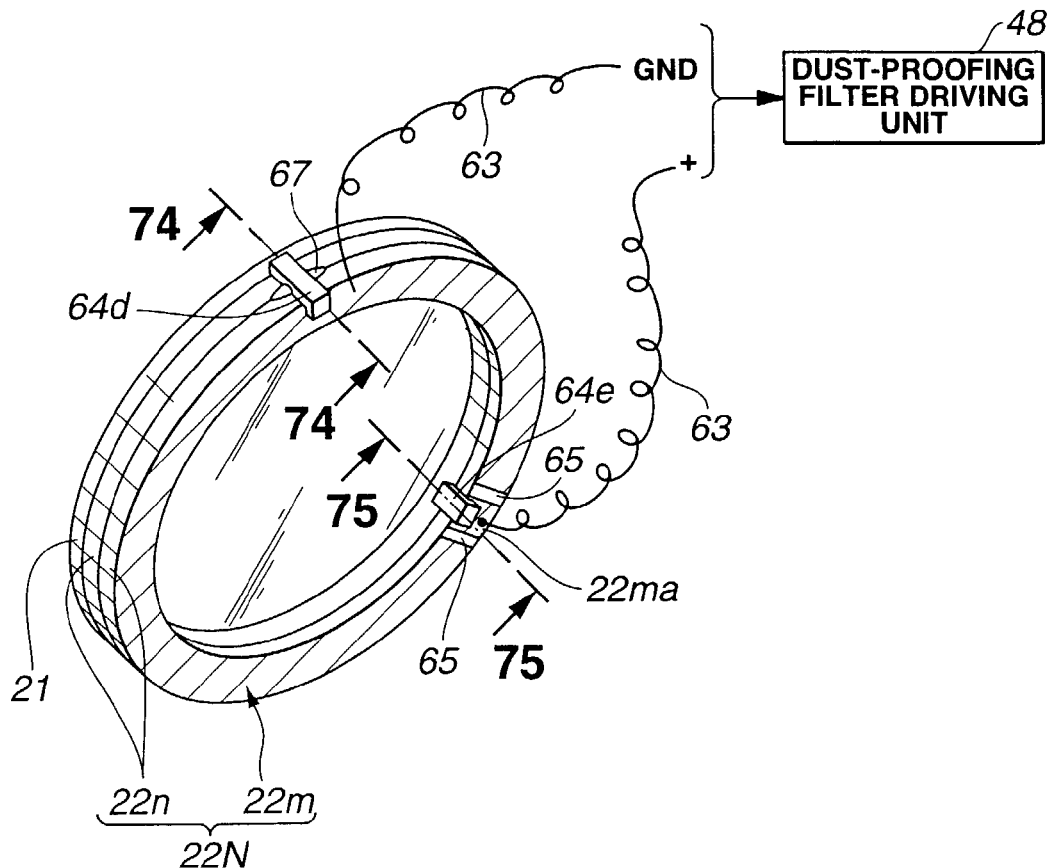
FIG. 73 is a perspective view seen from the back side (on an image pick-up device side) of a part of members (a dust-proofing filter, a member for vibration, a conductive plate, etc.) forming an image pick-up device unit according to a fourteenth embodiment of the present invention.
Figure 74:
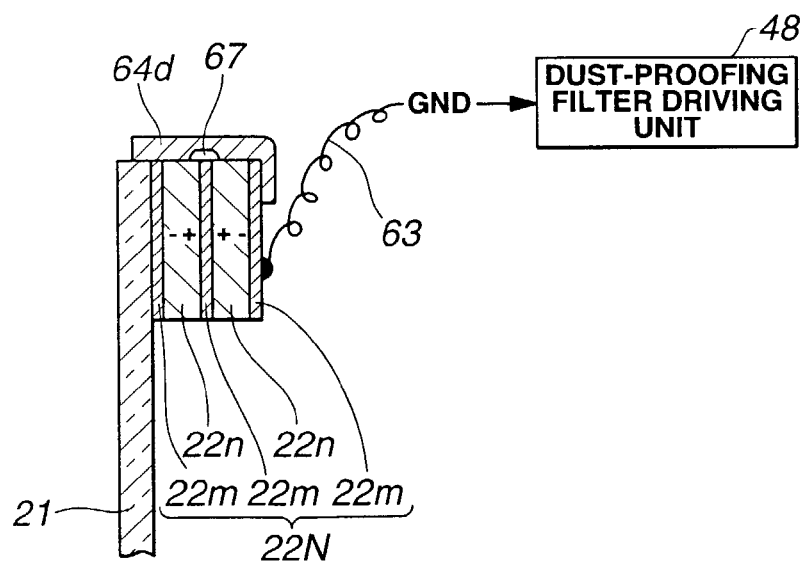
FIG. 74 is a sectional view along a line 74-74 shown in FIG. 73.
Figure 75:
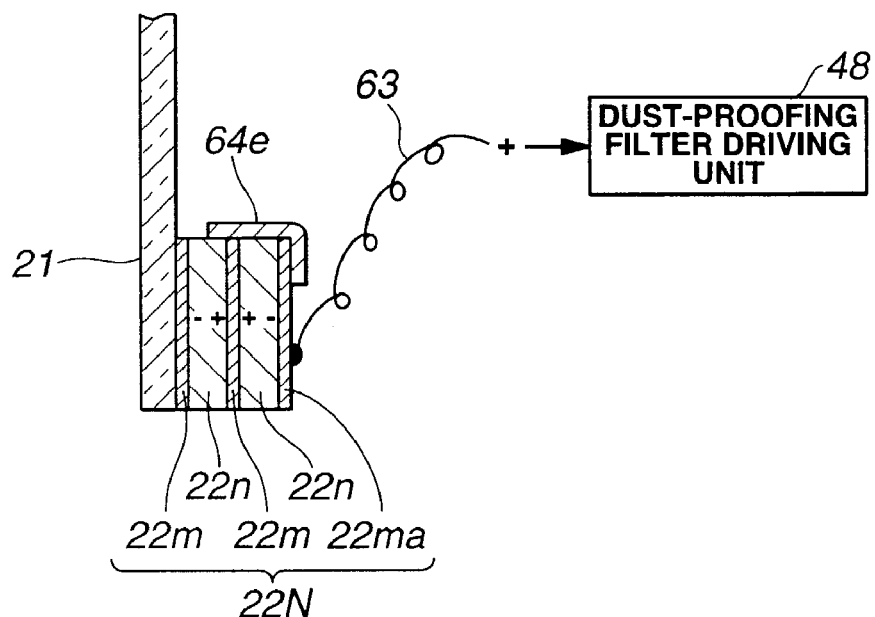
FIG. 75 is a sectional view along a line 75-75 shown in FIG. 73.

FIGS. 73 to 75 are diagrams according to a fourteenth embodiment of the present invention. FIG. 73 is a perspective view showing by extracting a part of members (a dust-proofing member and a member for vibration) forming an image pick-up device unit, and seen from the back side (on the image pick-up device side). FIG. 74 is a sectional view along a line 74-74 shown in FIG. 73. FIG. 75 is a sectional view along a line 75-75 shown in FIG. 73.

According to the fourteenth embodiment, the structure is substantially the same as that according to the twelfth embodiment. However, the following is different according to the twelfth embodiment.

According to the fourteenth embodiment, a first conductive member 64d different from the first conductive member 64a according to the twelfth embodiment is used in place thereof. The first conductive member 64a according to the twelfth embodiment is arranged only at the outer peripheral edge portion of the member for vibration 22L. However, according to the fourteenth embodiment, in a member for vibration 22N, the first conductive member 64d is further extended to the outer surface side of the vibrating device 22n to be arranged outside (on the image pick-up device side).

That is, referring to FIG. 74, the first conductive member 64d in the member for vibration 22N according to the fourteenth embodiment has a cross section with a substantially L-shape. The inner wall surface of a short bowl portion of the first conductive member 64d is in contact with the electrode 22m on the outer surface side of the vibrating member 22n and thus the first conductive member 64d is further surely conductive. The electrode 22m on the outer surface side is connected to the lead 63, via which it is connected to the ground (GND).

According to the fourteenth embodiment, a second conductive member 64e different from the second conductive member 64b according to the twelfth embodiment is used in place thereof. The second conductive member 64b according to the twelfth embodiment is arranged only to the inner peripheral edge portion of the member for vibration 22L. However, in the member for vibration 22N according to the fourteenth embodiment, the second conductive member 64e is extended to the outer surface side of the vibrating device 22n to be arranged to the outside (on the image pick-up device side). That is, the second conductive member 64e is formed with the substantially L-shaped cross-section as shown in FIG. 75.

Corresponding thereto, according to the fourteenth embodiment, the insulating portion 65 is arranged at a part of the electrode 22m formed to the outer surface side of the vibrating device 22n at the outermost side (on the image pick-up device side). Further, an electrode 22ma is formed within the insulating portion 65. In other words, the insulating portion 65 is provided between the electrode 22ma and the electrode 22m formed on the same surface as that of the electrode 22ma, and the electrode 22ma is insulated to the electrode 22m by the insulating portion 65, thereby being made non-conductive thereto.

The inner wall surface of the short bowl portion of the second conductive member 64e is in contact with the electrode 22ma. Consequently, the conductive status is more surely established. The dust-proofing filter driving unit 48 is electrically connected to the electrode 22ma via the lead 63.

Other structures are the same as those according to the eleventh embodiment.

According to the fourteenth embodiment, the same advantages as those according to the eleventh to thirteenth embodiments are obtained. Further, according to the fourteenth embodiment, the electrode 22m is extended to the outer surface of the vibrating device 22n at the outermost side (on the image pick-up device side) so that it becomes conductive and this contributes to the simple wiring. In addition, the manufacturing process is simplified and the manufacturing costs are reduced.

Figure 76:
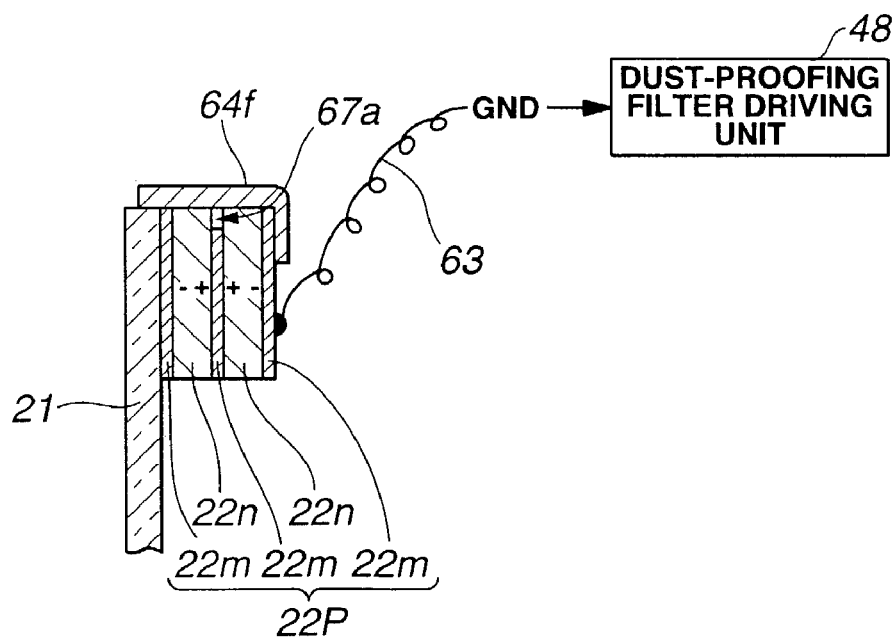
FIG. 76 is a sectional view showing portions along the line 74-74 shown in FIG. 73 according to a fifteenth embodiment of the present invention.

FIG. 76 is a sectional view along a line 74-74 shown in FIG. 73 according to a fifteenth embodiment of the present invention.

According to the fifteenth embodiment, the structure is the same as that according to the fourteenth embodiment and is formed by the same application as that according to the thirteenth embodiment.

A member for vibration 22P according to the fifteenth embodiment is formed with the predetermined non-exposure area 67a such that the electrode 22m sandwiched between the layers of the two vibrating devices 22n is not exposed to the outer peripheral edge portion, similarly to the thirteenth embodiment.

Corresponding thereto, according to the fifteenth embodiment, a first conductive member 64f is used, in place of the first conductive member 64d according to the fourteenth embodiment. The first conductive member 64f is simply formed by excluding the insulating member 67 of the first conductive member 64d according to the fourteenth embodiment.

Thus, the first conductive member 64f makes only the interlayer electrode 22m non-conductive and two other electrodes 22m conductive. Other structures are the same as those according to the fourteenth embodiment.

According to the fifteenth embodiment, with the above structure, the same advantages as those according to the eleventh to fourteenth embodiments are obtained. Further, the shape of the first conductive member 64f is simplified and this contributes to the reduction in manufacturing costs.

According to the eleventh embodiment, as the example of the multi-layering structure, the member for vibration 22K is two-layering structured (according to the eleventh to fifteenth embodiments (refer to FIGS. 67 to 76)). The multi-layering structure of the member for vibration 22K is not limited to this and can easily be structured with more layers.

Figure 77:
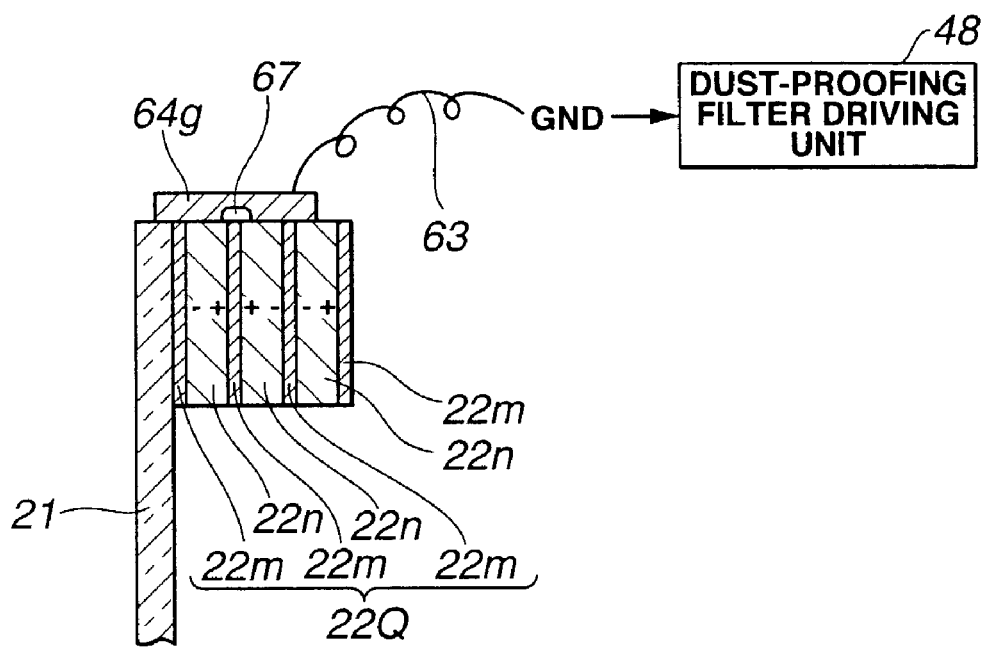
FIG. 77 is a sectional view showing portions along the line 70-70 shown in FIG. 69 according to a sixteenth embodiment of the present invention.
Figure 78:
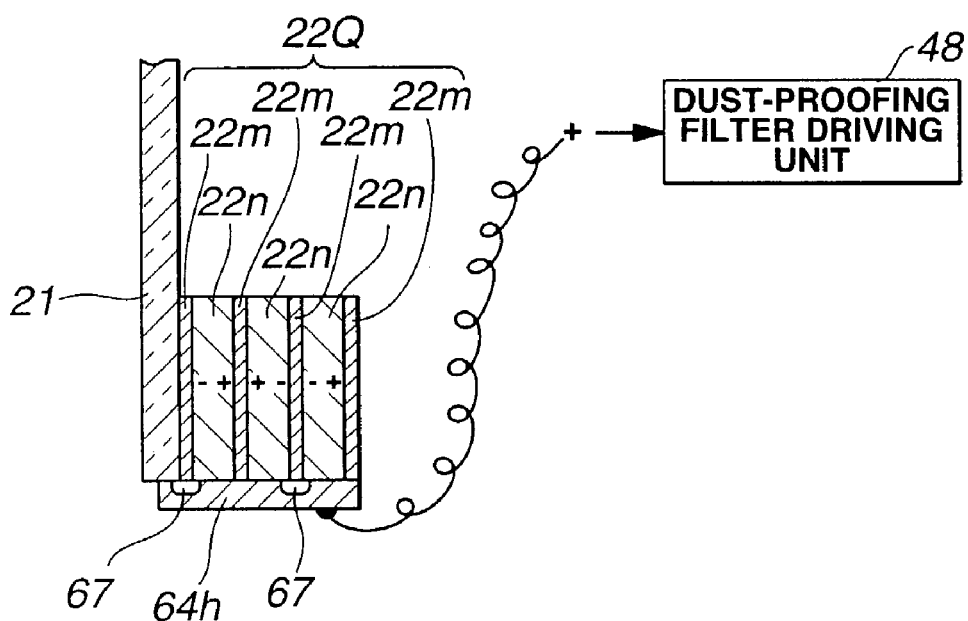
FIG. 78 is a sectional view showing portions along the line 71-71 shown in FIG. 69 according to a seventeenth embodiment of the present invention.

FIGS. 77 and 78 show an example of the member for vibration which is three-layering structured according to a sixteenth embodiment of the present invention. FIG. 77 is a sectional view showing a portion along a line 70-70 shown in FIG. 69. FIG. 78 is a sectional view showing a portion along a line 71-71 shown in FIG. 69.

According to the sixteenth embodiment, the structure is basically substantially the same as that according to the twelfth embodiment. However, unlike the twelfth embodiment, a member for vibration 22Q has three layers and in accordance therewith, a first conductive member 64g and a second conductive member 64h are formed with corresponding shapes.

In this case, referring to FIG. 77, the first conductive member 64g makes conductive between the electrode 22m arranged on a contact surface with the dust-proofing filter 21 and the electrode 22m having the same polarity as that of the former electrode 22m. The insulating member 67 is formed to the first conductive member 64g and is made non-conductive with an electrode other than necessary one. Further, the first conductive member 64g is connected to the ground (GND) via the lead 63.

Referring to FIG. 78, the second conductive member 64h makes conductive a plurality of electrodes 22m other than the electrode 22m which is made conductive by the first conductive member 64g. The insulating member 67 is formed also to the second conductive member 64h and is made non-conductive with an electrode other than the necessary one. The second conductive member 64h is electrically connected to the dust-proofing filter driving unit 48 via the lead 63.

Other structures are the same as those according to the twelfth embodiment.

According to the sixteenth embodiment, with the above-formed structure, the member for vibration 22Q with the multi-layering structure is easily formed.

According to the embodiments based on the eleventh embodiment, the first conductive member is mainly arranged to the outer peripheral portion and the second conductive member is mainly arranged to the inner peripheral portion as an example. The arrangement positions of the first conductive member and the second conductive member are not limited and, of course, it can freely be combined.

According to the eleventh embodiment to sixteenth embodiments, the dust-proofing filter 21 comprises the substantially circular plate-shaped optical member and, however, it is not limited to this. For example, the dust-proofing filter 21 may comprise a polygonal plate-shaped optical member as shown by reference numeral 21G in FIGS. 79 and 80.

Figure 79:
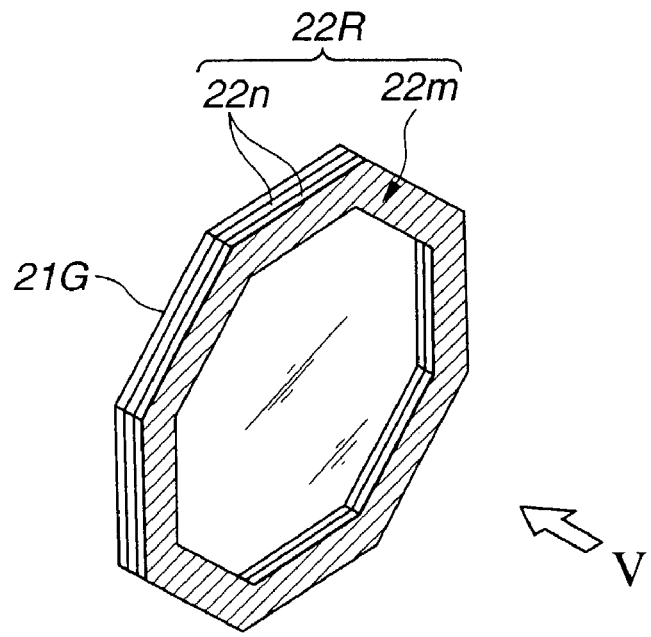
FIG. 79 is a perspective view seen from the back side (on an image pick-up device side) of the schematic structure of a part of members (a dust-proofing member and a member for vibration) forming an image pick-up device unit according to an eighteenth embodiment of the present invention.
Figure 80:
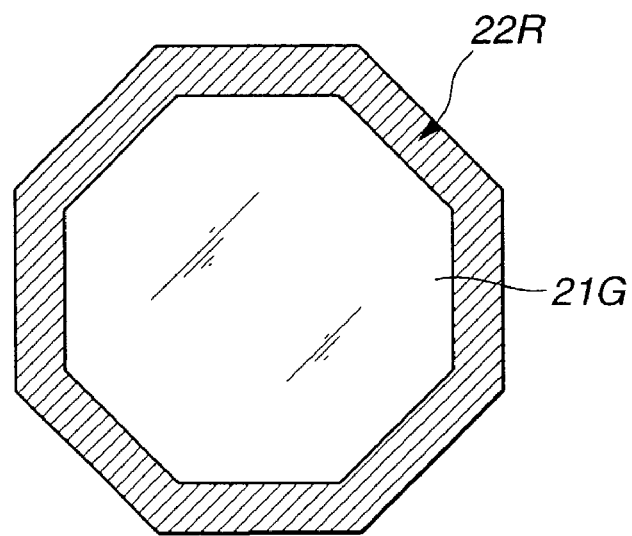
FIG. 80 is a front view seen from the direction indicated by an arrow V in FIG. 79.

FIG. 79 is a perspective view showing the schematic structure, wherein a dust-proofing member (dust-proofing filter 21G) as a part of members forming an image pick-up device unit and a member for vibration (22R) according to a seventeenth embodiment of the present invention are extracted and seen from the back side (on the image pick-up device side). FIG. 80 is a front view seen from the direction indicated by an arrow V shown in FIG. 79.

As mentioned above, according to the seventeenth embodiment, the dust-proofing filter 21G comprises the polygonal plate-shaped optical member. The shape of the member for vibration 22R is formed corresponding to the dust-proofing filter 21G, and is adhered to one surface near the outer peripheral portion thereof.

The member for vibration 22R is not limited to the circular shape as shown according to the eleventh embodiment and may be formed by arranging a plurality of rect-angular pieces at the peripheral portion of the dust-proofing filter 21 such that they surround the transparent portion thereof (refer to FIG. 24).

According to the above embodiments, the dust-proofing filter is fixed and supported to the dust-proofing filter supporting member so that it is airtightly jointed to the dust-proofing filter supporting member (via the member for vibration interposed). Hereinbelow, according to eighteenth to twenty-first embodiments, a jointing portion of the dust-proofing filter and the dust-proofing filter supporting member are described in detail.

Figure 81:
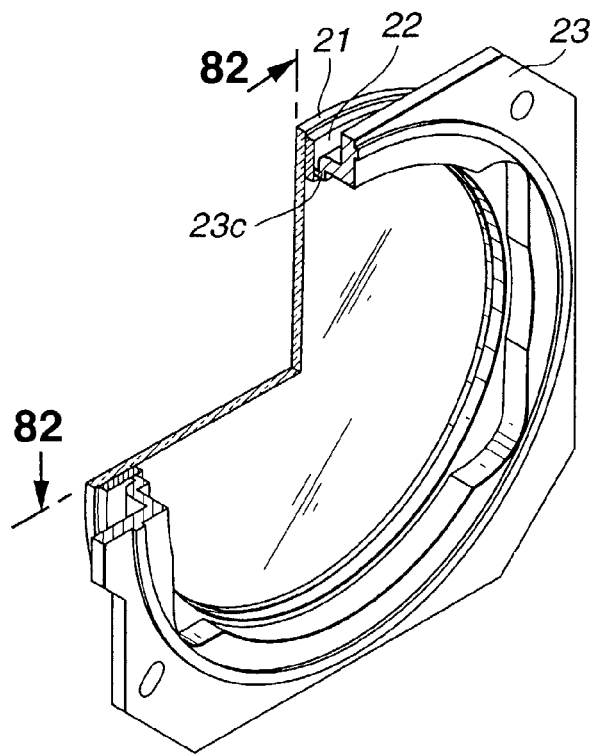
FIG. 81 is a perspective view showing by extracting a part of members (a dust-proofing filter, the member for vibration, and a dust-proofing filter supporting member) forming the image pick-up device unit in a camera according to the eighteenth embodiment of the present invention.
Figure 82:
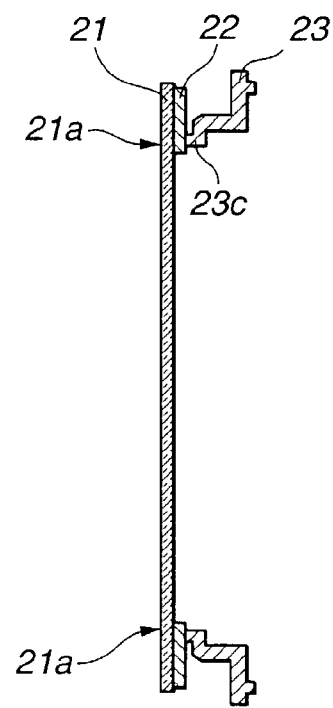
FIG. 82 is a sectional view along a line 82-82 shown in FIG. 81.

FIGS. 81 and 82 are diagrams showing by extracting the dust-proofing filter 21, the member for vibration 22, and the dust-proofing filter supporting member 23, as a part of members forming an image pick-up device unit, which are assembled, according to the eighteenth embodiment of the present invention. FIG. 81 is a perspective view seen from the side opposed to the image pick-up device (on the back side). FIG. 82 is a sectional view along a line 82-82 shown in FIG. 81. The structure according to the eighteenth embodiment is the same as that according to the first embodiment. Hereinbelow, a description is given with reference to FIGS. 1 to 11 and the description thereof according to the first embodiment, and the jointing portion of the dust-proofing filter and the dust-proofing filter supporting member is mentioned with reference to FIGS. 81 and 82.

Referring to FIGS. 81 and 82, according to the eighteenth embodiment, the dust-proofing filter 21 is fixed and supported to the dust-proofing filter supporting member 23 so that it is airtightly jointed to the dust-proofing filter supporting member 23 via the member for vibration 22 interposed.

In this case, the supporting portion 23c of the dust-proofing filter supporting member 23 forming a part of the sealing structure is abutted on a predetermined portion (supporting portion) of the member for vibration 22 provided for the dust-proofing filter 21 and support it. The supporting portion is set at an adjacent portion of the node 21a upon the vibrations caused by the member for vibration 22.

The dust-proofing filter 21 is supported by the sealing structure (supporting portion 23c of the dust-proofing filter supporting member 23). In this case, the member for vibration 22 is interjacent in the supporting portion as the sealing structure.

As mentioned above, not only the advantages according to the first embodiment but also those according to the eighteenth embodiment are obtained. That is, the outer diameter of the dust-proofing filter 21 is reduced by the formation of the supporting portion 23c (sealing structure) of the dust-proofing filter supporting member 23 which supports the dust-proofing filter 21 by the supporting portion near the node upon vibrations caused by the member for vibration 22 and by the formation of the member for vibration 22 which is interjacent in the supporting portion as the sealing structure. Further, the passage area of the valid beams transmitted through the dust-proofing filter 21 can widely be assured.

According to the eighteenth embodiment, the dust-proofing filter 21 is airtightly supported to the dust-proofing filter supporting member 23 via the member for vibration 22 interposed. However, as mentioned above, the position of the node 21a for vibrating the dust-proofing filter 21 varies depending on the size (thickness or diameter) of the dust-proofing filter 21 or the size of the member for vibration 22 which vibrates the dust-proofing filter 21. Therefore, the position of the supporting portion of the dust-proofing filter 21 in the dust-proofing filter supporting member 23 is not limited to the position where the supporting portion 23c of the dust-proofing filter supporting member 23 is abutted on the member for vibration 22 interposed. It is preferable that the position of the supporting portion in the dust-proofing filter supporting member 23 may be set depending on the position of the node 21a upon vibrations.

Figure 83:
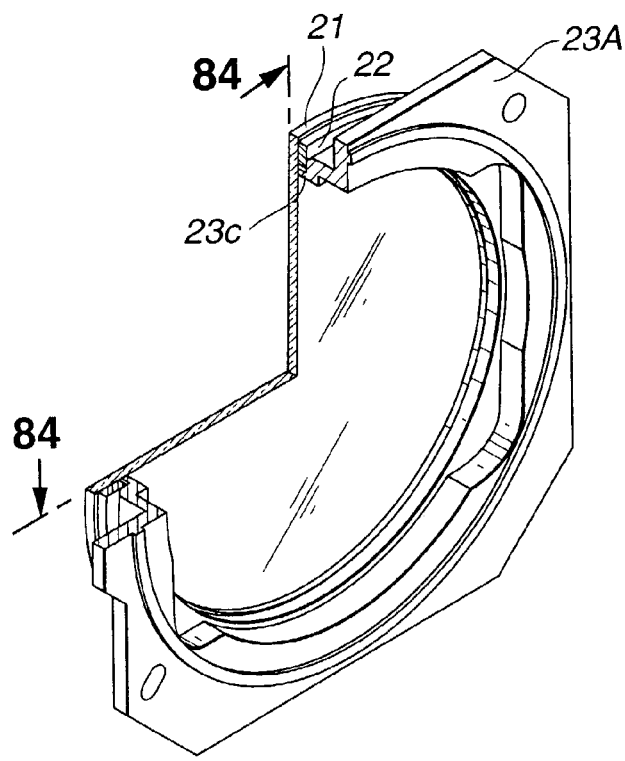
FIG. 83 is a perspective view showing by extracting a part of members (a dust-proofing filter, a member for vibration, and a dust-proofing filter supporting member) forming an image pick-up device unit according to a nineteenth embodiment of the present invention.
Figure 84:
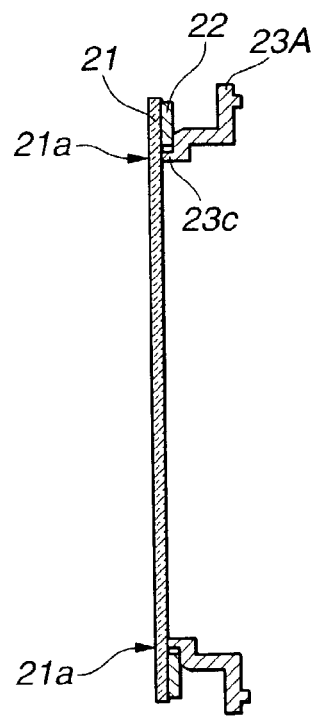
FIG. 84 is a sectional view along a line 84-84 shown in FIG. 83.

FIGS. 83 and 84 are diagrams showing by extracting a part of the members (a dust-proofing filter, a member for vibration, and a dust-proofing filter supporting member), which are assembled, of an image pick-up device unit according to a nineteenth embodiment of the present invention. FIG. 83 is a perspective view seen from the side opposed to the image pick-up device (on the back side). FIG. 84 is a sectional view along a line 84-84 shown in FIG. 83.

According to the nineteenth embodiment, the structure is basically the same as that according to the eighteenth embodiment. However, setting position of the supporting portion of the dust-proofing filter supporting member is only different from the eighteenth embodiment. The same reference numeral as that according to the eighteenth embodiment denotes the same member and is not described in detail, and only different portions are specifically described.

According to the nineteenth embodiment, in the image pick-up device unit (15), a supporting portion of the dust-proofing filter 21 is set such that the supporting portion 23c of the dust-proofing filter supporting member 23A is abutted onto a predetermined position on one surface of the dust-proofing filter 21.

Concretely, the supporting portion 23c of the dust-proofing filter supporting member 23A is set at a predetermined position on the surface of the dust-proofing filter 21 opposed to the image pick-up device 27 where it is abutted onto the position near the node 21a upon vibrations so as to support the dust-proofing filter 21.

The member for vibration 22 is arranged at the outer peripheral portion of the dust-proofing filter 21, specifically, on the outer peripheral side of the supporting portion of the dust-proofing filter supporting member 23A. In other words, the dust-proofing filter 21 is directly supported by the supporting portion 23c of the dust-proofing filter supporting member 23A at the inner position of the member for vibration 22.

Other structures are the same as those according to the eighteenth embodiment. The action upon removing the dusts, etc. which is adhered to the surface of the dust-proofing filter 21 by vibrating the dust-proofing filter 21 by the member for vibration 22, is entirely the same as the eighteenth embodiment.

With the above structure according to the nineteenth embodiment, the same advantages as those according to the eighteenth embodiment are obtained. Further, the supporting portion of the dust-proofing filter supporting member 23A is set at the inner position of the member for vibration 22 and an amplitude of vibrations caused by the member for vibration 22 can be increased. The passage area of the valid beams transmitted through the dust-proofing filter 21 is widely assured.

Figure 85:
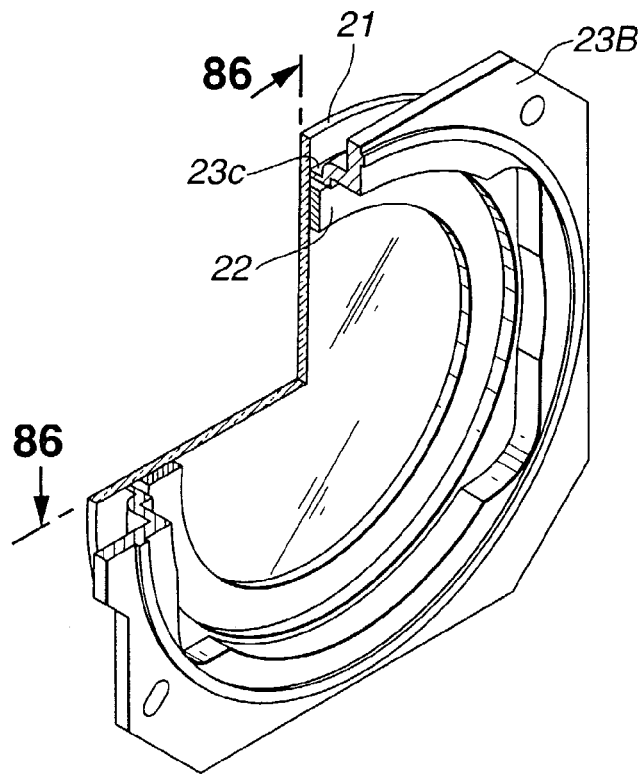
FIG. 85 is a perspective view showing by extracting a part of members (a dust-proofing filter, a member for vibration, and a dust-proofing filter supporting member) forming an image pick-up device unit according to a twentieth embodiment of the present invention.
Figure 86:
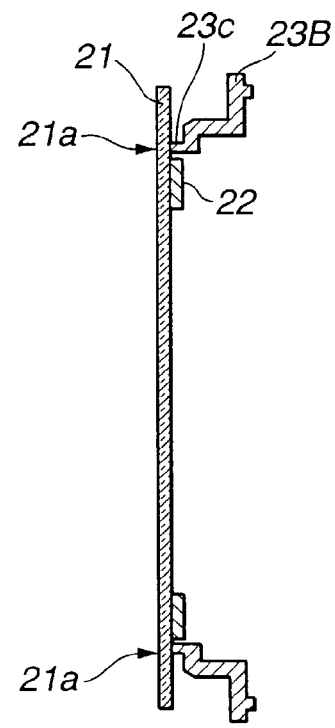
FIG. 86 is a sectional view along a line 86-86 shown in FIG. 85.

FIGS. 85 and 86 are diagrams showing by extracting a part (a dust-proofing filter, a member for vibration, and a dust-proofing filter supporting member), which are assembled, of an image pick-up device unit according to the twentieth embodiment of the present invention. FIG. 85 is a perspective view seen from the side opposed to the image pick-up device (on the back side). FIG. 86 is a sectional view along a line 86-86 shown in FIG. 85.

According to the twentieth embodiment, the structure is basically the same as those according to the first and nineteenth embodiments. However, setting position of the supporting portion of the dust-proofing filter supporting member is different from the first and nineteenth embodiments. The same reference numeral as that according to the first and nineteenth embodiments denotes the same member and is not described in detail, and only different portions are specifically described.

According to the twentieth embodiment, in the image pick-up device unit (15), a supporting portion of the dust-proofing filter 21 is set such that the supporting portion 23c of the dust-proofing filter supporting member 23B is abutted onto a predetermined position on one surface of the dust-proofing filter 21.

Concretely, the supporting portion 23c of the dust-proofing filter supporting member 23B is set at a predetermined position on the surface of the dust-proofing filter 21 opposed to the image pick-up device 27 where it is abutted onto the position near the node 21a upon vibrations so as to support the dust-proofing filter 21. The foregoing is similar to the nineteenth embodiment and, however, the following is different.

That is, according to the twentieth embodiment, the member for vibration 22 is arranged at a predetermined position near the outer peripheral portion of the dust-proofing filter 21, specifically, on the inner peripheral side of the supporting portion of the dust-proofing filter supporting member 23B. In other words, the dust-proofing filter 21 is supported by the supporting portion 23c of the dust-proofing filter supporting member 23B at the outer position of the member for vibration 22.

Other structures are the same as those according to the first and nineteenth embodiments. The operation is similar to that according to the eighteenth embodiment upon removing the dusts, etc. adhered to the surface of the dust-proofing filter 21 by causing the member for vibration 22 to vibrate the dust-proofing filter 21.

With the above structure according to the twentieth embodiment, the same advantages as those according to the nineteenth embodiment are obtained. Further, the supporting portion of the dust-proofing filter supporting member 23B is set at the outer position of the member for vibration 22 and the outer diameter of the dust-proofing filter 21 can be reduced.

According to the eighteenth to twentieth embodiments, the member for vibration 22 is arranged on one surface of the dust-proofing filter 21, namely, on the surface opposed to the image pick-up device 27. However, the arrangement of the member for vibration 22 is not limited to this.

Figure 87:
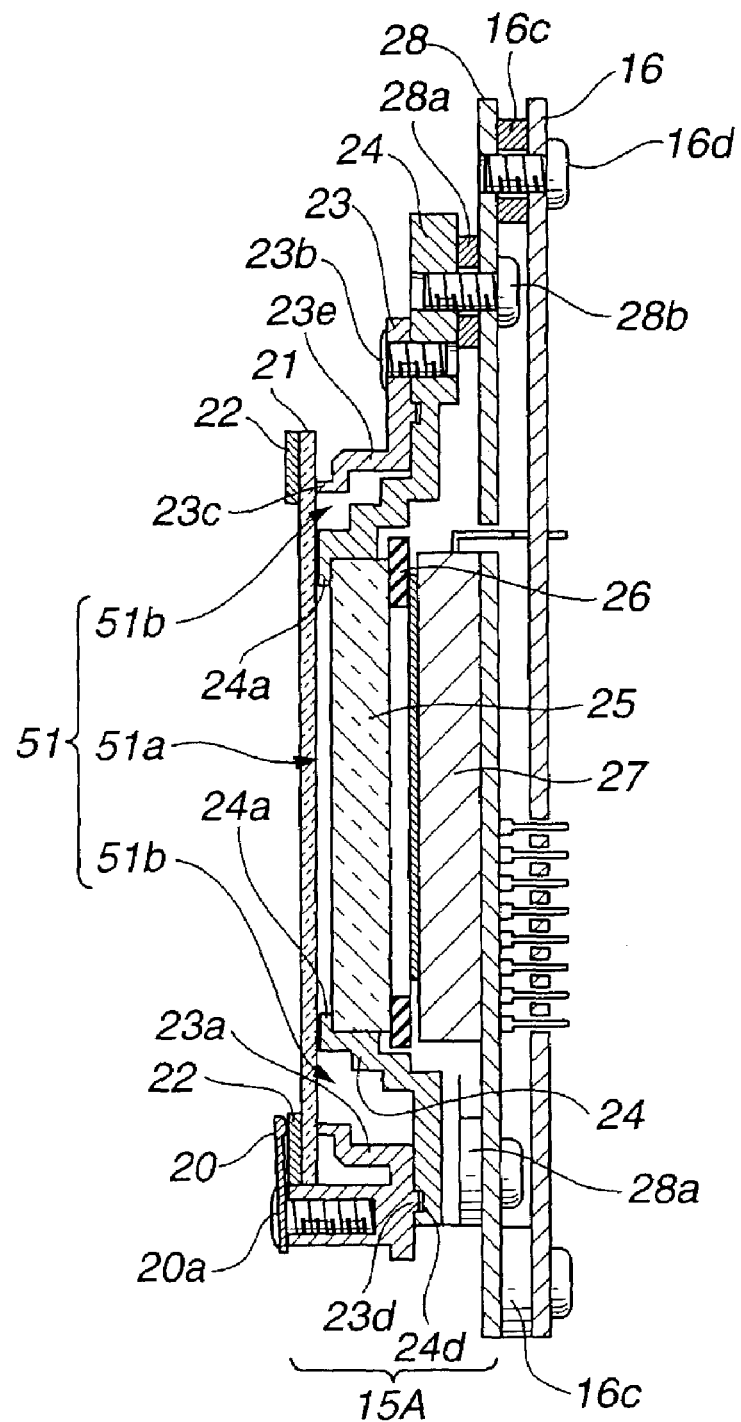
FIG. 87 is a sectional view showing an image pick-up device unit according to a twenty-first embodiment of the present invention.
Figure 88:
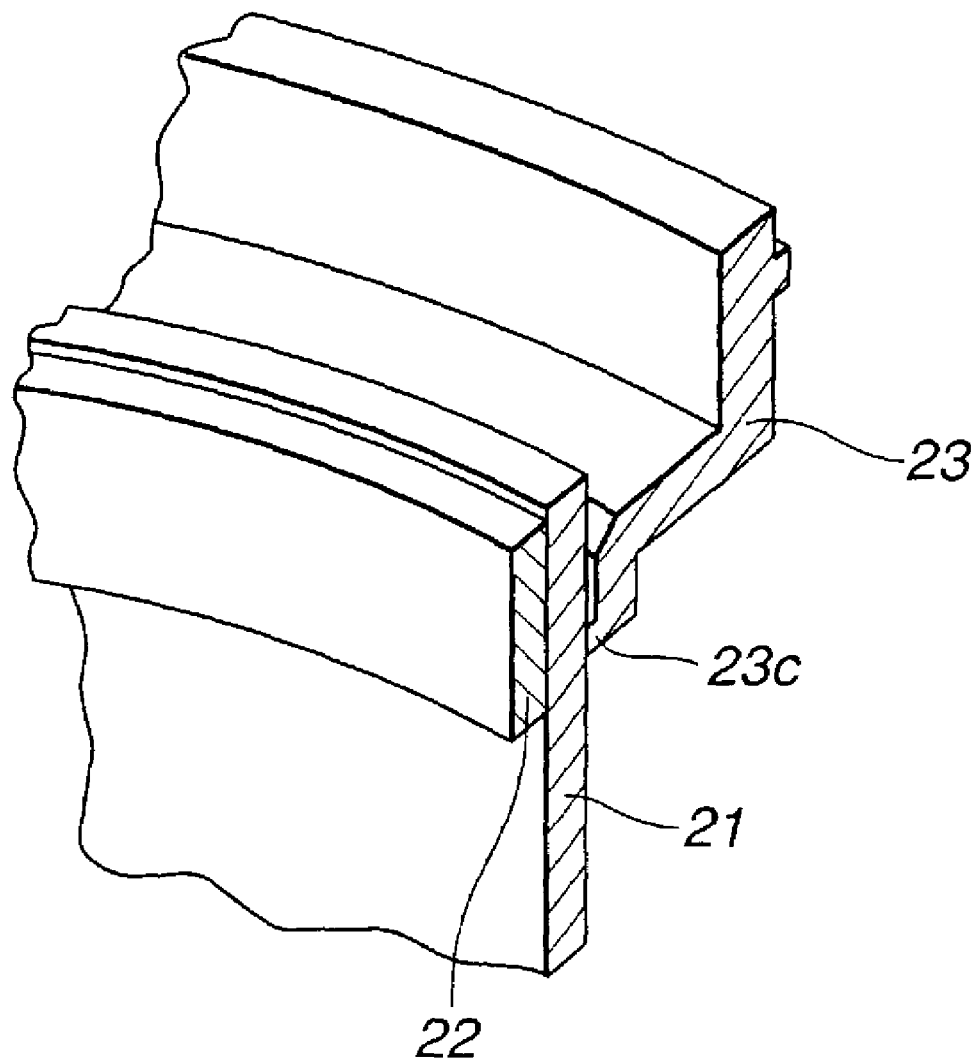
FIG. 88 is a main-part enlarged perspective view showing the arrangement of a member for vibration as a part of FIG. 87.

FIG. 87 is a sectional view showing an image pick-up device unit according to the twenty-first embodiment of the present invention. FIG. 87 is a sectional view of the cut-off surface shown in FIG. 4, corresponding to FIG. 5 used for the first embodiment. FIG. 88 is a main-part enlarged perspective view showing the arrangement of the member for vibration corresponding to a part shown in FIG. 87.

According to the twenty-first embodiment, the structure is basically the same as those according to the eighteenth embodiment. However, only the arrangement of the member for vibration 22 provided for the dust-proofing filter 21 is different from the eighteenth embodiment. The same reference numeral as that according to the eighteenth embodiment denotes the same member and is not described in detail, and only different portions are specifically described.

According to the twenty-first embodiment, in an image pick-up device unit 15A, the member for vibration 22 is arranged at the peripheral portion on the other surface of the dust-proofing filter 21, namely, on the front side (on the surface of the side opposed to an output surface of the photographing lens upon assembling the image pick-up device unit 15A in the camera main body). In this case, similarly to the eighteenth embodiment, the member for vibration 22 is integrally adhered to the dust-proofing filter 21.

The pressing member 20 is abutted on a predetermined portion of the member for vibration 22. The pressing member 20 presses the dust-proofing filter 21 toward the dust-proofing filter supporting member 23 via the member for vibration 22 interposed. Consequently, the dust-proofing filter 21 is airtightly jointed, fixed, and supported to the dust-proofing filter supporting member 23.

Other structures are the same as those according to the eighteenth embodiment. The action upon removing the dusts, etc. adhered to the surface of the dust-proofing filter 21 by causing the member for vibration 22 to vibrate the dust-proofing filter 21, is the same as that according to the eighteenth embodiment.

With the above structure according to the twenty-first embodiment, the same advantages as those according to the eighteenth embodiment are obtained. Further, in the image pick-up device unit 15A according to the twenty-first embodiment, the arrangement position of the member for vibration 22 is freely set irrespective of the position of the supporting portion of the dust-proofing filter 21 in the dust-proofing filter supporting member 23 by providing the member for vibration 22 at the peripheral portion on the front side of the dust-proofing filter 21.

According to the above embodiments, as an example, the detailed description is given of the so-called interchangeably attached single-lens digital camera in which the photographing optical system is detachable to the camera main body unit. The camera is not limited to this and the present invention does not require this within the spirit of the present invention.

It should be understood that the present invention is not limited to the precise disclosed embodiments, and various changes and modifications thereof can be made without departing from the spirit or scope of the invention.

What is claimed is:

1. A camera comprising:
   an image pick-up device which obtains an image signal corresponding to beams irradiated onto a photoelectrically converting surface thereof;
   a dust-proofing member having a substantially circular or polygonal plate-shape, and comprising a transparent portion at an area having at least a predetermined length in a radial direction from a center thereof, the transparent portion being opposed to a front of the image pick-up device at a predetermined interval;
   a member for vibration which is arranged at a peripheral portion of the dust-proofing member, and which applies vibrations to the dust-proofing member;
   a sealing structure arranged to constitute a space portion that is substantially sealed at a portion formed by opposing the image pick-up device and the dust-proofing member by sealing the space portion at peripheral portions of the image pick-up device and the dust-proofing member; and
   an image signal processing circuit which converts an image signal obtained from the image pick-up device, corresponding to an image formed onto the photoelectrically converting surface of the image pick-up device, into a signal suitable to recording;
   wherein the dust proofing member is supported to the sealing structure near a node of vibrations caused by the member for vibration;
   wherein the member for vibration comprises piezoelectric ceramics.

2. The camera according to claim 1, wherein the member for vibration comprises a plurality of vibrating devices, each of which comprises piezoelectric ceramics, and which are annularly arranged at the peripheral portion of the dust-proofing member.

3. The camera according to claim 2, wherein each said vibrating device is rectangular.

4. The camera according to claim 2, wherein each said vibrating device is arcuate.

5. The camera according to claim 1, further comprising:
   a photographing lens attaching unit for attaching a photographing lens,
   wherein the photographing lens is detachable from the photographing lens attaching unit.

6. The camera according to claim 1, wherein a surface of the dust-proofing member comprises a thin-film formed portion and a thin-film non-forming portion, and the member for vibration is adhered and fixed to the thin-film non-forming portion.

7. The camera according to claim 6, wherein the thin film comprises one of an infrared cut-off film, a reflection preventing film, an ultraviolet cut-off film, and an electrostatic charge preventing film.

8. The camera according to claim 1, wherein a surface of the dust-proofing member comprises a thin-film formed portion and a thin-film non-forming portion, and the thin-film non-forming portion is formed on a reversed surface of a surface where the member for vibration is arranged.

9. The camera according to claim 8, wherein the thin film comprises one of an infrared cut-off film, a reflection preventing film, an ultraviolet cut-off film, and an electrostatic charge preventing film.

10. The camera according to claim 1, wherein the member for vibration is interjacent in a supporting portion of the sealing structure.

11. The camera according to claim 1, wherein the member for vibration is arranged on an inner peripheral side of a supporting portion of the sealing structure.

12. The camera according to claim 1, wherein the member for vibration is arranged on an outer peripheral side of a supporting portion of the sealing structure.

13. The camera according to claim 1, wherein the member for vibration is arranged on a reversed surface of a supporting portion of the sealing structure.

14. The camera according to claim 1, wherein the member for vibration comprises a plate-shaped piezoelectric ceramics member, a first conductive member which is formed along a surface and a side surface of the piezoelectric ceramics member, and a second conductive member which is formed on a reversed surface of the piezoelectric ceramics member.

15. The camera according to claim 14, wherein the first conductive member is formed extending to the reversed surface of the piezoelectric ceramics member, and an insulating portion is provided on the reversed surface between the first conductive member and the second conductive member.

16. The camera according to claim 1, wherein at least a reversed surface of the dust-proofing member is subjected to surface treatment by using an electrostatic charge preventing material.

17. The camera according to claim 16, wherein the electrostatic charge preventing material comprises a transparent conductive film.

18. The camera according to claim 17, wherein the transparent conductive film comprises one of a metal transparent conductive film and an oxide semiconductor transparent conductive film.

19. The camera according to claim 17, wherein the transparent conductive film contains mainly one of Tin Oxide, Indium Oxide, Cadmium Tin Oxide, Au, and Ag.

20. The camera according to claim 1, wherein the member for vibration comprises a piezoelectric ceramics member and a conductive member formed on a surface of the piezoelectric ceramics member, the member for vibration is arranged at a portion at which a conductive thin-film at the peripheral portion of the dust-proofing member is formed, and the member for vibration generates vibrations by conducting the conductive member and the conductive thin-film.

21. The camera according to claim 20, wherein the conductive thin-film comprises an electrostatic charge preventing film.

22. The camera according to claim 1, wherein the member for vibration comprises a multi-layered structure formed by alternately laminating a plurality of piezoelectric ceramics members and a plurality of electrodes for applying a voltage to the piezoelectric ceramics members.

23. The camera according to claim 22, further comprising: a plurality of conductive members for connecting the electrodes.

24. An image pick-up device unit comprising:
an image pick-up device which obtains an image signal corresponding to beams irradiated onto a photoelectrically converting surface thereof;
an optical member which is opposed to a front of the image pick-up device at a predetermined interval;
a member for vibration which applies vibrations to the optical member and which is arranged at a peripheral portion of the optical member so as to surround beams incident on the photoelectrically converting surface; and
a sealing structure arranged to constitute a space portion that is substantially sealed at a portion formed by opposing the image pick-up device and the optical member by sealing the space portion at peripheral portions of the image pick-up device and the optical member;
wherein the optical member is supported to the sealing structure near a node of vibrations caused by the member for vibration;
wherein the member for vibration comprises piezoelectric ceramics.

25. The image pick-up device unit according to claim 24, wherein the member for vibration comprises a plurality of vibrating devices, each of which comprises piezoelectric ceramics, and which are annularly arranged at the peripheral portion of the optical member.

26. The image pick-up device unit according to claim 25, wherein each said vibrating device is rectangular.

27. The image pick-up device unit according to claim 25, wherein each said vibrating device is arcuate.

28. The image pick-up device unit camera according to claim 24, wherein a surface of the optical member comprises a thin-film formed portion and a thin-film non-forming portion, and the member for vibration is adhered and fixed to the thin-film non-forming portion.

29. The image pick-up device unit according to claim 28, wherein the thin film comprises one of an infrared cut-off film, a reflection preventing film, an ultraviolet cut-off film, and an electrostatic charge preventing film.

30. The image pick-up device unit according to claim 24, wherein the member for vibration is interjacent in a supporting portion of the sealing structure.

31. The image pick-up device unit according to claim 24, wherein the member for vibration is arranged on an inner peripheral side of a supporting portion of the sealing structure.

32. The image pick-up device unit according to claim 24, wherein the member for vibration is arranged on an outer peripheral side of a supporting portion of the sealing structure.

33. The image pick-up device unit according to claim 24, wherein the member for vibration is arranged on a reversed surface of a supporting portion of the sealing structure.

34. The image pick-up device unit according to claim 24, wherein the member for vibration comprises a plate-shaped piezoelectric ceramics member, a first conductive member which is formed along a surface and a side surface of the piezoelectric ceramics member, and a second conductive member which is formed on a reversed surface of the piezoelectric ceramics member.

35. The image pick-up device unit according to claim 34, wherein the first conductive member is formed extending to the reversed surface of the piezoelectric ceramics member, and an insulating portion is provided on the reversed surface between the first conductive member and the second conductive member.

36. The image pick-up device unit according to claim 24, wherein at least a reversed surface of the optical member is subjected to surface treatment by using an electrostatic charge preventing material.

37. The image pick-up device unit according to claim 36, wherein the electrostatic charge preventing material comprises a transparent conductive film.

38. The image pick-up device unit according to claim 37, wherein the transparent conductive film comprises one of a metal transparent conductive film and an oxide semiconductor transparent conductive film.

39. The image pick-up device unit according to claim 37, wherein the transparent conductive film contains mainly one of Tin Oxide, Indium Oxide, Cadmium Tin Oxide, Au, and Ag.

40. The image pick-up device unit according to claim 24, wherein the member for vibration comprises a piezoelectric ceramics member and a conductive member formed on a surface of the piezoelectric ceramics member, the member for vibration is arranged at a portion at which a conductive thin-film at the peripheral portion of the optical member is formed, and the member for vibration generates vibrations by conducting the conductive member and the conductive thin-film.

41. The image pick-up device unit according to claim 40, wherein the conductive thin-film comprises an electrostatic charge preventing film.

42. The image pick-up device according to claim 24, wherein the member for vibration comprises a multi-layered structure formed by alternately laminating a plurality of piezoelectric ceramics members and a plurality of electrodes for applying a voltage to the piezoelectric ceramics members.

43. The image pick-up device according to claim 42, further comprising: a plurality of conductive members for connecting the electrodes.

44. A camera comprising:
an image pick-up device which obtains an image signal corresponding to beams irradiated onto a photoelectrically converting surface thereof;
a plate-shaped optical member which is arranged to be opposed to a front of the image pick-up device at a predetermined interval, wherein an entire surface of the plate-shaped optical member as a whole has at least three linear axes of symmetry;
a member for vibration which applies vibrations to the optical member, and which is arranged at a peripheral portion of the optical member; and
a sealing structure arranged to constitute a space portion that is substantially sealed at a portion formed by opposing the image pick-up device and the optical member by sealing the space portion at peripheral portions of the image pick-up device and the optical member;
wherein the optical member is supported to the sealing structure near a node of vibrations caused by the member for vibration.

45. The camera according to claim 44, wherein the member for vibration is arranged at the peripheral portion of the optical member.

46. The camera according to claim 45, wherein the optical member is circular or regularly polygonal.

47. The camera according to claim 44, wherein the member for vibration comprises a multi-layered structure formed by alternately laminating a plurality of vibrating devices and a plurality of electrodes for applying a voltage to the vibrating devices.

48. The camera according to claim 47, further comprising: a plurality of conductive members for connecting the electrodes.

49. An image pick-up device unit comprising:
an image pick-up device which obtains an image signal corresponding to beams irradiated onto a photoelectrically converting surface thereof;
an optical member which is opposed to a front of the image pick-up device at a predetermined interval;
a member for vibration which applies vibrations to the optical member and which is arranged at a peripheral portion of the optical member; and
a sealing structure arranged to constitute a space portion that is substantially sealed at a portion formed by opposing the image pick-up device and the optical member by sealing the space portion at peripheral portions of the image pick-up device and the optical member;
wherein the optical member is supported to the sealing structure near a node of vibrations caused by the member for vibration; and
wherein the member for vibration comprises piezoelectric ceramics.

50. The image pick-up device unit according to claim 49, wherein the member for vibration is interjacent in a supporting portion of the sealing structure.

51. The image pick-up device unit according to claim 49, wherein the member for vibration is arranged on an inner peripheral side of a supporting portion of the sealing structure.

52. The image pick-up device unit according to claim 49, wherein the member for vibration is arranged on an outer peripheral side of a supporting portion of the sealing structure.

53. A camera comprising:
an image pick-up device which obtains an image signal corresponding to beams irradiated onto a photoelectrically converting surface thereof;
an optical member which is opposed to a front of the image pick-up device at a predetermined interval;
a member for vibration which applies vibrations to the optical member and which is arranged at a peripheral portion of the optical member; and
a sealing structure arranged to constitute a space portion that is substantially sealed at a portion formed by opposing the image pick-up device and the optical member by sealing the space portion at peripheral portions of the image pick-up device and the optical member;
wherein the optical member is supported to the sealing structure near a node of vibrations caused by the member for vibration; and
wherein the member for vibration comprises piezoelectric ceramics.

54. The camera according to claim 53, wherein the member for vibration is interjacent in a supporting portion of the sealing structure.

55. The camera according to claim 53, wherein the member for vibration is arranged on an inner peripheral side of a supporting portion of the sealing structure.

56. The camera according to claim 53, wherein the member for vibration is arranged on an outer peripheral side of a supporting portion of the sealing structure.

57. A camera comprising:
an image pick-up device which obtains an image signal corresponding to beams irradiated onto a photoelectrically converting surface thereof;
an optical member which is opposed to a front of the image pickup device at a predetermined interval;
a member for vibration which applies vibrations to the optical member and which is arranged at a peripheral portion of the optical member; and
a sealing structure arranged to constitute a space portion that is substantially sealed at a portion formed by opposing the image pick-up device and the optical member by sealing the space portion at peripheral portions of the image pick-up device and the optical member;
wherein the optical member is supported to the sealing structure near a node of vibrations caused by the member for vibration; and
wherein the member for vibration is interjacent in a supporting portion of the sealing structure.

58. The camera according to claim 57, further comprising an image signal processing circuit which converts an image signal obtained from the image pick-up device, corresponding to an image formed onto the photoelectrically converting surface of the image pick-up device, into a signal suitable to recording.

59. A camera comprising:
an image pick-up device which obtains an image signal corresponding to beams irradiated onto a photoelectrically converting surface thereof an optical member which is opposed to a front of the image pick-up device at a predetermined interval;
a member for vibration which applies vibrations to the optical member and which is arranged at a peripheral portion of the optical member; and
a sealing structure arranged to constitute a space portion that is substantially sealed at a portion formed by opposing the image pick-up device and the optical member by sealing the space portion at peripheral portions of the image pick-up device and the optical member,
wherein the optical member is supported to the sealing structure near a node of vibrations caused by the member for vibration, and
wherein the member for vibration is arranged on an inner peripheral side of a supporting portion of the sealing structure.

60. The camera according to claim 59, further comprising an image signal processing circuit which converts an image signal obtained from the image pick-up device, corresponding to an image formed onto the photoelectrically converting surface of the image pick-up device, into a signal suitable to recording.

* * * * *